US006793828B2

(12) United States Patent
Dolecek et al.

(10) Patent No.: US 6,793,828 B2
(45) Date of Patent: Sep. 21, 2004

(54) METHOD OF SEPARATING AND COLLECTING COMPONENTS FROM A FLUID

(75) Inventors: Victor D. Dolecek, Englewood, CO (US); David Malcolm, Parker, CO (US); Kevin D. McIntosh, Brooklyn Park, MN (US)

(73) Assignee: Medtronic, Inc., Minneapolis, MN (US)

( * ) Notice: Subject to any disclaimer, the term of this patent is extended or adjusted under 35 U.S.C. 154(b) by 121 days.

(21) Appl. No.: 10/431,894

(22) Filed: May 8, 2003

(65) Prior Publication Data

US 2003/0211928 A1 Nov. 13, 2003

Related U.S. Application Data

(62) Division of application No. 09/961,793, filed on Sep. 24, 2001, now Pat. No. 6,589,153.

(51) Int. Cl.[7] ................................................ B01D 17/38

(52) U.S. Cl. ........................... 210/787; 494/11; 494/17; 494/31; 494/37; 494/84

(58) Field of Search ................................ 210/787–789, 210/512.1; 494/1, 10, 16–18, 23, 27, 29, 31, 37, 84, 11

(56) References Cited

U.S. PATENT DOCUMENTS 3,724,747 A * 4/1973 Unger et al. ................... 494/1
3,864,089 A * 2/1975 Tiffany et al. ................ 494/27
3,877,634 A * 4/1975 Rohde et al. .................. 494/1
3,970,245 A * 7/1976 Aeschlimann ................. 494/9
4,296,882 A * 10/1981 Kobayashi ................... 494/18
5,437,598 A * 8/1995 Antwiler ........................ 494/1

* cited by examiner

*Primary Examiner*—Joseph Drodge

(74) *Attorney, Agent, or Firm*—Steven C. Petersen; Sarah S. O'Rourke; Hogan & Hartson LLP

(57) ABSTRACT

A centrifugal method of separating and collecting components from a fluid is provided, comprising providing a centrifuge operable at a plurality of rotation speeds and having a mounting assembly for positioning and retaining a disposable collection assembly relative to the centrifuge at the rotation speeds; mounting a separation assembly comprising a number of collection chambers in the mounting assembly, wherein each of the collection chambers include an outer, conical-shaped collection portion with a port for providing a fluid pathway for the fluid into and out of the collection chambers and wherein the mounting includes fluidically connecting the ports with a fluid tube; connecting a fluid source to the fluid tube; rotating the centrifuge at a fill speed; and operating the fluid source to supply the fluid to the fluid tube, whereby the fluid is concurrently supplied in substantially equal volumetric and component density quantities to each of the collection chambers.

29 Claims, 28 Drawing Sheets

METHOD OF SEPARATING AND COLLECTING COMPONENTS FROM A FLUID

CROSS-REFERENCE TO RELATED APPLICATIONS

This application is a divisional application of U.S. patent application Ser. No. 09/961,793, filed Sep. 24, 2001, issued as U.S. Pat. No. 6,589,153.

BACKGROUND OF THE INVENTION

1. Field of the Invention

This invention relates to novel methods, devices and apparatuses for the centrifugal separation of a liquid into its components of varying specific gravities, and is more particularly directed toward a blood separation device useful, for example, in the separation of blood components for use in various therapeutic regimens.

2. Description of the State of Art

Centrifugation utilizes the principle that particles suspended in solution will assume a particular radial position within the centrifuge rotor based upon their respective densities and will therefore separate when the centrifuge is rotated at an appropriate angular velocity for an appropriate period of time. Centrifugal liquid processing systems have found applications in a wide variety of fields. For example, centrifugation is widely used in blood separation techniques to separate blood into its component parts, that is, red blood cells, platelets, white blood cells, and plasma.

The liquid portion of the blood, referred to as plasma, is a protein-salt solution in which red and white blood cells and platelets are suspended. Plasma, which is 90 percent water, constitutes about 55 percent of the total blood volume. Plasma contains albumin (the chief protein constituent), fibrinogen (responsible, in part, for the clotting of blood), globulins (including antibodies) and other clotting proteins. Plasma serves a variety of functions, from maintaining a satisfactory blood pressure and providing volume to supplying critical proteins for blood clotting and immunity. Plasma is obtained by separating the liquid portion of blood from the cells suspended therein.

Red blood cells (erythrocytes) are perhaps the most recognizable component of whole blood. Red blood cells contain hemoglobin, a complex iron-containing protein that carries oxygen throughout the body while giving blood its red color. The percentage of blood volume composed of red blood cells is called the "hematocrit."

White blood cells (leukocytes) are responsible for protecting the body from invasion by foreign substances such as bacteria, fungi and viruses. Several types of white blood cells exist for this purpose, such as granulocytes and macrophages, which protect against infection by surrounding and destroying invading bacteria and viruses, and lymphocytes which aid in the immune defense.

Platelets (thrombocytes) are very small cellular components of blood that help the clotting process by sticking to the lining of blood vessels. Platelets are vital to life, because they help prevent both massive blood loss resulting from trauma and blood vessel leakage that would otherwise occur in the course of normal, day-to-day activity.

If whole blood is collected and prevented from clotting by the addition of an appropriate anticoagulant, it can be centrifuged into its component parts. Centrifugation will result in the red blood cells, which weigh the most, packing to the most outer portion of the rotating container, while plasma, being the least dense will settle in the central portion of the rotating container. Separating the plasma and red blood cells is a thin white or grayish layer called the buffy coat. The buffy coat layer consists of the white blood cells and platelets, which together make up about 1 percent of the total blood volume.

These blood components, discussed above, may be isolated and utilized in a wide range of diagnostic and therapeutic regimens. For example, red blood cells are routinely transfused into patients with chronic anemia resulting from disorders such as kidney failure, malignancies, or gastrointestinal bleeding and those with acute blood loss resulting from trauma or surgery. The plasma component is typically frozen by cryoprecipitation and then slowly thawed to produce cryoprecipitated antihemophiliac factor (AHF) which is rich in certain clotting factors, including Factor VIII, fibrinogen, von Willebrand factor and Factor XIII. Cryoprecipitated AHF is used to prevent or control bleeding in individuals with hemophilia and von Willebrand's disease. Platelets and white blood cells, which are found in the buffy layer component, can be used to treat patients with abnormal platelet function (thrombocytopenia) and patients that are unresponsive to antibiotic therapy, respectively.

Various techniques and apparatus have been developed to facilitate the collection of whole blood and the subsequent separation of therapeutic components therefrom. Centrifugal systems, also referred to as blood-processing systems, generally fall into two categories, discontinuous-flow and continuous-flow devices.

In discontinuous-flow systems, whole blood from the donor or patient flows through a conduit into the rotor or bowl where component separation takes place. These systems employ a bowl-type rotor with a relatively large (typically 200 ml or more) volume that must be filled with blood before any of the desired components can be harvested. When the bowl is full, the drawing of fresh blood is stopped, the whole blood is separated into its components by centrifugation, and the unwanted components are returned to the donor or patient through the same conduit intermittently, in batches, rather than on a continuous basis. When the return has been completed, whole blood is again drawn from the donor or patient, and a second cycle begins. This process continues until the required amount of the desired component has been collected. Discontinuous-flow systems have the advantage that the rotors are relatively small in diameter but may have the disadvantage of a relatively large extracorporeal volume (i.e., the amount of blood that is out of the donor at any given time during the process). Discontinuous-flow devices are used for the collection of platelets and/or plasma, and for the concentration and washing of red blood cells. They are used to reconstitute previously frozen red blood cells and to salvage red blood cells lost intraoperatively. Because the bowls in these systems are rigid and have a fixed volume, however, it has been difficult to control the hematocrit of the final product, particularly if the amount of blood salvaged is insufficient to fill the bowl with red blood cells.

One example of a discontinuous-flow system is disclosed by McMannis, et al., in his U.S. Pat. No. 5,316,540, and is a variable volume centrifuge for separating components of a fluid medium, comprising a centrifuge that is divided into upper and lower chambers by a flexible membrane, and a flexible processing container bag positioned in the upper chamber of the centrifuge. The McMannis, et al., system varies the volume of the upper chamber by pumping a hydraulic fluid into the lower chamber, which in turn raises the membrane and squeezes the desired component out of the centrifuge. The McMannis, et al., system takes up a fairly large amount of space, and its flexible pancake-shaped rotor is awkward to handle. The McMannis, et al., system does not permit the fluid medium to flow into and out of the processing bag at the same time, nor does it permit fluid medium to be pulled out of the processing bag by suction.

In continuous-flow systems, whole blood from the donor or patient also flows through one conduit into the spinning rotor where the components are separated. The component of interest is collected and the unwanted components are returned to the donor through a second conduit on a continuous basis as more whole blood is being drawn. Because the rate of drawing and the rate of return are substantially the same, the extracorporeal volume, or the amount of blood that is out of the donor or patient at any given time in the procedure, is relatively small. These systems typically employ a belt-type rotor, which has a relatively large diameter but a relatively small (typically 100 ml or less) processing volume. Although continuous-flow systems have the advantage that the amount of blood that must be outside the donor or patient can be relatively small, they have the disadvantage that the diameter of the rotor is large. These systems are, as a consequence, large. Furthermore, they are complicated to set up and use. These devices are used almost exclusively for the collection of platelets.

Continuous-flow systems are comprised of rotatable and stationary parts that are in fluid communication. Consequently, continuous-flow systems utilize either rotary seals or a J-loop. A variety of types of rotary centrifuge seals have been developed. Some examples of rotary centrifuge seals which have proven to be successful are described in U.S. Pat. Nos. 3,409,203 and 3,565,330, issued to Latham. In these patents, rotary seals are disclosed which are formed from a stationary rigid low friction member in contact with a moving rigid member to create a dynamic seal, and an elastomeric member which provides a resilient static seal as well as a modest closing force between the surfaces of the dynamic seal.

Another rotary seal suitable for use in blood-processing centrifuges is described in U.S. Pat. No. 3,801,142 issued to Jones, et al. In this rotary seal, a pair of seal elements having confronting annular fluid-tight sealing surfaces of non-corrodible material is provided. These are maintained in a rotatable but fluid-tight relationship by axial compression of a length of elastic tubing forming one of the fluid connections to these seal elements.

Related types of systems which incorporate rotatable, disposable annular separation chambers coupled via rotary seals to stationary tubing members are disclosed in U.S. Pat. Nos. 4,387,848; 4,094,461; 4,007,871; and 4,010,894.

One drawback present in the above-described continuous-flow systems has been their use of a rotating seal or coupling element between that portion of the system carried by the centrifuge rotor and that portion of the system which remains stationary. While such rotating seals have provided generally satisfactory performance, they have been expensive to manufacture and have unnecessarily added to the cost of the flow systems. Furthermore, such rotating seals introduce an additional component into the system which if defective can cause contamination of the blood being processed.

One flow system heretofore contemplated to overcome the problem of the rotating seal utilizes a rotating carriage on which a single housing is rotatably mounted. An umbilical cable extending to the housing from a stationary point imparts planetary motion to the housing and thus prevents the cable from twisting. To promote sterile processing while avoiding the disadvantages of a discontinuous-flow system within a single sealed system, a family of dual member centrifuges can be used to effect cell separation. One example of this type of centrifuge is disclosed in U.S. Pat. No. RE 29,738 to Adams entitled "Apparatus for Providing Energy Communication Between a Moving and a Stationary Terminal." Due to the characteristics of such dual member centrifuges, it is possible to rotate a container containing a fluid, such as a unit of donated blood and to withdraw a separated fluid component, such as plasma, into a stationary container, outside of the centrifuge without using rotating seals. Such container systems utilize a J-loop and can be formed as closed, sterile transfer sets.

The Adams patent discloses a centrifuge having an outer rotatable member and an inner rotatable member. The inner member is positioned within and rotatably supported by the outer member. The outer member rotates at one rotational velocity, usually called "one omega," and the inner rotatable member rotates at twice the rotational velocity of the outer housing or "two omega." There is thus a one omega difference in rotational speed of the two members. For purposes of this document, the term "dual member centrifuge" shall refer to centrifuges of the Adams type.

The dual member centrifuge of the Adams patent is particularly advantageous in that, as noted above, no seals are needed between the container of fluid being rotated and the non-moving component collection containers. The system of the Adams patent provides a way to process blood into components in a single, sealed, sterile system wherein whole blood from a donor can be infused into the centrifuge while the two members of the centrifuge are being rotated.

An alternate to the apparatus of the Adams patent is illustrated in U.S. Pat. No. 4,056,224 to Lolachi entitled "Flow System for Centrifugal Liquid Processing Apparatus." The system of the Lolachi patent includes a dual member centrifuge of the Adams type. The outer member of the Lolachi centrifuge is rotated by a single electric motor which is coupled to the internal rotatable housing by belts and shafts.

U.S. Pat. No. 4,108,353 to Brown entitled "Centrifugal Apparatus With Oppositely Positioned Rotational Support Means" discloses a centrifuge structure of the Adams type which includes two separate electrical motors. One electric motor is coupled by a belt to the outer member and rotates the outer member at a desired nominal rotational velocity. The second motor is carried within the rotating exterior member and rotates the inner member at the desired higher velocity, twice that of the exterior member.

U.S. Pat. No. 4,109,855 to Brown, et al., entitled "Drive System For Centrifugal Processing Apparatus" discloses yet another drive system. The system of the Brown, et al., patent has an outer shaft, affixed to the outer member for rotating the outer member at a selected velocity. An inner shaft, coaxial with the outer shaft, is coupled to the inner member. The inner shaft rotates the inner member at twice the rotational velocity as the outer member. A similar system is disclosed in U.S. Pat. No. 4,109,854 to Brown entitled "Centrifugal Apparatus With Outer Enclosure."

The continuous-flow systems described above are large and expensive units that are not intended to be portable. Further, they are also an order of magnitude more expensive than a standard, multi-container blood collection set. There exists the need, therefore, for a centrifugal system for processing blood and other biological fluids that is compact and easy to use and that addresses the disadvantages of prior-art discontinuous and continuous-flow systems.

Whole blood that is to be separated into its components is commonly collected into a flexible plastic donor bag, and the blood is centrifuged to separate it into its components through a batch process. This is done by spinning the blood bag for a period of about 10 minutes in a large refrigerated centrifuge. The main blood constituents, i.e., red blood cells, platelets and white cells, and plasma, having sedimented and formed distinct layers, are then expressed sequentially by a manual extractor in multiple satellite bags attached to the primary bag.

More recently, automated extractors have been introduced in order to facilitate the manipulation. Nevertheless, the whole process remains laborious and requires the separation to occur within a certain time frame to guarantee the quality of the blood components. This complicates the logistics, especially considering that most blood donations are performed in decentralized locations where no batch processing capabilities exist.

This method has been practiced since the widespread use of the disposable plastic bags for collecting blood in the 1970's and has not evolved significantly since then. Some attempts have been made to apply haemapheresis technology in whole blood donation. This technique consists of drawing and extracting on-line one or more blood components while a donation is performed, and returning the remaining constituents to the donor. However, the complexity and costs of haemapheresis systems preclude their use by transfusion centers for routine whole blood collection.

There have been various proposals for portable, disposable, centrifugal apparatus, usually with collapsible bags, for example as in U.S. Pat. No. 3,737,096, or 4,303,193 to Latham, Jr., or with a rigid walled bowl as in U.S. Pat. No. 4,889,524 to Fell, et al. These devices all have a minimum fixed holding volume which requires a minimum volume usually of about 250 ml to be processed before any components can be collected.

U.S. Pat. No. 5,316,540 to McMannis, et al., discloses a centrifugal processing apparatus, wherein the processing chamber is a flexible processing bag which can be deformed to fill it with biological fluid or empty it by means of a membrane which forms part of the drive unit. The bag comprises a single inlet/outlet tubing for the introduction and removal of fluids to the bag, and consequently cannot be used in a continual, on-line process. Moreover, the processing bag has a the disadvantage of having 650 milliliter capacity, which makes the McMannis, et al., device difficult to use as a blood processing device.

As discussed above, centrifuges are often used to separate blood into its components for use in a variety of therapeutic regimens. One such application is the preparation of a bioadhesive sealant. A bioadhesive sealant, also referred to as fibrin glue, is a relatively new technological advance which attempts to duplicate the biological process of the final stage of blood coagulation. Clinical reports document the utility of fibrin glue in a variety of surgical fields, such as, cardiovascular, thoracic, transplantation, head and neck, oral, gastrointestinal, orthopedic, neurosurgical, and plastic surgery. At the time of surgery, the two primary components comprising the fibrin glue, fibrinogen and thrombin, are mixed together to form a clot. The clot is applied to the appropriate site, where it adheres to the necessary tissues, bone, or nerve within seconds, but is then slowly reabsorbed by the body in approximately 10 days by fibrinolysis. Important features of fibrin glue is its ability to: (1) achieve haemostasis at vascular anastomoses particularly in areas which are difficult to approach with sutures or where suture placement presents excessive risk; (2) control bleeding from needle holes or arterial tears which cannot be controlled by suturing alone; and (3) obtain haemostasis in heparinized patients or those with coagulopathy. See, Borst, H. G., et al., *J Thorac. Cardiovasc. Surg.*, 84:548–553 (1982); Walterbusch, G. J, et al., *Thorac. Cardiovasc. Surg.*, 30:234–235 (1982); and Wolner, F. J. et al., *Thorac. Cardiovasc. Surg.*, 30:236–237 (1982).

There is still a need, therefore, for a centrifugal system for processing blood and other biological fluids, that is compact and easy to use and that does not have the disadvantages of prior-art discontinuous and/or continuous flow systems and furthermore there exists a need for a convenient and practical method for preparing a platelet gel composition wherein the resulting platelet gel poses a zero risk of disease transmission and a zero risk of causing an adverse physiological reaction.

There is also a widespread need for a system that, during blood collection, will automatically separate the different components of whole blood that are differentiable in density and size, with a simple, low cost, disposable unit.

There is further a need for a centrifugal cell processing system wherein multiple batches of cells can be simultaneously and efficiently processed without the use of rotational coupling elements.

Preferably the apparatus will be essentially self-contained. Preferably, the equipment needed to practice the method will be relatively inexpensive and the blood contacting set will be disposable each time the whole blood has been separated.

SUMMARY OF THE INVENTION

Accordingly, an object of this invention is to provide a method and apparatus for the separation of components suspended or dissolved in a fluid medium by centrifugation. More specifically, one object of this invention is to provide a method for the separation and isolation of one or more whole blood components, such as platelet rich plasma, white blood cells and platelet poor plasma, from anticoagulated whole blood by centrifugation, wherein the components are isolated while the centrifuge is rotating.

To achieve the foregoing, an embodiment of the present invention provides a centrifuge disposable or separation assembly having at least one collection chamber for receiving and holding a fluid medium to be centrifuged, the chamber having an outer perimeter, an inner perimeter, a generally circular cross-sectional area, and a generally conical outboard or outer-perimeter collecting portion. The collection chamber is typically formed from relatively rigid, molded plastic or other materials. A mounting assembly (e.g., a caddy for the disposable) is included as part of the invention to allow accurate mounting of the centrifuge disposable relative to the centrifuge rotor to facilitate balanced distribution of component weights for smooth centrifuge rotation and to allow quick installation and release of the centrifuge disposal after use for easy insertion and replacement without tools.

The collection chamber further includes a first and second port in fluid communication with opposite points near the outer most or outboard portions of the chamber (e.g., in the conical collecting portion). The first and second ports thus provide fluid communication with the environment inside and outside of the collection chamber. The first and second ports are in turn fluidly connected to a lumen tubing, which may be single lumen for discontinuous-flow embodiments in which a single tube is used for fill and extraction and multi-lumen for continuous fill and extraction embodiments in which an inlet lumen is used for fill and one or more outlet lumens are used for extraction of separated components.

Once a desired degree of separation of whole blood has been achieved as determined by process timing and/or sensors, the present invention provides for the specific removal or extraction of the desired fraction within one or more of the regions from collection chamber of the centrifuge disposable through the outlet tube during continued rotation of the centrifuge, thereby allowing for on-line removal of the desired fraction. In continuous-flow embodiments, additional aliquots may be added to the centrifuge disposable via the inlet tube simultaneously or after the desired component has been harvested. Generally, in discontinuous-flow embodiments, the collection chamber of the centrifuge disposable is initially filled during a lower speed rotation, the collection chamber is then rotated at higher speeds to achieve a desired separation or outward packing of heavier components, the desired fluid components are then collected (often with the aid of sensors), the collection chamber is emptied, and the collection chamber is refilled to begin additional separation processes (often the collection chamber and centrifuge disposable will be replaced prior to a next processing of fluid, e.g., blood).

According to an important aspect of the invention, the separation assembly or centrifuge disposable is configured to be volume insensitive by providing ongoing or self-balancing and to be hemocrit insensitive by facilitating the accurate collection of a desired component (such as plasma) without unwanted components (such as red blood cells). To provide ongoing balancing, the separation assembly preferably has two or more collection chambers or reservoirs that are simultaneously filled or drawn down (or two or more inlet ports to a single chamber). In one embodiment, two elongated collection chambers are provided and positioned such that their central axes substantially coincide. Further, a single fill line is provided that branches to an inlet/outlet port on the outboard end of each collection chamber (although in multi-lumen tubing embodiments, the inlet lumen terminates at a point in the chamber interior to the outlet lumen) or at points about 180 degrees apart. In other embodiments, 3 or more collection chambers are provided and are equidistantly positioned to provide similar ongoing balancing (e.g., three collection chambers may be provided spaced about 120 degrees apart or four collection chambers may be provided spaced about 90 degrees apart).

To facilitate component collection or hemocrit insensitivity, each collection chamber preferably combines an elongated portion for providing a larger volume reservoir with an outboard or outer collection portion that has tapered sides that angle inward toward the central axis of the collection chamber. In one embodiment, the inner, elongated portion is cylindrical in shape with smooth walls that extend substantially parallel to the chamber central axis while the adjoining outer, collection portion is conical in shape with a taper or angle selected based on the size of the cells or components being collected. At the most outboard or outer location on the collection portion, the collection chamber includes a port or connection point for the lumen tubing. The conical shape of the outer collection portion creates tapered inner walls in the chamber that allows small percentage components (such as platelets and white blood cells) to be collected in a smaller volume portion of the chamber. This is important for sensing where two separate component volumes mate or contact because the small volume components will have a larger radial component within the collection chamber in the conical collection portion near the port than in the larger volume straight-walled inner portion. Hence, for identifying and collecting very small components in a separated fluid, a larger taper is preferred to provide a smaller collection volume in the chamber near the port. A sensor, such as a visible red LED, is typically provided in the outer collection portion adjacent the port to detect interfaces between separated components.

In one embodiment, accurate collection of fluid components is enhanced by providing a trap in the lumen tubing to control the flow of more dense components. For example, red blood cells tend to pack in the outer collection portion and then flow outward into the lumen tubing during higher speed rotation of the centrifuge. To block unwanted flow of separated components, one embodiment of the separation assembly includes a trap in the lumen tubing exterior and adjacent to the port of the collection chamber. The trap may take a number of configurations and in a preferred embodiment, the trap is a "U" shape in the tubing which acts to pack red blood cells or other heavier components. A trap is provided at each outer port to a collection chamber to provide this effective flow control to each collection chamber and control contamination or mixing of separated components.

Additional objects and novel features of this invention shall be set forth in part in the description and examples that follow, and in part will become apparent to those skilled in the art upon examination of the following or may be learned by the practice of the invention. The objects and the advantages of the invention may be realized and attained by means of the instrumentalities and in combinations particularly pointed out in the appended claims.

BRIEF DESCRIPTION OF THE DRAWINGS

The accompanying drawings, which are incorporated in and form a part of the specifications, illustrate the preferred embodiments of the present invention, and together with the description serve to explain the principles of the invention. In the Drawings.

DETAILED DESCRIPTION OF THE PREFERRED EMBODIMENT

Figure 1:
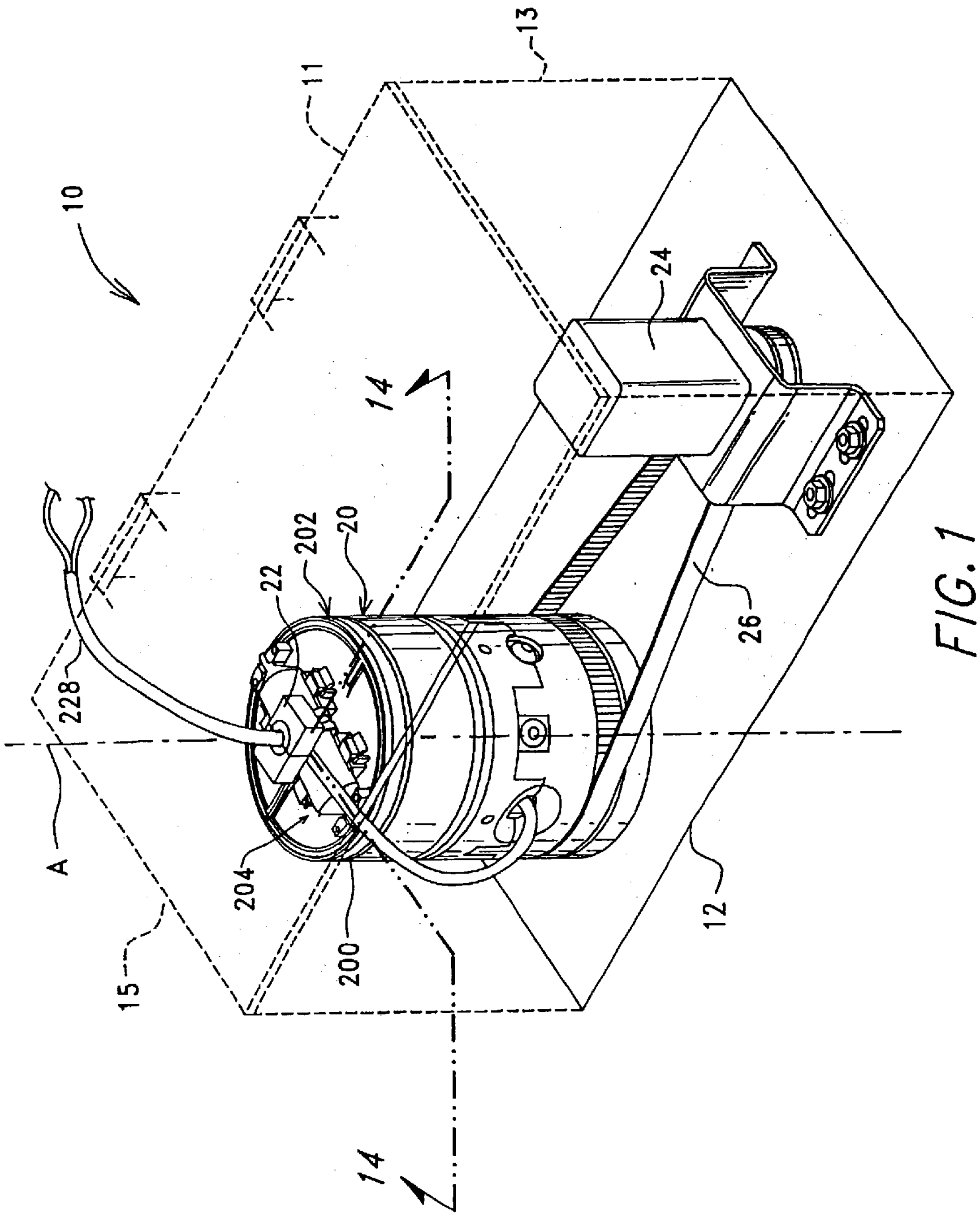
FIG. 1 is a perspective view illustrating one embodiment of the continuous-flow centrifugal processing system of the present invention illustrating a centrifuge and side-mounted motor and one embodiment of a separation assembly with two collection chambers mounted on the rotor assembly.

The centrifugal processing system 10 of the present invention is best shown in FIG. 1 having a stationary base 12, a centrifuge 20 rotatably mounted to the stationary base 12 for rotation about a predetermined axis A, a mounting assembly 202 for receiving a centrifuge disposable or components of a separation assembly 204 designed for noncontinuous and continuous-flow processing. As illustrated, the centrifugal processing system 10 includes a protective enclosure 11 comprising the main table plate or stationary base 12, side walls 13, and a removable lid 15 made of clear or opaque plastic or other suitable materials to provide structural support for components of the centrifugal processing system 10, to provide safety by enclosing moving parts, and to provide a portable centrifugal processing system 10. The centrifugal processing system 10 further includes a clamp 22 mounted over an opening (not shown) in the lid 15. Clamp 22 secures at a point at or proximately to axis A without pinching off the flow of fluid that travels through umbilical cable 228. A side mounted motor 24 is provided and connected to the centrifuge 20 by way of a drive belt 26 for rotating the drive shaft assembly 28 (see FIG. 2) and the interconnected and driven rotor assembly 200 in the same rotational direction with a speed ratio selected to control binding of umbilical cable 228 during operation of the system, such as a speed ratio of 2:1 (i.e., the rotor assembly 200 rotates twice for each rotation of the drive shaft assembly 28).

Figure 2:
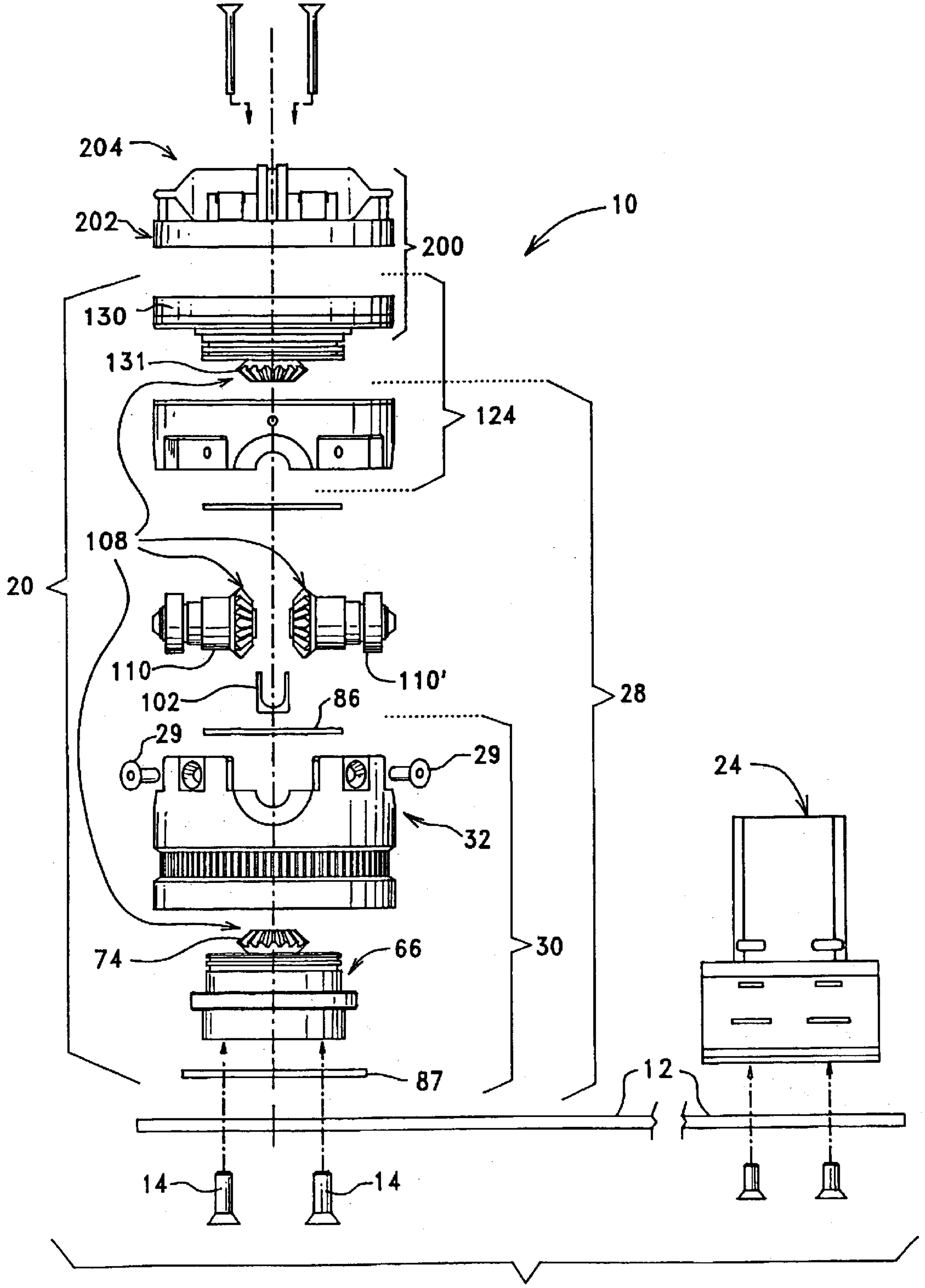
FIG. 2 is an exploded side view of the centrifuge and the side-mounted motor of the centrifugal processing system of FIG. 1 illustrating the individual components of the centrifuge and particularly, the separation assembly showing the elongated inner portions and conical outer portions of the collection chamber(s) and the mounting assembly for positioning the components of the separation assembly relative to the centrifuge.

Referring now to FIG. 2, the continuous-flow centrifugal processing system 10 comprises a centrifuge 20 to which a mounting assembly 202 is removably or non-removably attached. The mounting assembly 202 is illustrated supporting a separation assembly 204 (which will be explained in detail with reference to FIGS. 15–18). The design of centrifuge 20 and its self-contained mid-shaft gear assembly 108 (comprised of gears 110, 110', 131, and 74) allows for the compact size of the entire centrifugal processing system 10 and provides for a desired speed ratio between the drive shaft assembly 28 and the rotor assembly 200.

The centrifuge 20 is assembled, as best seen in FIG. 2, by inserting the lower bearing assembly 66 into lower case shell 32 thus resulting in lower case assembly 30. Cable guide 102 and gears 110 and 110' are then positioned within lower case assembly 30, as will be discussed in more detail below, so that gears 110 and 110' are moveably engaged with lower bearing assembly 66. Upper bearing assembly 130 is then inserted within top case shell 126 thus resulting in bearing assembly 124 which is then mated to lower case assembly 30, such that gears 110 and 110' are also moveably engaged with upper bearing assembly 130, and held in place by fasteners 29. Lower bearing assembly 66 is journaled to stationary base or main table plate 12 by screws 14, thus allowing centrifuge 20 to rotate along an axis A, perpendicular to main table plate 12 (as shown in FIG. 1).

Figure 3:
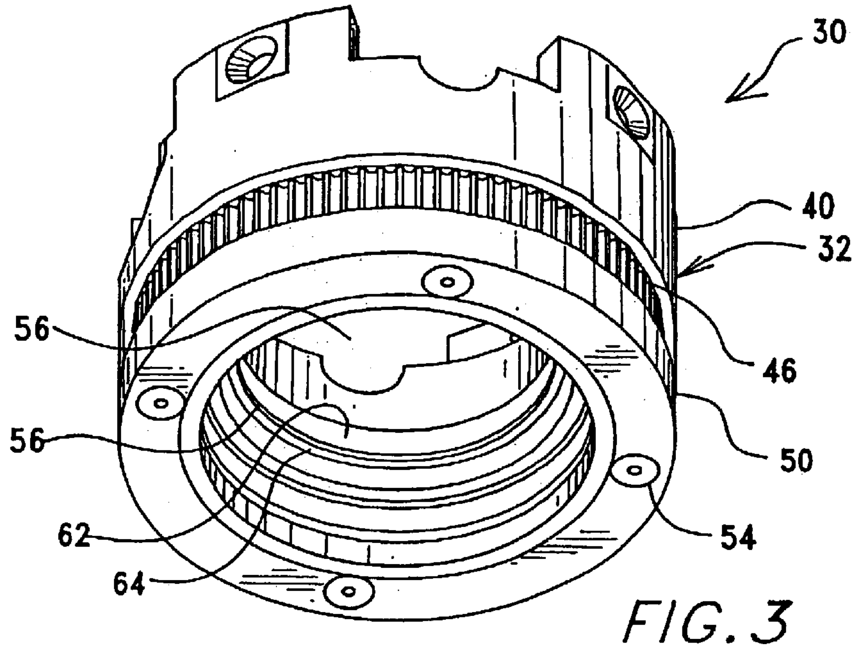
FIG. 3 is a partial perspective view of the lower case assembly of the drive shaft assembly of FIG. 2.
Figure 4:
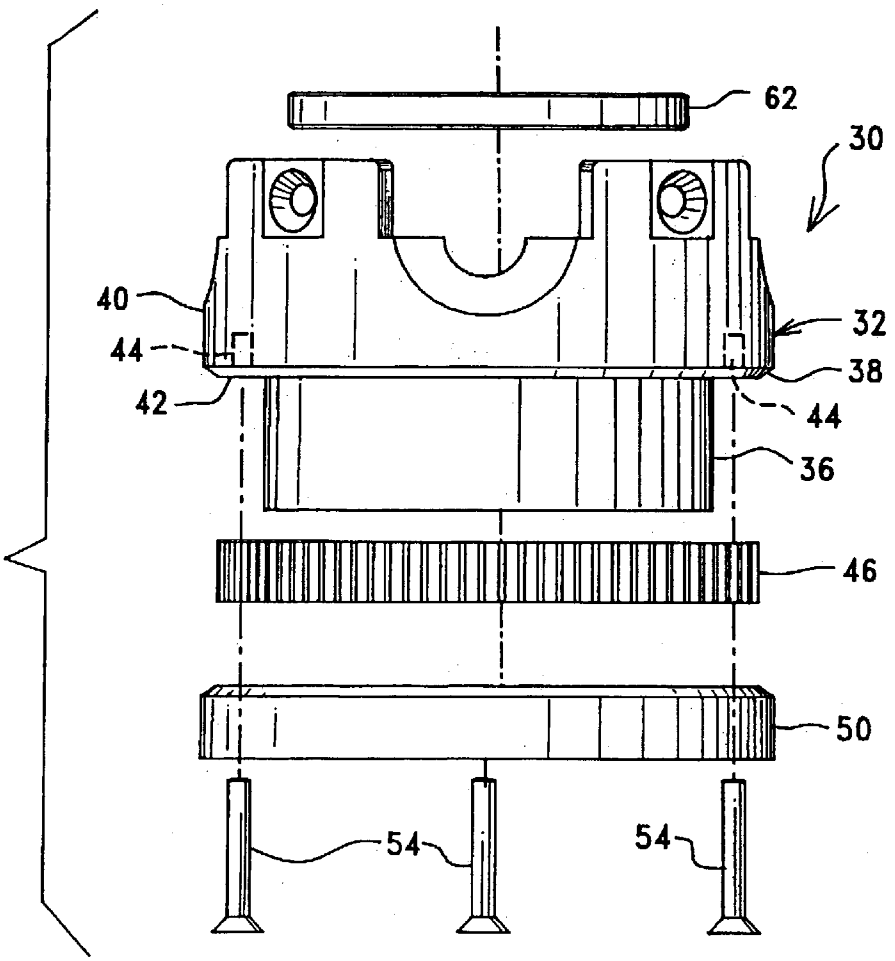
FIG. 4 is an exploded side view of the lower case assembly of FIG. 3.
Figure 5:
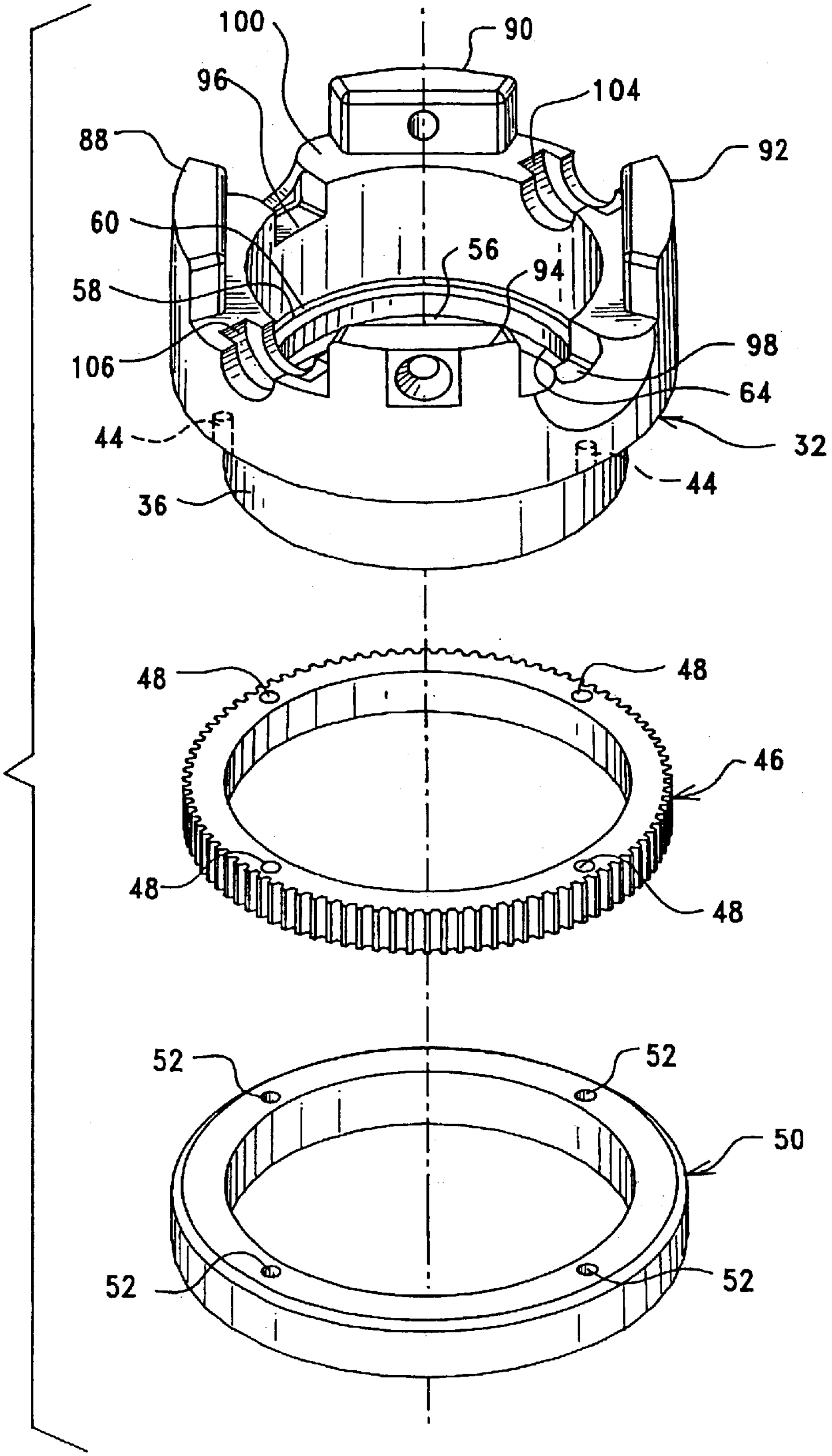
FIG. 5 is an exploded perspective view of the components of the lower case assembly of FIG. 3.
Figure 6:
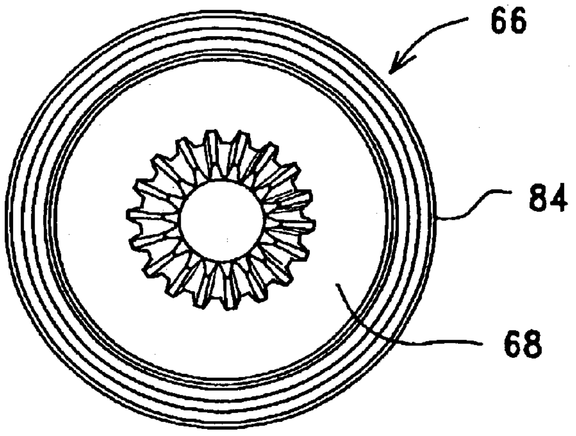
FIG. 6 is a top view of the lower bearing assembly which is positioned within the lower case assembly of FIG. 3.
Figure 7:
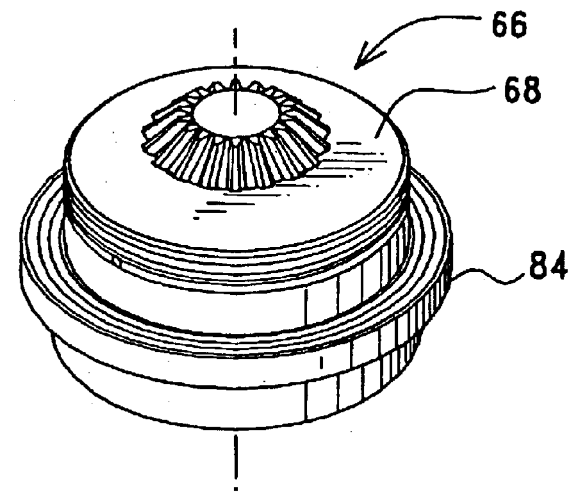
FIG. 7 is a perspective view of the lower bearing assembly of FIG. 6.
Figure 8:
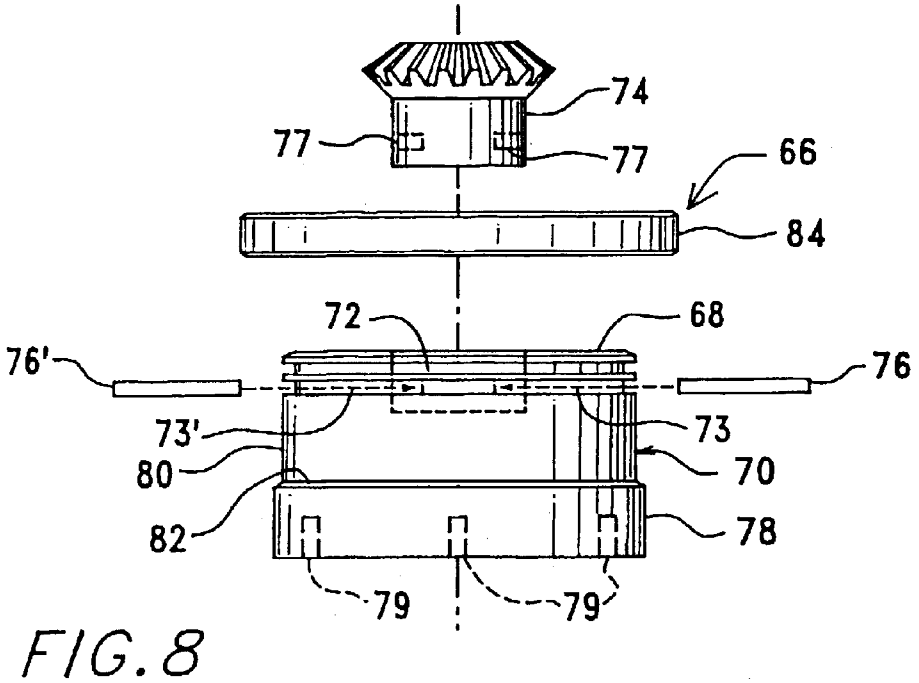
FIG. 8 is an exploded side view of the lower bearing assembly of FIGS. 6 and 7.

Referring now to FIGS. 3, 4, and 5, the lower case assembly 30 is preferably, but not necessarily, machined or molded from a metal material and includes a lower case shell 32, timing belt ring 46, timing belt flange 50, and bearing 62 (e.g., ball bearings and the like). Lower case shell 32 includes an elongated main body 40 with a smaller diameter neck portion 36 extending from one end of the main body 40 for receiving timing belt ring 46 and timing belt flange 50. The larger diameter main body 40 terminates into the neck portion 36 thereby forming an external shoulder 38 having a bearing surface 42 for timing belt ring 46. Timing belt ring 46 and timing belt flange 50, as best seen in FIG. 5, have inner diameters that are slightly larger than the outer diameter of neck portion 36 allowing both to fit over neck portion 36. Shoulder 38 further contains at least one and preferably four internally thread holes 44 that align with hole guides 48 and 52 in timing belt ring 46 and timing belt flange 50, respectively (shown in FIG. 5). Consequently, when assembled, screws 54 are received by hole guides 52 and 48 and are threaded into thread holes 44 thus securing timing belt 46 and timing belt flange 50 onto neck portion 36. Lower case shell 32 also has an axial or sleeve bore 56 extending there through, and an internal shoulder 58, the upper surface 60 of which is in approximately the same horizontal plane as external shoulder 38. Bearing 62 (shown in FIG. 4) is press fit concentrically into sleeve bore 56 so that it sits flush with upper surface 60. Internal shoulder 58 also has a lower weight bearing surface 64 which seats on the upper surface 68 of lower bearing assembly 66, shown in FIGS. 6–8.

Lower bearing assembly 66 comprises a lower gear insert 70, ball bearings 84, gear 74 and spring pins 76 and 76'. As will become clear, the gear 74 may be of any suitable gear design for transferring an input rotation rate to a mating or contacting gear, such as the gears 110, 110' of the mid-shaft gear assembly 108, with a size and tooth number selected to provide a desired gear train or speed ratio when combined with contacting gears. For example, the gear 74 may be configured as a straight or spiral bevel gear, a helical gear, a worm gear, a hypoid gear, and the like out of any suitable material. In a preferred embodiment, the gear 74 is a spiral gear to provide a smooth tooth action at the operational speeds of the centrifugal processing system 10. The upper surface 68 of lower gear insert 70 comprises an axially positioned sleeve 72, which receives and holds gear 74. Gear 74 is preferably retained within sleeve 72 by the use of at least one and preferably two spring pins 76 and 76' which are positioned within spring pinholes 73 and 73' extending horizontally through lower gear insert 70 into sleeve 72. Thus, when gear 74 having spring pin receptacles 77 and 77' is inserted into sleeve 72, the spring pins 76 and 76' enter the corresponding receptacles 77 and 77' thus holding the gear 74 in place. Of course, other assembly techniques may be used to position and retain gear 74 within the lower gear assembly 66 and such techniques are considered within the breadth of this disclosure. For example, gear 74 may be held in sleeve 72 by a number of other methods, such as, but not limited to being press fit or frictionally fit, or alternatively gear 74 and lower gear insert 70 may be molded from a unitary body.

The base 78 of lower gear insert 70 has a slightly larger diameter than upper body 80 of lower gear insert 70 as a result of a slight flare. This slight flare produces shoulder 82 upon which ball bearing 84 is seated. Once assembled lower bearing assembly 66 is received by sleeve bore 56 extending through neck portion 36 of lower case shell 32. A retaining ring 86 is then inserted into the annular space produced by the difference of the outer diameter of the lower bearing assembly 66 and the inner diameter of sleeve bore 56 above ball bearings 84. A second retaining ring 87 (shown in FIG. 2) is also inserted into the annular space produced by the difference between the outer diameter of the lower bearing assembly 66 and the inner diameter of sleeve bore 56 below ball bearing 84, thereby securing lower gear insert 70 within lower case shell 32. Consequently, ball bearings 62 and 84 are secured by retaining rings 86 and 87, respectively, resulting in lower case shell 32 being journaled for rotation about lower bearing assembly 66 but fixed against longitudinal and transverse movement thereon. Therefore, when assembled lower bearing assembly 66 is mounted to stationary base 12, by securing screws 14 into threaded holes 79 located in the base 78. Lower case shell 32 is thus able to freely rotate about stationary lower bearing assembly 66 when the drive belt 26 is engaged.

Figure 9:
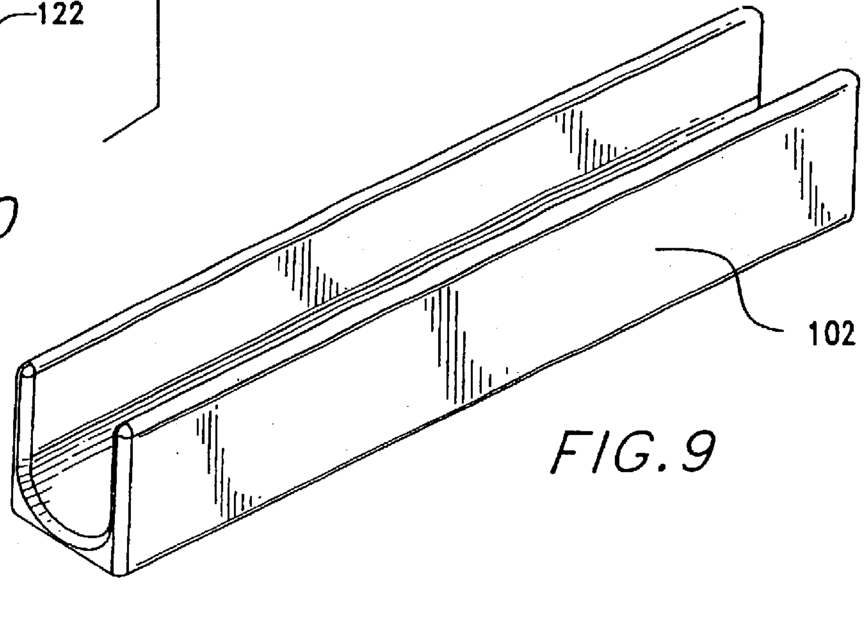
FIG. 9 is a perspective view of the receiving tube guide of the centrifuge of FIG. 2.

Referring now to FIG. 5, extending from the opposite end of neck portion 36 on lower case shell 32 are a number of protrusions or fingers 88, 90, 92, and 94. Positioned between protrusions 88 and 90, and between protrusions 92 and 94 are recessed slots 96 and 98, respectively, for receiving tube guide 102 (FIG. 9). The function of tube guide 102 will be discussed in further detail below, but in short it guides umbilical cable 228 connected to collection chamber(s) 226 through the mid-shaft gear assembly 108 and out of the centrifuge 20.

Figure 14:
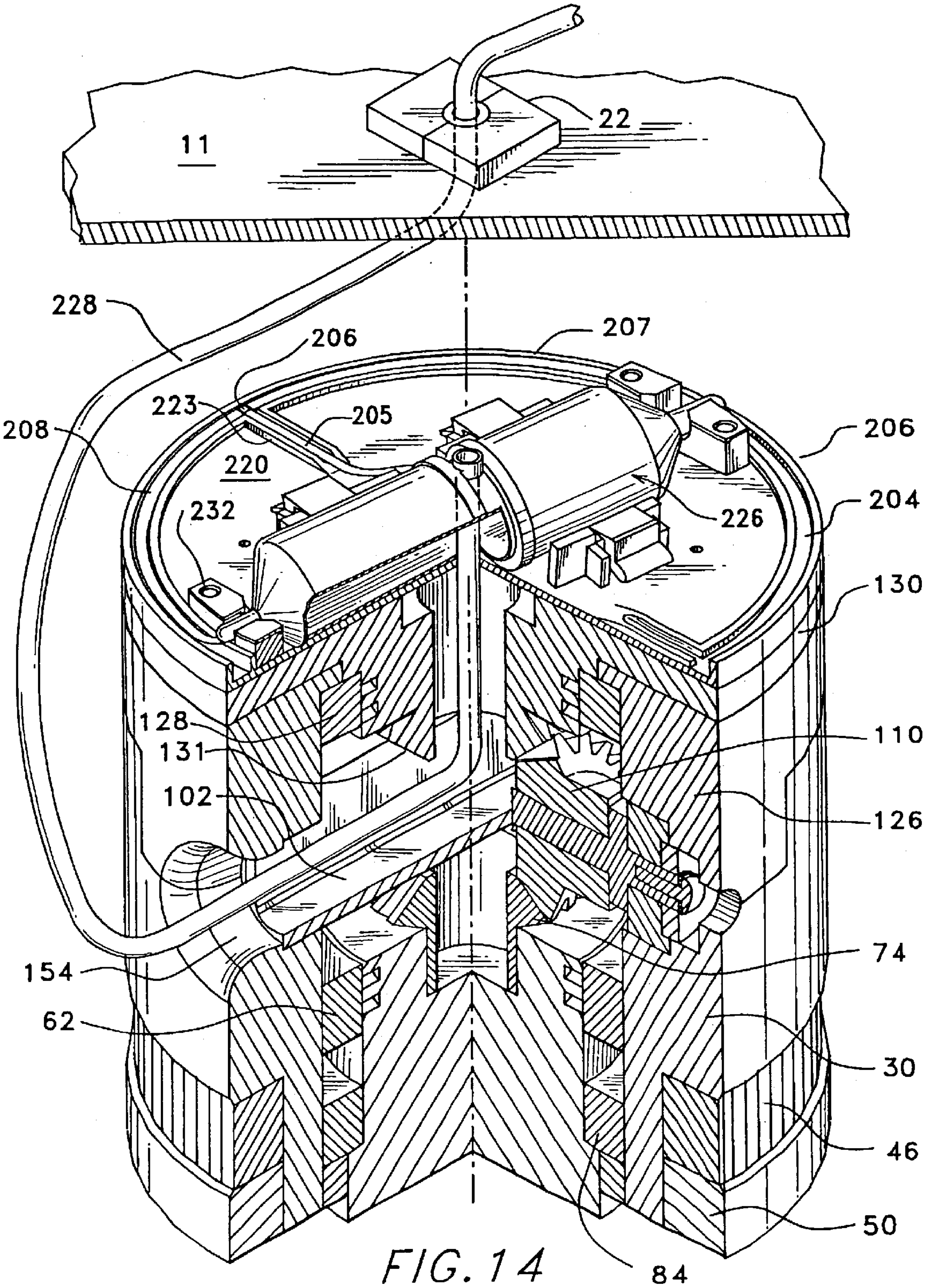
FIG. 14 is a perspective view of the centrifuge of the present invention shown in FIG. 1, having a quarter section cut away along lines 14—14 of FIG. 1.

Positioned between protrusions 90 and 92, and between protrusions 88 and 94 are recessed slots 104 and 106, respectively, for receiving gears 110 and 110' of mid-shaft gear assembly 108 (FIG. 2). The gears 110 and 110' are preferably configured to provide mating contact with the gear 74 and to produce a desired, overall gear train ratio within the centrifuge 20. In this regard, the gears 110 and 110' are preferably selected to have a similar configuration (e.g., size, tooth number, and the like) as the gear 74, such as a spiral gear design. As illustrated in FIGS. 2 and 14, mid-shaft gear assembly 108 comprises a pair of gears 110 and 110' engaged with gears 74 and 131. While the construction of gears and gear combinations is well known to one skilled in the mechanical arts, a brief description is disclosed briefly herein.

Figure 10:
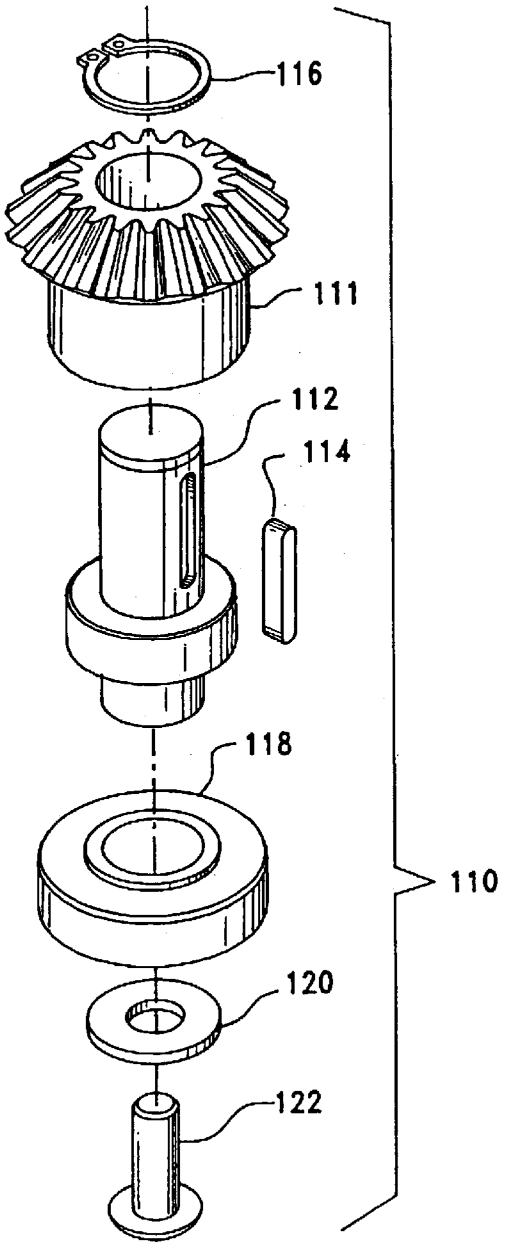
FIG. 10 is an exploded, perspective view of a gear of the mid-shaft gear assembly of FIG. 2.
Figure 11:
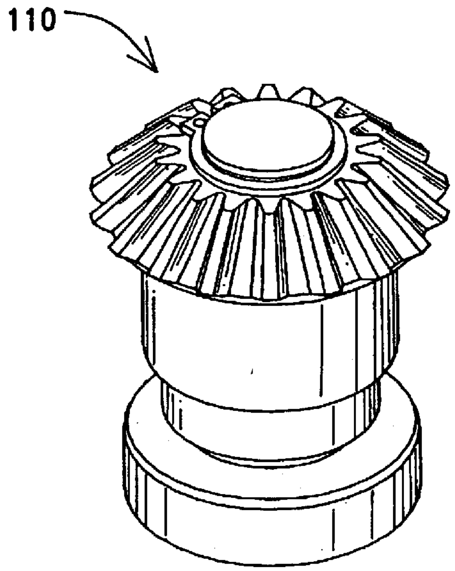
FIG. 11 is a perspective view of the gear of FIG. 10 as it appears assembled.

FIG. 10 illustrates an exploded view depicting the assembly of gear 110, and FIG. 11 is a perspective view of the gear 110 of FIG. 10 as it appears assembled. Gear 110' is constructed in the same manner. Gear 111 is locked onto mid-gear shaft 112 using key stock 114 and external retaining ring 116. Ball bearing 118 is then attached to mid gear shaft 112 using a flat washer 120 and cap screw 122. Recessed slots 104 and 106 of lower case shell 32 then receive ball bearing 118 and 118' (not shown). In an alternate embodiment ball bearing 118 can be replaced by bushings (not shown). When assembled, gears 110 and 110' make contact with the lower gear 74 (see FIGS. 2 and 14) to provide contact surfaces for transferring a force from the stationary gear 74 to the gears 110 and 110' to cause the gears 110 and 110' to rotate at a predetermined rate that creates a desired output rotation rate for the driven rotor assembly 200. The rotor assembly 200 is driven by the drive shaft assembly 28 which is rotated by the drive motor 24 at an input rotation rate or speed, and in a preferred embodiment, the drive shaft assembly 28 through the use of the gears 110 and 110' is configured to rotate the rotor assembly 200 at an output rotation rate that is twice the input rotation rate (i.e., the ratio of the output rotation rate to the input rotation rate is 2:1). This ratio is achieved in the illustrated embodiment by locking the gears 110 and 110' located within the drive shaft assembly 28 to rotate about the centrifuge center axis, A, with the lower case shell 32 which is rotated by the drive motor 24. The gears 110 and 110' also contact the stationary gear 74 which forces the gears 110, 110' to rotate about their rotation axes which are transverse to the centrifuge center axis, A, and as illustrated, the rotation axes of the gears 110, 110' coincide. By rotating with the lower case shell 32 and rotating about the gear rotation axes, the gears 110, 110' are able to provide the desired input to output rotation rate of 2:1 to the rotor assembly 200.

Figure 12:
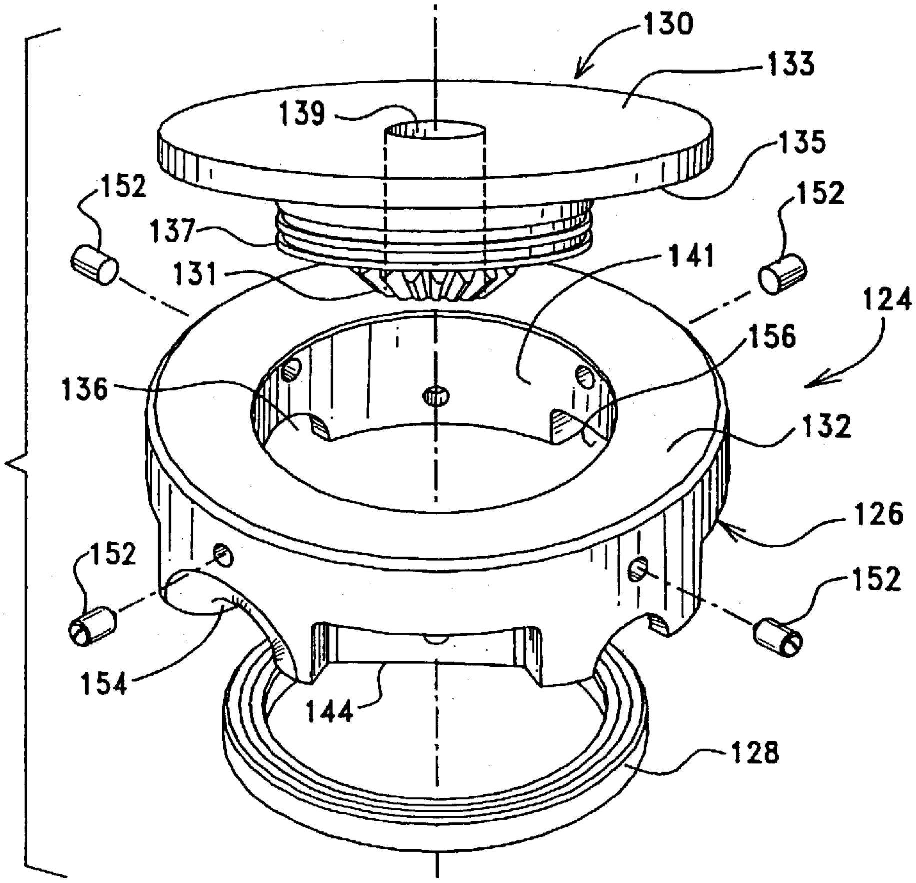
FIG. 12 is an exploded, perspective view of the top bearing assembly of the centrifuge of FIG. 2.
Figure 13:
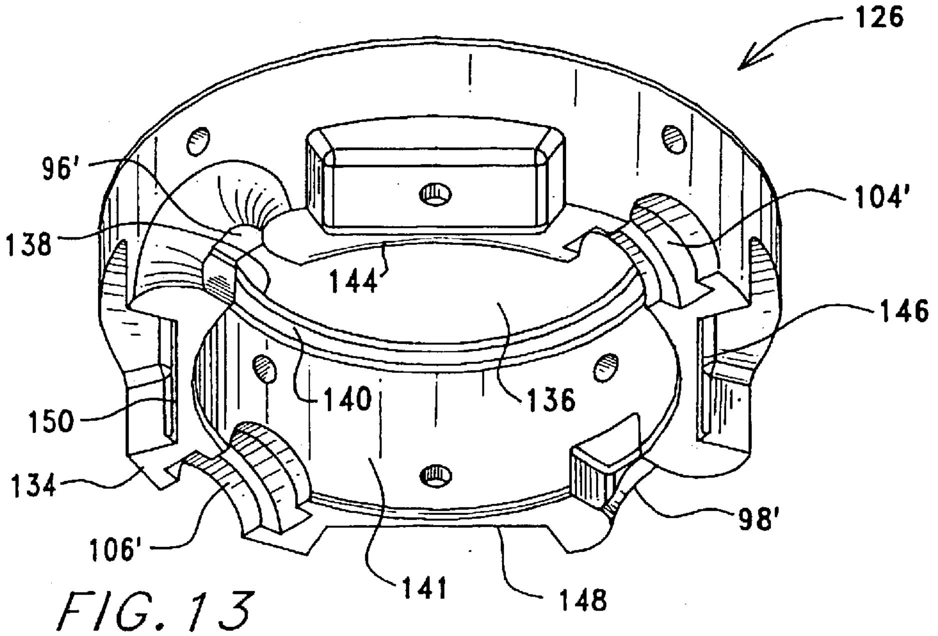
FIG. 13 is a perspective view of the top case shell of the top bearing assembly of FIG. 12.

In this regard, gears 110 and 110' and tube guide 102 are locked into position by attaching top bearing assembly 124 to lower case assembly 30. Top bearing assembly 124 (as shown in FIG. 12) comprises top case shell 126, ball bearing 128, and an upper bearing 130. Top case shell 126, as best seen in FIGS. 12 and 13, comprises an upper surface 132, a lower lip 134 and a central or axial bore 136 there through. Upper surface 132 slightly overhangs axial bore 136 resulting in a shoulder 138 having a lower surface 140 (shown in FIG. 13). Lower lip 134 is a reverse image of upper lip 100 on lower case shell 32 (shown in FIG. 5).

Upper bearing assembly 130 (FIG. 12) comprises an upper surface 133 and a lower surface 135 wherein the upper surface 133 has a means for receiving a rotor 202. On the lower surface 135 a concentrically positioned column 137 protrudes radially outward perpendicular to lower surface 135. Upper bearing assembly 130 further comprises an axially positioned bore 139 that traverses column 137 and upper surface 133 and receives upper gear insert 131. Upper gear insert 131 also contains an axial bore 142 and thus when positioned concentrically within column 137 axial bores 139 and 142 allow for umbilical cable 228 to travel through upper bearing assembly 130 of top case shell 126 down to cable guide 102 (shown in FIG. 14). As discussed previously with respect to lower bearing assembly 66, upper gear insert 131 may be any suitable gear design for receiving an input rotation rate from a mating or contacting gear, such as the gears 110, 110' of the mid-shaft gear assembly 108, with a size and tooth number selected to provide a desired gear train or speed ratio when combined with contacting gears. For example, gear insert 131 may be configured as a straight or spiral bevel gear, a helical gear, a worm gear, a hypoid gear, and the like. In a preferred embodiment, gear 131 is a spiral gear to provide a smooth tooth action at the operational speeds of the centrifugal processing system 10. Gear insert 131 is preferably retained within column 137 by use of at least one and preferably two spring pins (not shown); however, other assembly techniques may be used to position and retain the gear insert 131 within the column 137 and such techniques are considered within the breadth of this disclosure. For example, gear insert 131 may be held in column 137 by a number of other methods, such as, but not limited to being press fit or frictionally fit or alternatively gear insert 131 and the upper bearing assembly may be molded from a unitary body.

Upper bearing assembly 130 is then inserted into axial bore 136 of top case shell 126 so that the lower surface 135 sits flush with upper surface 132 of top case shell 126. Ball bearing 128 is then inserted into the annular space created between the outer diameter of column 137 and the inner side wall 141 of top case shell 126 thereby securing upper bearing assembly 130 into place.

Referring now to FIG. 13, lower lip 134 is contoured to mate with protrusions 88, 90, 92 and 94 extending from lower case shell 32. Specifically, the outer diameter of lower lip 134 matches the outer diameter of the upper end of main body 40 of lower case shell 32 and recesses 144 and 148 receive and retain protrusions 88 and 92 respectively, while recesses 146 and 150 receive and retain protrusions 94 and 88, respectively. Holes are placed through each recess and each protrusion so that when assembled, fasteners 152 (shown in FIG. 12) can be inserted through the holes thereby fastening the top bearing assembly 124 to the lower case assembly 30.

Positioned between recesses 144 and 146 and between recesses 148 and 150 are recessed slots 104' and 106', respectively, for receiving gears 110 and 110' of mid-shaft gear assembly 108 (FIGS. 2 and 14). The gears 110 and 110' are preferably configured to provide mating contact with the gear insert 131 and to produce a desired, overall gear train ratio within the centrifuge 20. In this regard, the gears 110 and 110' are preferably selected to have a similar configuration (e.g., size, tooth number, and the like) as the gear 131, such as a spiral gear design. Furthermore recessed slots 96' and 98' exist between recesses 144 and 150 and between recesses 146 and 148, respectively. When gears 110 and 110' are assembled as shown in FIG. 14, recessed slots 96 and 96' from the lower case shell 32 and top case shell 126, respectively, form port 154, and recessed slots 98 and 98' form port 156 thereby allowing the umbilical cable 228 to exit centrifuge 20 through either port 154 or 156. Described above is one method of assembling the centrifugal processing system 10 of the present invention; however, those skilled in the art will appreciate that the lower case assembly 30 and upper bearing assembly can be joined in number of ways that allow the four gears to be properly aligned with respect to one another.

In the above manner, the centrifugal processing system 10 provides a compact, portable device useful for separating blood and other fluids in an effective manner without binding or kinking fluid feed lines, cables, and the like entering and exiting the centrifuge 20. The compactness of the centrifugal processing system 10 is furthered by the use of the entirely contained and interior gear train described above that comprises, at least in part, gear 74, gears 110 and 110', and gear insert 131 of the upper bearing 130. The gear insert 131 of the upper bearing 130 is preferably selected to provide a contact surface(s) with the gears 110 and 110' that transfers the rotation rate of the gears 110 and 110' and consequently from gear 74 and to the gear insert 131 of the upper bearing 130. In one preferred embodiment, the gear insert 131 of the upper bearing 130 is a spiral gear rigidly mounted within the upper bearing 130 to rotate the rotor assembly 200 and having a design similar to that of the spiral gear 74, i.e., same or similar face advance, circular pitch, spiral angle, and the like. During operation, the gear 74 remains stationary as the lower case shell 32 is rotated about the centrifuge axis, A, at an input rotation rate, such as a rotation rate chosen from the range of 0 rpm to 5000 rpm. The gears 110, 110' are rotated both about the centrifuge axis, A, with the shell 32 and by contact with the stationary gear 74. The spiral gears 110, 110' contact the gear insert 131 of the upper bearing 130 causing the gear insert 131 and connected upper bearing 130 to rotate at an output rotation rate that differs, i.e., is higher, than the input rotation rate.

Although a number of gear ratios or train ratios (i.e., input rotation rate/output rotation rate) may be utilized to practice the invention, one embodiment of the invention provides for a gear train ratio of 1:2, where the combination and configuration of the gear 74, gears 110, 110', and gear 131 of the upper bearing 130 are selected to achieve this gear train ratio. Uniquely, the rotation of the gears 110, 110' positively affects the achieved gear train ratio to allow, in one embodiment, the use of four similarly designed gears which lowers manufacturing costs while achieving the increase from input to output rotation speeds. Similarly, as will be understood by those skilled in the mechanical arts, numerous combinations of gears in differing number, size, and configuration that provides this ratio (or other selected ratios) may be utilized to practice the invention and such combinations are considered part of this disclosure. For example, although two gears 110, 110' are shown in the mid-shaft gear assembly 108 to distribute transmission forces and provide balance within the operating centrifuge, more (or less) gears may be used to transmit the rotation of gear 74 to the gear of the upper bearing 130. Also, just as the number, size, and configuration of the internal gears may be varied from the exemplary illustration of FIGS. 1–14, the material used to fabricate the gear 74, the gears 110, 110', and the gear insert 131 may be any suitable gear material known in the art.

Another feature of the illustrated centrifugal processing system 10 that advantageously contributes to compactness is the side-mounted drive motor 24. As illustrated in FIGS. 1 and 2, the drive motor 24 is mounted on the stationary base 12 of the enclosure 11 adjacent the centrifuge 20. The drive motor 24 may be selected from a number of motors, such as a standard electric motor, useful for developing a desired rotation rate in the centrifuge 20 of the centrifugal processing system 10. The drive motor 24 may be manually operated or, as in a preferred embodiment, a motor controller may be provided that can be automatically operated by a controller of the centrifugal processing system 10 to govern operation of the drive motor 24 (as will be discussed in detail with reference to the automated embodiment of the invention). As illustrated in FIG. 1, a drive belt 26 may be used to rotate the drive shaft assembly 28 (and, therefore, the rotor assembly 200). In this embodiment, the drive belt 26 preferably has internal teeth (although teeth are not required to utilize a drive belt) selected to mate with the external teeth of the timing belt ring 46 of the lower case assembly 30 portion of the drive shaft assembly 28. The invention is not limited to the use of a drive belt 26, which may be replaced with a drive chain, an external gear driven by the motor 24, and any other suitable drive mechanisms. When operated at a particular rotation rate, the drive motor 24 rotates the drive shaft assembly 28 at nearly the same rotation rate (i.e., the input rotation rate). A single speed drive motor 24 may be utilized or in some embodiments, a multi and/or variable speed motor 24 may be provided to provide a range of input rotation rates that may be selected by the operator or by a controller to obtain a desired output rotation rate (i.e., a rotation rate for the rotor assembly 200 and more specifically, the attached mounting assembly 202 that is rigidly supporting and positioning the separation assembly 204).

The present invention generally includes an apparatus for the separation of a predetermined fraction(s) from a fluid medium utilizing the principles of centrifugation. Although the principles of the present invention may be utilized in a plurality of applications, one embodiment of this invention comprises isolating predetermined fraction(s) (e.g., platelet rich plasma or platelet poor plasma) from anticoagulated whole blood. The platelet rich plasma may be used, for example, in the preparation of platelet concentrate or gel, and more particularly may be used to prepare autologous platelet gel during surgery using blood drawn from the patient before or during surgery.

The centrifuge 20 has been discussed above and demonstrates the compact and portable aspects of the present invention. To complete the device of the present invention a fluid collection device is attached to the upper surface 133 to be in fluid communication with the umbilical cable 228 to receive fluids, such as blood, during fill operations and to allow separated fluid components to be drawn out or extracted. The described features are suited for non-continuous flow embodiments utilizing a single lumen umbilical cable 228 in which the collection device is filled with liquid medium to be centrifuged, centrifuging is performed (in one or more steps), and removal of separated components is performed (in one or more steps). The features of the collection device are also useful for continuous flow operations and configurations utilizing a multi-lumen umbilical cable 228 in which fill, separation, and component extraction can all occur concurrently. Some of the differing lumen arrangements are discussed in detail in later portions of this description.

Figure 15:
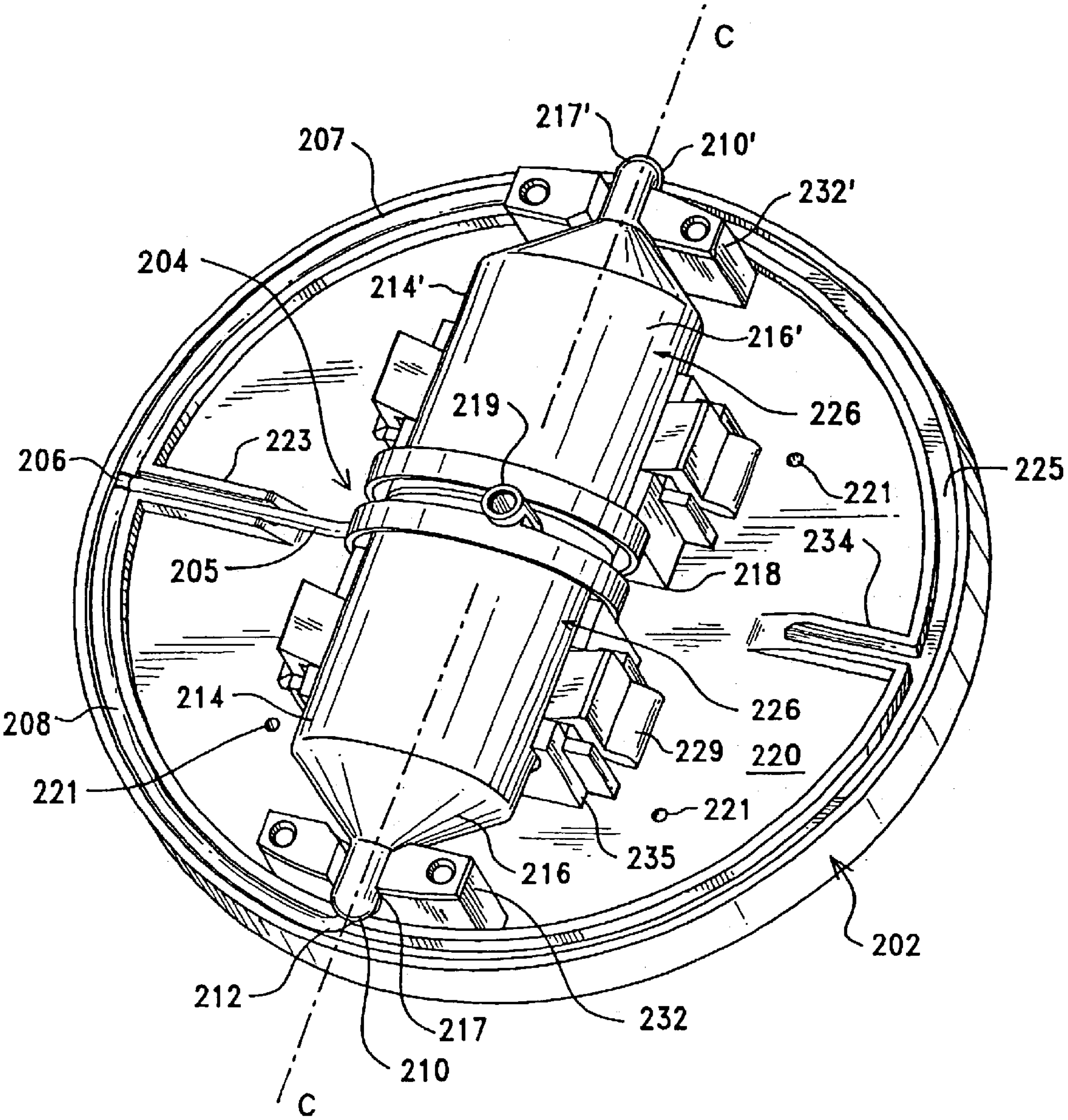
FIG. 15 is a perspective view of one embodiment of a mounting assembly physically securing a separation assembly of FIG. 1.

Referring to FIGS. 15–18, an embodiment of a mounting assembly 202 particularly useful for use with the centrifuge 20 described thus far is illustrated. The mounting assembly 202 is configured to be mounted to the upper surface 133 of the rotor assembly 130, to physically secure and position the components of the separation assembly 204 for proper balanced rotation within the rotor assembly 200, and to facilitate quick installation and removal of the separation assembly (which is preferably disposable and called the centrifuge disposable). FIG. 15 illustrates the mounting assembly 202 positioning and supporting a dual chamber embodiment of the separation assembly 204. As discussed previously, the separation assembly 204 is designed to uniquely provide the self-balancing and enhanced component extraction features of the present invention.

Figure 17:
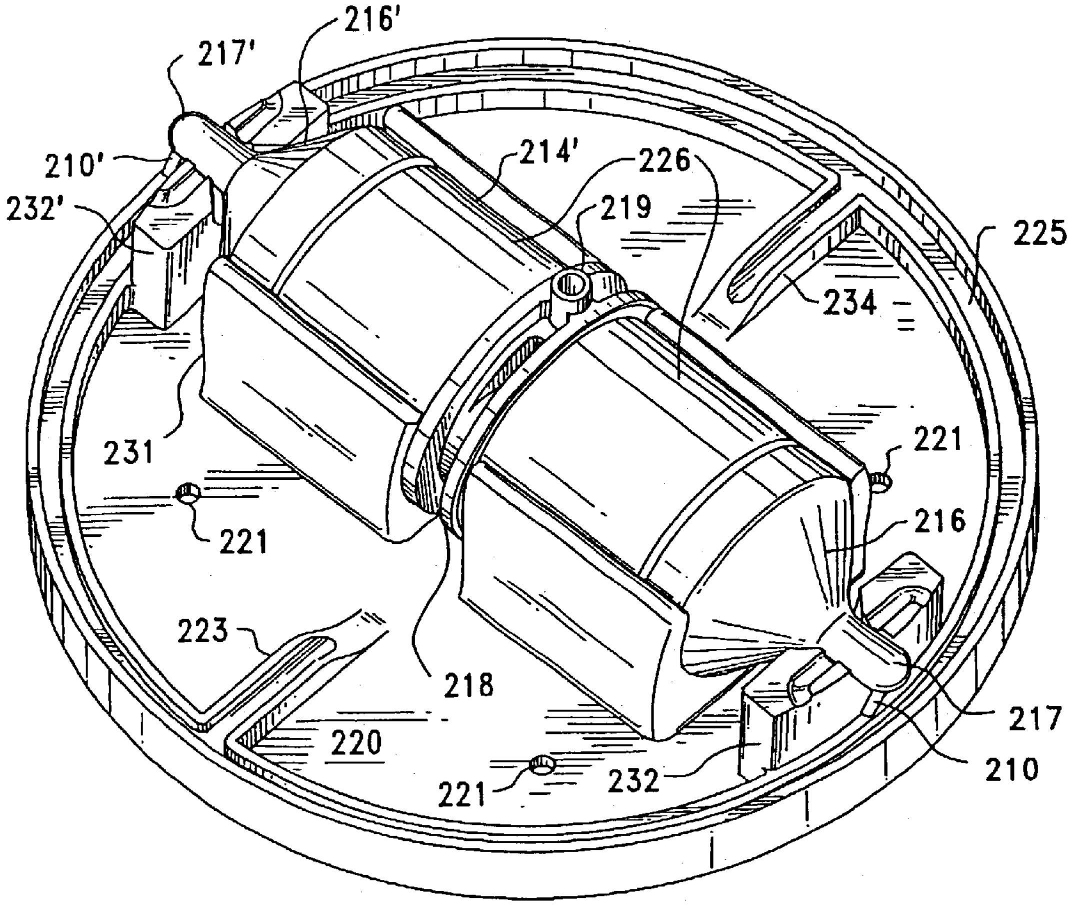
FIG. 17 is another perspective view of the mounting assembly with alternate saddle supports retaining the collection chambers of the separation assembly of FIG. 15.
Figure 18:
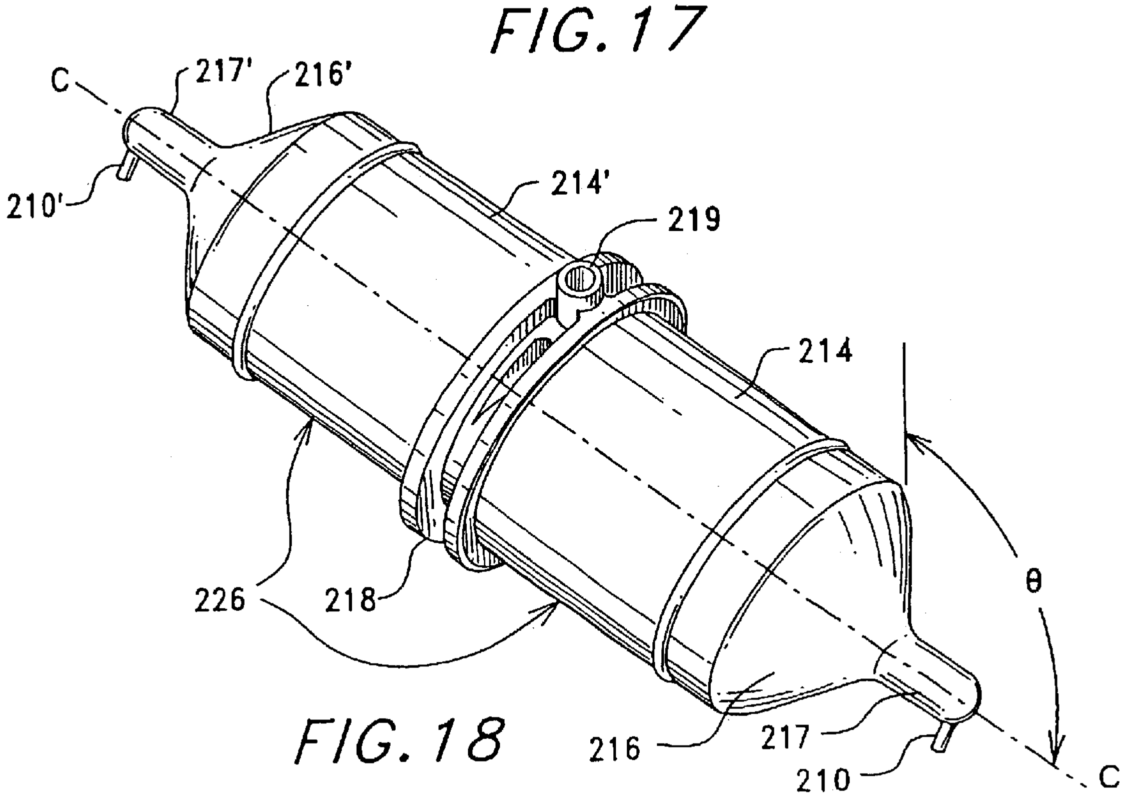
FIG. 18 is a perspective view of the collection chambers of the separation assembly of FIG. 15 illustrating the conical collection portion and nipple or sensing portion and taper angle of the collection portion that provides a reduced collection volume in areas of the collection chamber near the ports and sensors.

In this regard, the separation assembly or centrifuge disposable 204 illustrated in FIGS. 15, 17, and 18 is fluidically linked to the umbilical cable 228 (not shown) with lumen tubing 205. A tee 206 is included to branch fluid being fed or extracted from the separation assembly 204 into two additional lumen tubing runs 207, 208. Significantly, the tee 206 is positioned along or at the outer circumference of the separation assembly 204 within the peripheral trough 225. This enables the separation assembly 204 to equally distribute input liquid by volume and by component content. The separation assembly 204 also is then able to operate with self-leveling within all collection chambers 226 (i.e., the levels or quantities of each liquid component or fraction is substantially equivalent) which allows product to be extracted or removed from each chamber 226 concurrently without contamination. In some embodiments, self-leveling is relied upon to eliminate the need for sensing in all chambers 226 and only one chamber 226 is monitored for separation interfaces between liquid components. The lumen tubing runs 207, 208 are in turn connected (such as by slipping tubing over an extending opened portion of the chambers 226) to outboard ports 210, 210' on the collection chambers 226.

A trap 212 is provided adjacent each port 210, 210' to control undesirable back or outward flow of denser components during separation processes. For example, if it is desired to collect white blood cells and/or platelets, it may be undesirable to allow red blood cells to flow upstream within the lumen tubing runs 207, 208 during higher speed rotations. Instead the traps 212 are provided which become filled or packed with the more dense particles during each separation cycle. In a preferred embodiment, the trap 212 is a "U" shape in the lumen tubing runs 207, 208 (instead of a 90 degree or less turn from the ports 210, 210') in which the tubing is brought at least partially below the plane of the lumen tubing runs 207, 208. In this manner, the trap 212 provides a manometer-like affect to block or cork the port and facilitate detection and collection of less dense components which float in the collection chambers 226 adjacent the ports 210, 210' rather than entering the lumen tubing runs 207, 208 during separating steps (which can also be considered as contaminating the denser components). The trap 212 may not be required for all embodiments of the separation assembly 204 but has proven useful during starting and stopping centrifuge operations when compacted, denser components are more likely to slosh or surge into the tubing 207, 208.

Significantly, the collection chambers 226 are adapted to provide a relatively large volume for receiving liquid mediums to be centrifuged while also facilitating collection of small percentage components. For example, it may be desirable to collect white blood cells and/or platelets from whole blood, but these components often only comprise about 1 percent of the blood by volume. Hence, the collection chambers 226 are designed to facilitate collection and detection of components even when they represent a small portion of the overall volume in the collection chambers. In this regard, the collection chambers 226 include an elongated inner portion 214, 214' that provide a larger reservoir for receiving the liquid medium to be separated. A number of shapes may be utilized for the inner portions 214, 214', and in the illustrated embodiment, the inner portions 214, 214' are cylindrical in shape with side walls that are substantially straight and parallel to the axis, C. Of course, the inner portions 214, 214' may have some taper or slope.

The collection chambers 226 include an outer collection portion 216, 216' that is tapered to provide a smaller collection volume near the ports 210, 210'. As can be appreciated, this smaller volume is useful for collecting small volume components from a fluid medium because when the smaller volume component is packed into the smaller volume collection portion 216, 216' the collected or packed components extend further out from the ports 210, 210'. In other words, the packed, small volume component (such as white blood cells and platelets) has a larger radial component that is more readily detected by a sensor. To ease manufacture and facilitate flow of components under centrifugal forces as they hit or are urged against outer walls of the collection chambers, the collection chambers 226 are typically fabricated as a single molded product, such as from well-known plastics, to be relatively rigid and to have smooth inner surfaces. As illustrated, the outer collection portions 216, 216' are conical in shape with a circular cross-sectional shape. The amount of taper, as measured by taper angle θ from the central axis C of the collection chambers 226, may vary widely to practice the invention and is selected to suit the size and volume of the small percentage components being collected.

To obtain even further collection accuracy, the conical outer collection portions 216, 216' may connect to small nipple or sensing portions 217, 217'. Typically, this sensing portion 217, 217' will also be tapered but tapering is not required and will be significantly reduced in volume (e.g., cross-sectional area) as compared to the elongated inner portions 214, 214'. The sensing portions 217, 217' contain the ports 210, 210' and when the separation assembly 204 is positioned within the mounting assembly 202 are positioned adjacent any included sensors (as will be discussed below with reference to the mounting assembly 202). Although the ports 210, 210' are shown at right angles to the ends of the nipples 217, 217', the ports 210, 210' could be at the end of the nipples 217, 217' with a socket or other connection to the tubing 207, 208 or numerous other angles and/or geometries that may be desirable in some applications.

The illustrated configuration for the separation assembly 204 provides balanced rotation during centrifuge 20 operations, including self-balancing of the fluid in the collection chambers 226. This is achieved by including two collection chambers 226 that are similar in volume and size and that are positioned equidistantly (symmetric about a plane containing the centrifuge central axis A). With the dual collection chamber arrangement shown, the collection chambers 226 are positioned such that their central axes coincide, i.e., become the collection chamber axis, C, as shown. In multi-chamber embodiments (not shown), the collection chambers 226 again would preferably be similar in shape and weight and be position equidistantly about the central axis, A, of the centrifuge 20. Additionally, the collection chambers 226 each contain a port 210, 210' and the lumen tubing runs 207, 208 and tubing 205 (which make up the inlet and outlet lines) enable concurrent filling and emptying of the two collection chambers 226. During operation, a substantially equal amount of fluid flows in the tubing runs 207, 208 to provide a leveling affect that maintains the fluid volume in each collection chamber 226 at about the same quantity. The tubing runs 207, 208 act to fluidically connect the two collection chambers 226 along the outer circumference of the separation assembly 204 which enhances the above leveling affect (but this connection point is not required for practicing the invention).

The separation assembly 204 shown includes two collection chambers 226 that are separated centrally by plug 218. In dual or multi-chamber arrangements, the plug 218 is useful for controlling mixing of fluid in the chambers 226 (especially during starting and stopping) which may affect proper liquid balancing. The illustrated plug 218 also includes a vent 219 that is in communication with both collection chambers 226 to provided equalized venting of gases to further facilitate equal filling and emptying of the chambers 226 to control balanced operations. The vent 219 may take many shapes and may or may not be a biological vent. The vent 219 can be mounted in the center of the collection chambers 226 (such as in the plug 218) or can be mounted with a discharge in one chamber 226 as long as the vent is in communication with all included chambers 226 to provide equalized pressure in the chambers 226. The plug 218 also is fabricated to provide a space or trough for allowing the lumen tubing 205 to pass up from the rotor assembly 130 and, in some cases, to physically restrain the tubing 205 from unwanted side-to-side movement.

Figure 16:
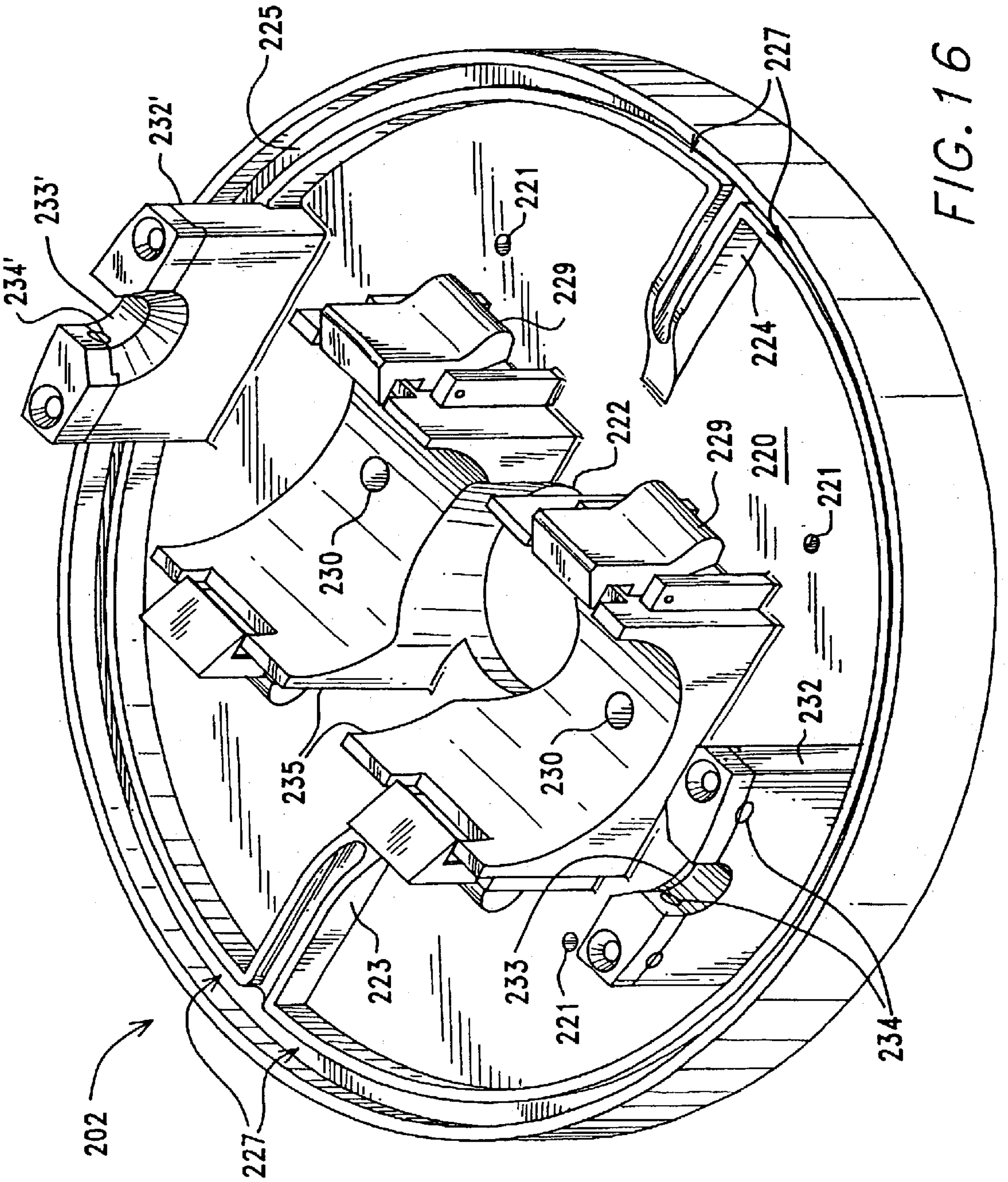
FIG. 16 is a perspective view of the mounting assembly of FIG. 15 illustrating the saddle supports and lumen troughs used to position the separation assembly of the present invention relative to the rotor assembly and centrifuge.

The mounting assembly 202, shown best in FIGS. 15 and 16, functions to mount the separation assembly 204 to the rotor assembly 130 with ready connection to the separation assembly 204 components and structure, to position the separation assembly 204 for balanced spinning during operation of the centrifuge 20, and to allow easy insertion and removal of the separation assembly 204. Hence, the specific structures included in the mounting assembly 202 may be varied widely to position and restrain the components of the separation assembly 204. For example, restraining devices such as snaps, clamps, hinges, or other mechanical devices useful for physically contacting the components and that facilitate manual or automated release of the separation assembly 204 may be used.

As illustrated, the mounting assembly 202 includes a mounting plate 220 which is rigidly connected (with screws and the like) via holes 221 to the upper surface 133 of the rotor assembly 130. The mounting plate 220 includes a central hole 222 to provide passage for the umbilical cable 228 from the rotor assembly 130 to the separation assembly 204. To firmly support and position the lumen tubes 205, 207, 208, the mounting plate 220 includes integral or attached interior troughs 223, 224 and peripheral trough 225, respectively, with a depth and width of substantially the outer diameter of the tubing 205, 207, 208. The peripheral trough 225 has a greater depth at the locations indicated at by arrow 227 to provide a recessed surface to create the trap 212 in the tubing 207, 208. The peripheral trough extends about the entire circumference of the mounting plate 220 for ease of manufacture and to enhance symmetry and balance of the mounting assembly 202. Likewise, two interior troughs 223, 224 are provided to enhance symmetry and balance of the mounting assembly 220 and to ease insertion of a separation assembly 204 which can be inserted with the lumen tubing 205 in either interior trough 223, 224.

Referring to FIG. 16, the mounting assembly 202 illustrated includes two saddle supports 235 attached to the mounting plate 220 to receive and support the elongated inner portions 214, 214' of the collection chambers 226. These saddle supports 228 are arranged on the mounting plate 220 to align the collection chambers 226 to each other and to position the chambers 220 relative to the lumen tubing 205, 207, 208. To provide physical restraint or attachment during spinning operations, each saddle support 235 includes a pair of releasable side fasteners 229 that can be manually engaged to rigidly hold the chambers 226 against the saddle supports 235 or be configured to snap against the chambers 226 when they are inserted. The side fasteners 229 can then be manually released by pressing on a toggle end portion. To assist in releasing or removing the chambers 226, springs or spring-loaded plungers (not shown) may be provided in the holes 230. In an alternative embodiment, the saddle support 231, as shown in FIG. 17, are fabricated from a resilient material with at rest dimensions slightly smaller than the outer diameter of the collection chambers 226 to achieve a press or snap fit of the chambers 226 in the saddle supports 231.

It is important, at least in some embodiments of the centrifuge 20, to be able to sense the interface or boundary between separated components (such as during separation or extraction of components). In this regard, the mounting assembly 202 includes sensor supports 232, 232' which act to support and position the portion of the collection chamber 226 near the ports 210, 210' and also to direct light used in sensing. In the illustrated embodiment, the sensor supports 232, 232' include recessed surfaces 233, 233' for receiving and mating (e.g., aligning) with the sensing portions 217, 217' of the collection chambers 226. Light guides 234, 234' are provided in the sensor supports to receive light from a source, to guide it through a turn of about 90 degrees to direct the light through the liquid in the sensing portions 217, 217', to guide the light after it has passed through the liquid through another 90 degree turn, and return the light to a receiver (not shown). Of course, different angles and geometries may be used for the light guides 234, 234' to direct the light through the sensing portion 217, 217' and may include one or more bends or combinations of bends to achieve a desired light route through the mounting assembly 202 and the chambers 226. Sensors useful within the centrifuge 20 and with the mounting and separation assemblies 202, 204 are described in detail with reference to FIGS. 32–37.

The positioning of the light guides 234, 234' in the sensor supports 232, 232' is useful for allowing sensing of liquid in a very small volume portion of the collection chambers 226 which enables smaller volume constituents of a liquid to be detected and successfully extracted with minimal mixing with other liquid constituents. Of course, in many embodiments, it may be useful to position the light guides 234, 234' at other locations along the collection chambers 226 or to provide additional sensing capabilities (which may be useful for multi-lumen embodiments discussed below). These alternative "multi-sensor location" embodiments are considered within the breadth of this disclosure. Further, due to the ongoing leveling feature of the separation assembly 204, it may be useful to detect levels only in one chamber 265 as all chambers 265 contain similar volumes and levels of components (e.g., light guides 234' may be eliminated without detrimentally affecting the design).

With the above description of one embodiment of the centrifuge in mind, another preferred embodiment of a centrifuge for use in the centrifugal processing system 10 will be described. Referring to FIGS. 19–22, a preferred embodiment of a centrifuge 640 is illustrated that utilizes a uniquely arranged internal pulley system to obtain a desired input to output drive ratio (such as 2:1, as discussed above) rather than an internal gear assembly. The centrifuge 640 utilizes the side-mounted motor 24 (shown in FIG. 1) through drive belt 26 to obtain the desired rotation rate at the rotor portion of the centrifuge.

Figure 19:
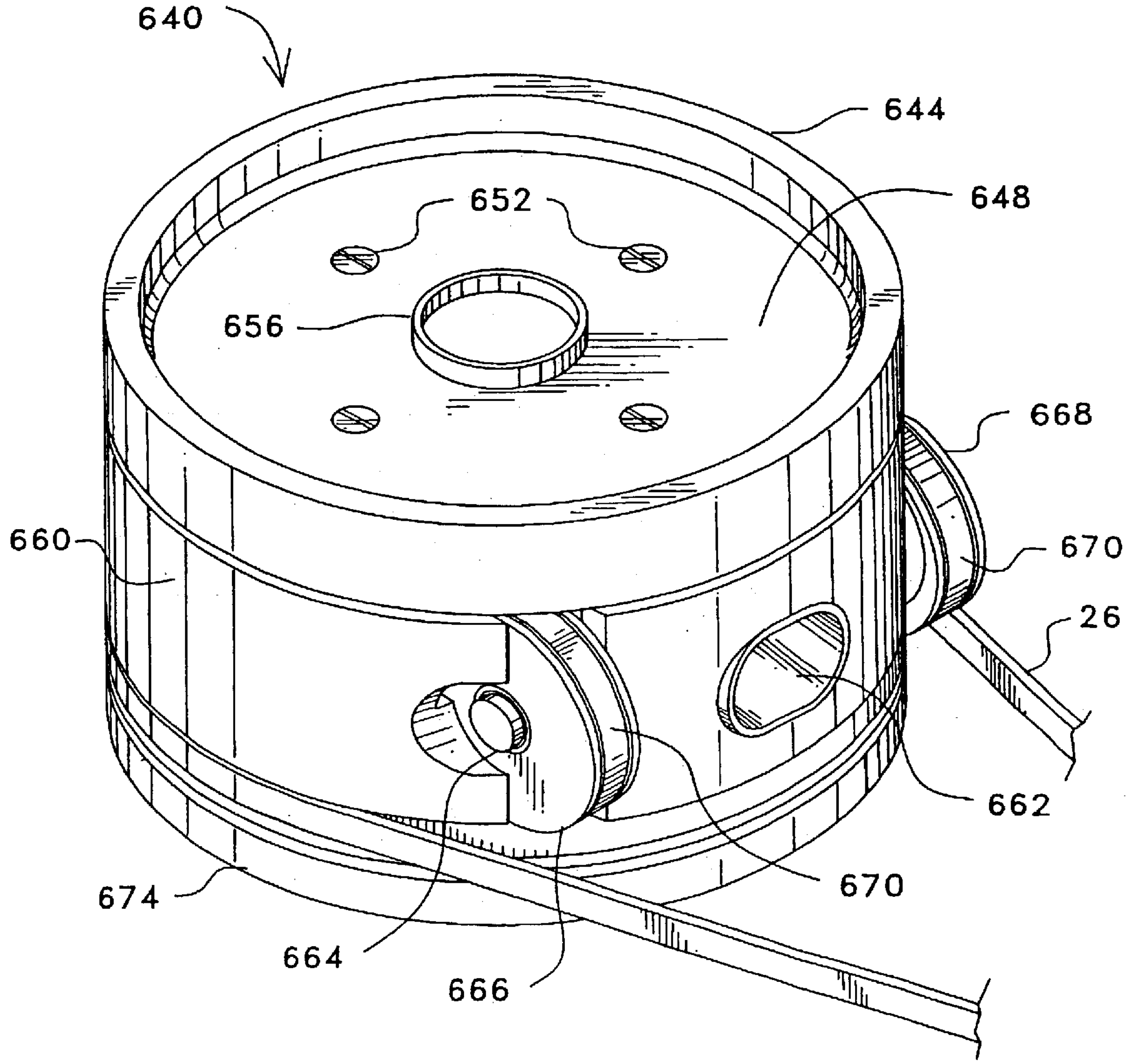
FIG. 19 is an enlarged perspective view similar to FIG. 1 illustrating an alternate embodiment of a centrifuge driven by a side-mounted motor (with only the external drive belt shown).

Referring first to FIG. 19, the centrifuge 640 includes a rotor base 644 (or top plate) with a recessed surface 648 for receiving and supporting a centrifuge bag during the operation of the centrifuge 640. The rotor base 644 is rigidly mounted with fasteners (e.g., pins, screws, and the like) to a separately rotatable portion (i.e., a top pulley 698 discussed with reference to FIGS. 20 and 21) of a lower case shell 660. A cable port 656 is provided centrally in the rotor base 644 to provide a path for a centrifuge tube or umbilical cable that is to be fluidically connected to a centrifuge bag positioned on the recessed surface 648 of the rotor base 644. It is important during operation of the centrifuge 640 to minimize and control contact and binding of the umbilical cable and moving parts (such as drive belts and pulleys). In this regard, the lower case shell 660 includes a side cable port 662 for the umbilical cable to enter the centrifuge 640, which, significantly, the side cable port 662 is located between idler pulleys 666, 668 to provide a spacing between any inserted tube or cable and the moving drive components of the centrifuge 640.

Idler shaft or pins 664 are mounted and supported within the lower case shell 660 to allow the pins 664 to physically support the pulleys 666, 668. The idler pulleys 666, 668 are mounted on the pins 664 by bearings to freely rotate about the central axis of the pins 664 during operation of the centrifuge 640. The idler pulleys 666, 668 are included to facilitate translation of the drive or motive force provided or imparted by the drive belt 26 to the lower case shell 660 to the rotor base 644, as will be discussed in more detail with reference to FIGS. 20 and 21, and to physically support the internal drive belt 670 within the centrifuge 640. The drive belt 26 is driven by the side-mounted motor 24 (shown in FIG. 1) and contacts the lower case shell 660 to force the lower case shell 660 to rotate about its central axis. The lower case shell 660 is in turn mounted on the base 674 in a manner that allows the lower case shell 660 to freely rotate on the base 674 as the drive belt 26 is driven by the side-mounted motor 26. The base 674 is mounted to a stationary base 12 (shown in FIG. 1) such that the base 674 is substantially rigid and does not rotate with the lower case shell 660.

Figure 20:
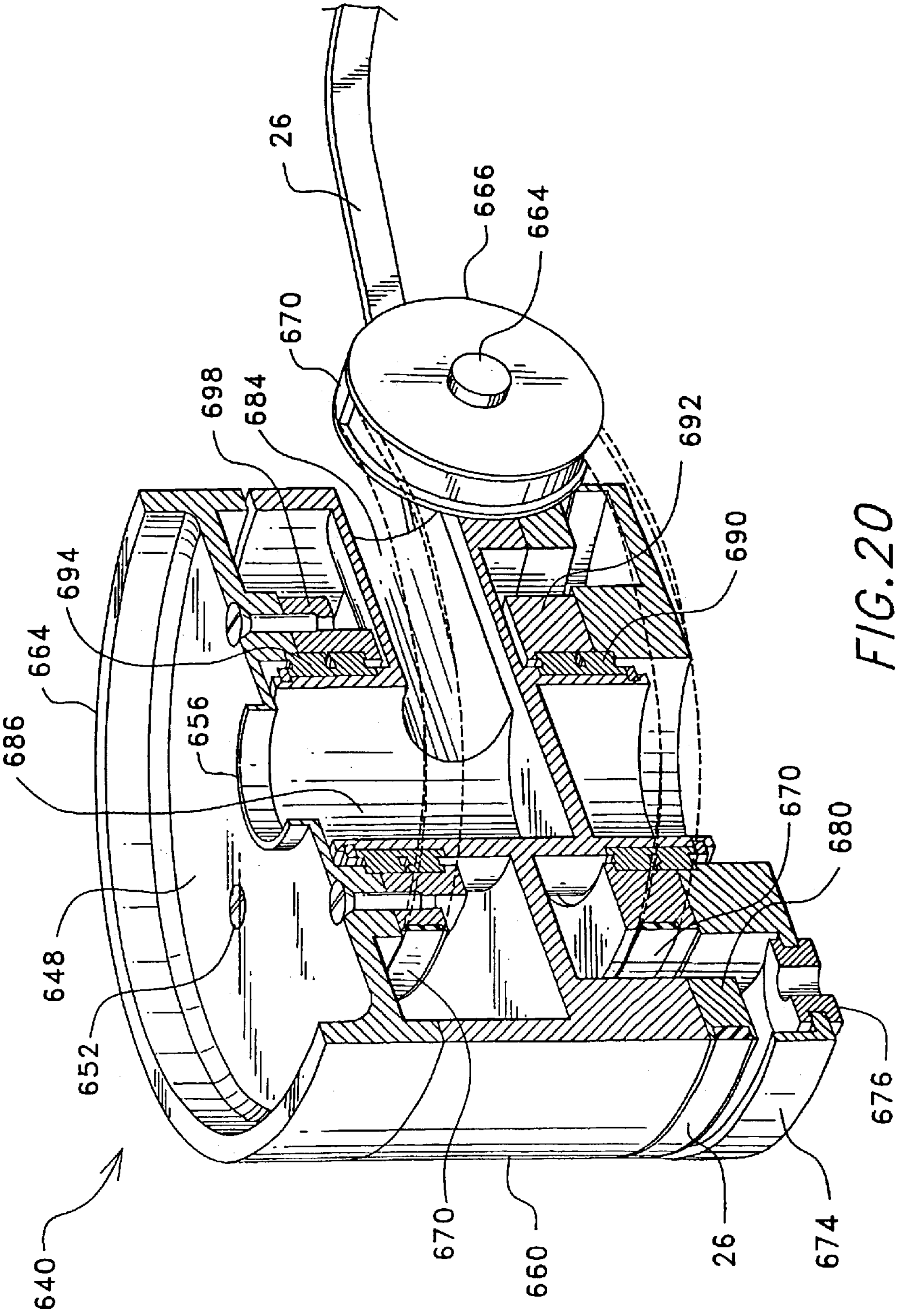
FIG. 20 is a cutaway side view of the centrifuge of FIG. 19 illustrating the internal pulley drive system utilized to achieve a desired drive ratio and illustrating the rotor has configured for receiving a centrifuge bag.
Figure 21:
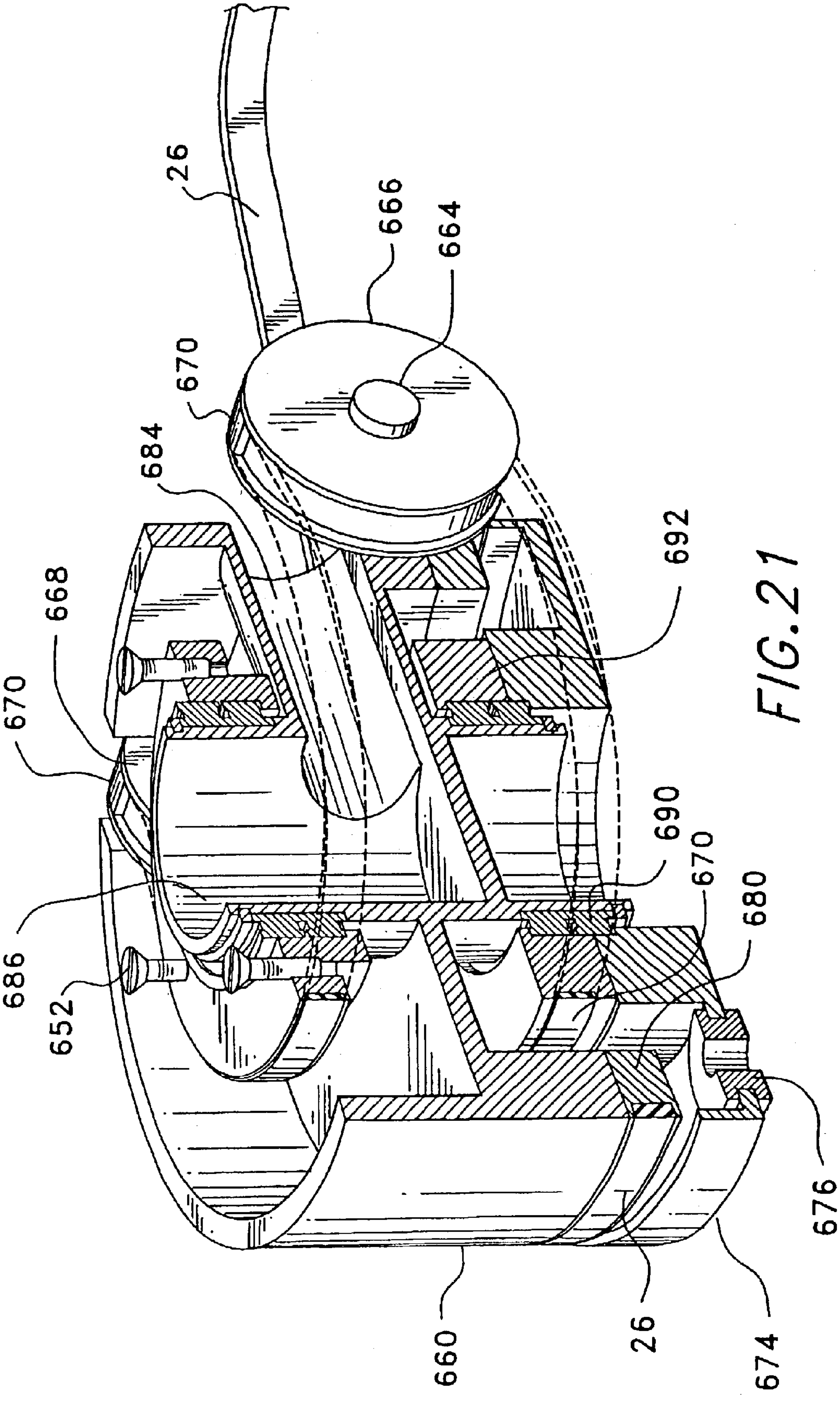
FIG. 21 is a cutaway side view similar to FIG. 20 with the rotor base removed to better illustrate the top pulley and the location of both idler pulleys relative to the installed internal drive belt.
Figure 22:
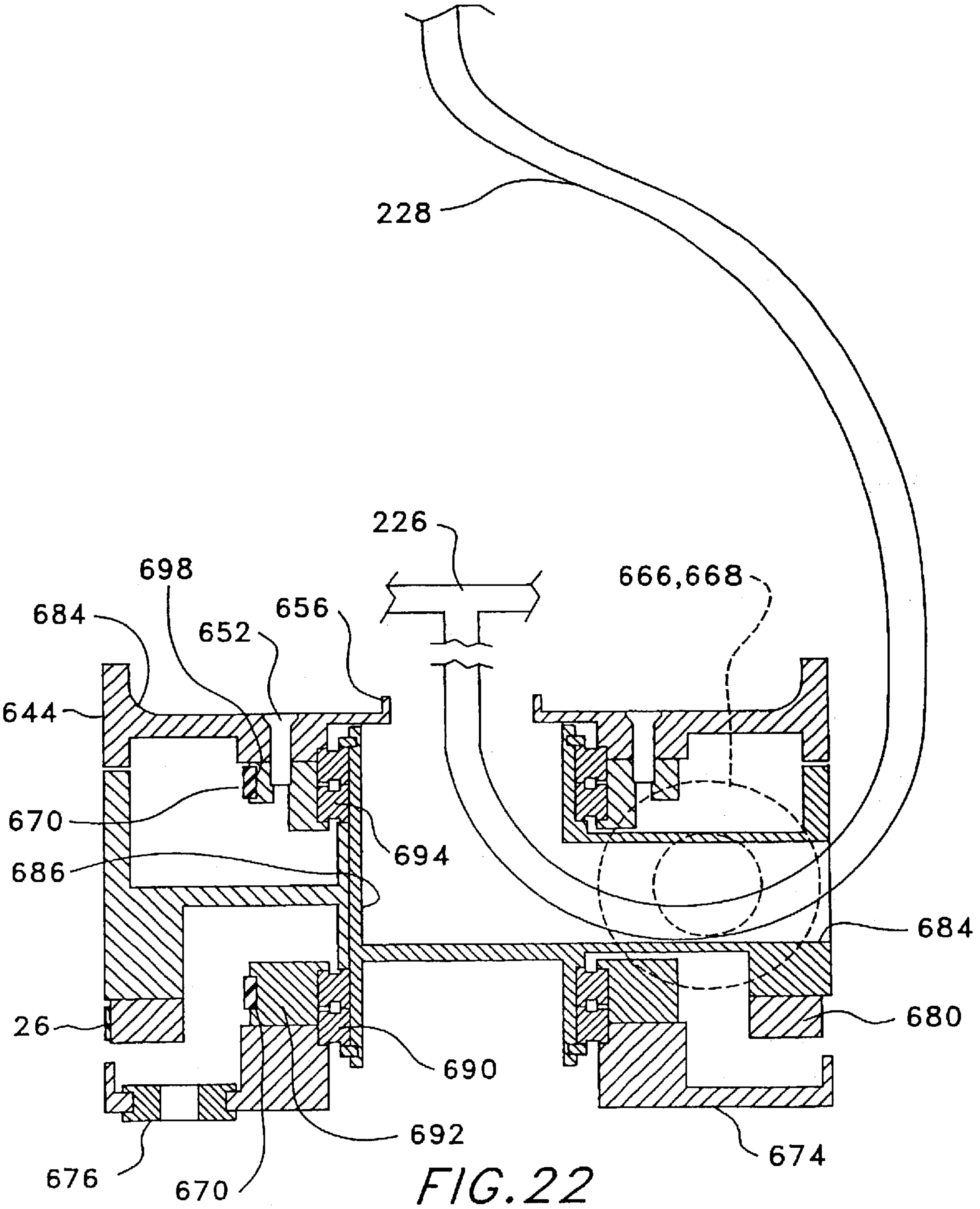
FIG. 22 is a sectional view of the centrifuge of FIG. 20 further illustrating the internal pulley drive system an showing the routing of the centrifuge tube (or umbilical cable).

Referring now to FIGS. 20–22, the centrifuge 640 is shown with a cutaway view to more readily facilitate the discussion of the use of the internal pulley assembly to obtain a desired output to input ratio, such as two to one. As shown, the base 674 includes vibration isolators 676 fabricated of a vibration absorbing material such as rubber, plastic, and the like through which the base 674 is mounted relatively rigidly to the stationary base 12 (of FIG. 1). The drive belt 26 from the side-mounted motor 24 (of FIG. 1) contacts (frictionally or with the use of teeth and the like as previously discussed) a drive pulley 680, which is rigidly mounted to the lower case shell 660. As the drive belt 26 is driven by the motor 24, the lower case shell 660 through drive pulley 680 rotates about its center axis (which corresponds to the center axis of the centrifuge 640). This rotation rate of the lower case shell 660 can be thought of as the input rotation rate or speed.

To obtain a desired, higher rotation rate at the rotor base 644, the lower case shell 660 is mounted on the base to freely rotate about the centrifuge center axis with bearings 690 that mate with the base 674. The bearings 690 are held in place between the bottom pulley 692 and the base 674, and the bottom pulley 692 is rigidly attached (with bolts or the like) to the base 674 to remain stationary while the lower case shell 660 rotates. The illustrated bearings 690 are two-piece bearings which allow the lower case shell 660 to rotate on the base 674. An internal drive belt 670 is provided and inserted through the lower case shell 660 to contact the outer surfaces of the bottom pulley 692. The belt 670 preferably is installed with an adequate tension to tightly mate with the bottom pulley 692 such that frictional forces cause the belt 670 to rotate around the stationary bottom pulley 692. This frictional mating can be enhanced using standard rubber belts or belts with teeth (and of course, other drive devices such as chains and the like may be substituted for the belt 670).

The internal drive belt 670 passes temporarily outside the centrifuge 640 to contact the outer surfaces of the idler pulleys 666 and 668. These pulleys 666, 668 do not impart further motion to the belt 670 but rotate freely on pins 664. The idler-pulleys 666, 668 are included to allow the rotation about the centrifuge center axis by lower case shell 660 to be translated to another pulley (i.e., top pulley 698) that rotates about the same axis. To this end, the idler pulleys 666, 668 provide non-rigid (or rotatable) support that assists in allowing the belt 670 to be twisted without binding and then fed back into an upper portion of the lower case assembly 660 (as shown clearly in FIGS. 20 and 21). As the internal drive belt 670 is fed into the lower case assembly 660, the belt 670 contacts the outer surfaces of a top pulley 698.

During operation of the centrifuge 640, the movement of the internal drive belt 670 causes the top pulley 698 to rotate about the centrifuge center axis. The idler pulleys 666 and 668 by the nature of their placement and orientation within the centrifuge 640 relative to the pulleys 692 and 698 cause the rotor base 644 to rotate in the same direction as the lower case shell 660. Significantly, the top pulley 698 rotated about the centrifuge center axis at twice the input rotation rate because it is mounted to the lower case shell 660 via bearings 694 (preferably, a two piece bearing similar to bearings 690 but other bearing configurations can be used) which are mounted to the center shaft 686 of the lower case shell 660 to fictionally contact an inner surface of the top pulley 698. Since the internal drive belt 670 is rotating about the bottom pulley 692 and the idler pulleys 666, 668 are rotating about the centrifuge central axis by drive belt 26, the top pulley 698 is turned about the centrifuge central axis in the same direction as the lower case shell 660 but at twice the rate.

In other words, the drive force of the drive belt 26 and the internal drive belt 670 are combined by the components of the centrifuge 640 to create the output rotation rate. While a number of output to input drive ratios may be utilized, as discussed previously, a 2:1 ratio is generally preferable, and the centrifuge 640 is preferably configured such that the second, faster rotation rate of the top pulley 698 is substantially twice that of the lower case shell 660. The use of an internal drive belt 670 in combination with two pulleys rotating about the same axis and the structural support for the pulleys within a rotating housing results in a centrifuge that is very compact and that operates effectively at a 2:1 drive ratio with relatively low noise levels (which is desirable in many medical settings).

The 2:1 drive ratio obtained in the top pulley 698 is in turn passed on to the rotor base 644 by rigidly attaching the rotor base 644 to the top pulley 698 with fasteners 652. Hence, a centrifuge bag placed on the recessed surface 648 of the rotor base 644 is rotated at a rate twice that of the umbilical cable 228 that is fed into lower case shell 660, which effectively controls binding as discussed above. The bearing 694 (one or more pieces) wrap around the entire center shaft 686 of the lower case shell 660. To provide a path for the umbilical cord 228 to pass through the centrifuge 640 to the rotor base 644 (which during operation will be enclosed with a rotor top or cover as shown in FIG. 1), the rotor base 644 includes the cable port 656 and the center shaft 686 is configured to be hollow to form a center cable guide. This allows an umbilical cable 228 to be fed basically parallel to the centrifuge center axis to the centrifuge bag (not shown). The lower case shell 660 includes the side cable port 662 to provide for initial access to the centrifuge 640 and also includes the side cable guide (or tunnel) 684 to guide the cable 228 through the lower case shell 660 to the hollow portion of the center shaft 686. The side port 662 and the side cable guide 684 are positioned substantially centrally between the two idler pulleys 666, 668 to position the cable 228 a distance away from the internal drive belt 670 to minimize potential binding and wear.

The centrifuge 640 illustrated in FIGS. 19–22 utilizes two-piece bearings for both the bottom and top pulleys 692 and 698, respectively, and to provide a path for the umbilical cable 228 a central "blind" pathway (via side cable guide 684, the hollow center of the center shaft 686, and cable ports 656, 662) was provided in the centrifuge 640. While effective, this "blind" pathway can in practice present binding problems as the relatively stiff cable 228 is fed or pushed through the pathway. To address this issue, an alternate centrifuge embodiment 700 is provided and illustrated in FIGS. 23 and 24. In this embodiment, the upper portions of the centrifuge 700 include a guide slot between the idler pulleys 666, 668 that enables an umbilical cable 228 to be fed into the centrifuge 700 from the top with the no components to block the view of the operator inserting the cable 228.

To allow a guide slot to be provided, the contiguous upper bearing 694 in the centrifuge 640 are replaced with bearing members that have at least one gap or separation that is at least slightly larger than the outer diameter of the cable 228. A number of bearing members may be utilized to provide this cable entry gap and are included in the breadth of this disclosure. As illustrated, the centrifuge 700 includes a rotor base 702 that is rigidly fastened with fasteners 704 to the top pulley 698 (not shown) to rotate with this pulley at the output rate (e.g., twice the input rate) and to receive and support a centrifuge bag on recessed surface 716. The rotor base 702 further includes the cable port 718 which is useful for aligning the center of the bag and cable 228 with the center of the centrifuge 700.

To allow ready insertion of the cable 228 in the centrifuge 700, the rotor base 702 further includes a cable guide slot 712 which as illustrated is a groove or opening in the rotor base 702 that allows the cable 228 to be inserted downward through the centrifuge 700 toward the side cable guide 724 of the lower case shell 720. The lower case shell 720 also includes a cable guide slot 722 cut through to the top of the side cable guide 724. Again, the guide slots 712 and 724 are both located in a portion of the centrifuge 700 that is between the idler pulleys 666, 668 to position an inserted cable 228 from contacting and binding with the internal drive belt 670, which basically wraps around 180 degrees of the top pulley or lower case shell 720.

Figure 23:
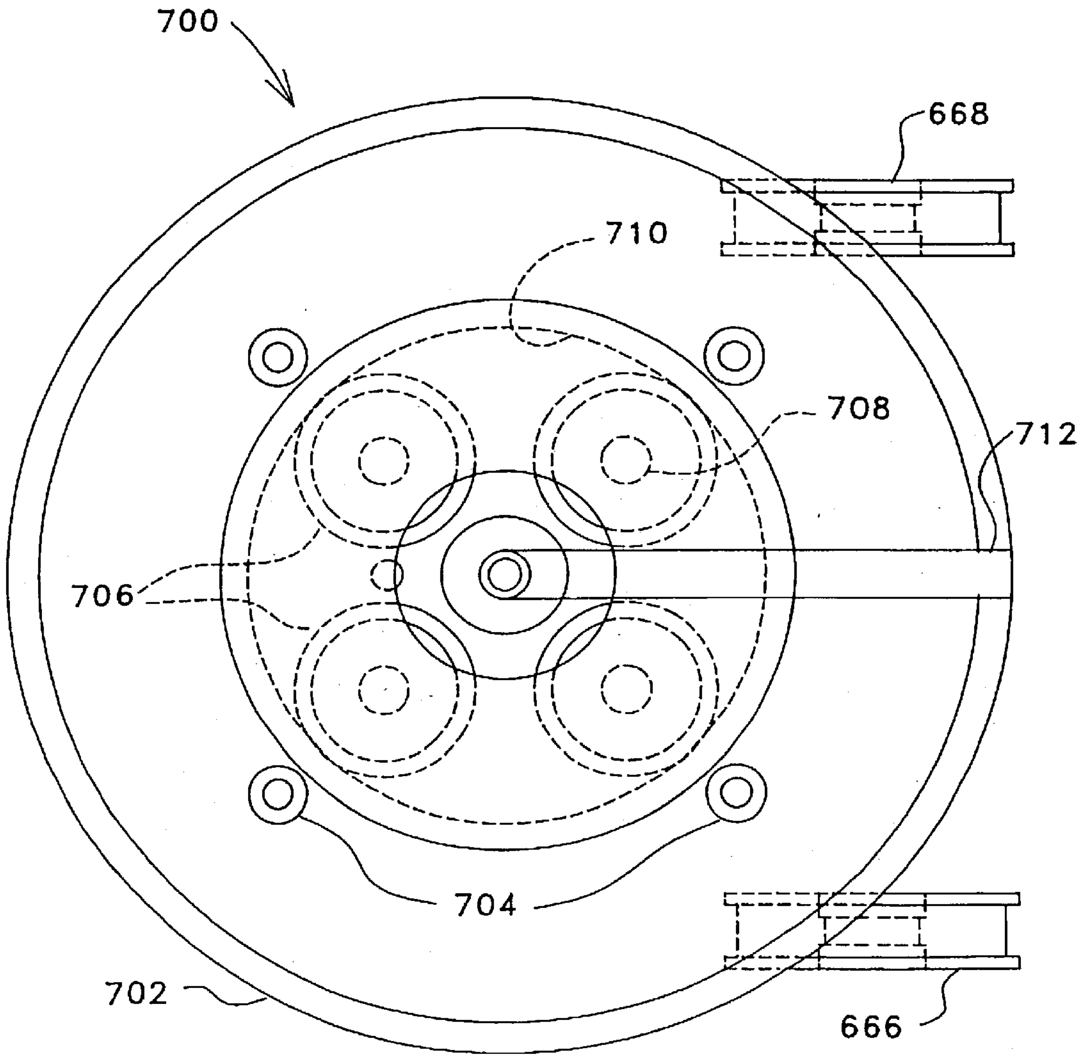
FIG. 23 is a top view of a further alternate centrifuge similar to the centrifuge of FIG. 19 but including internal, separate bearing members (illustrated as four cam followers) that allows the inclusion of guide shaft to be cut through portions of the centrifuge for positioning of the centrifuge tube (or umbilical cable).
Figure 24:
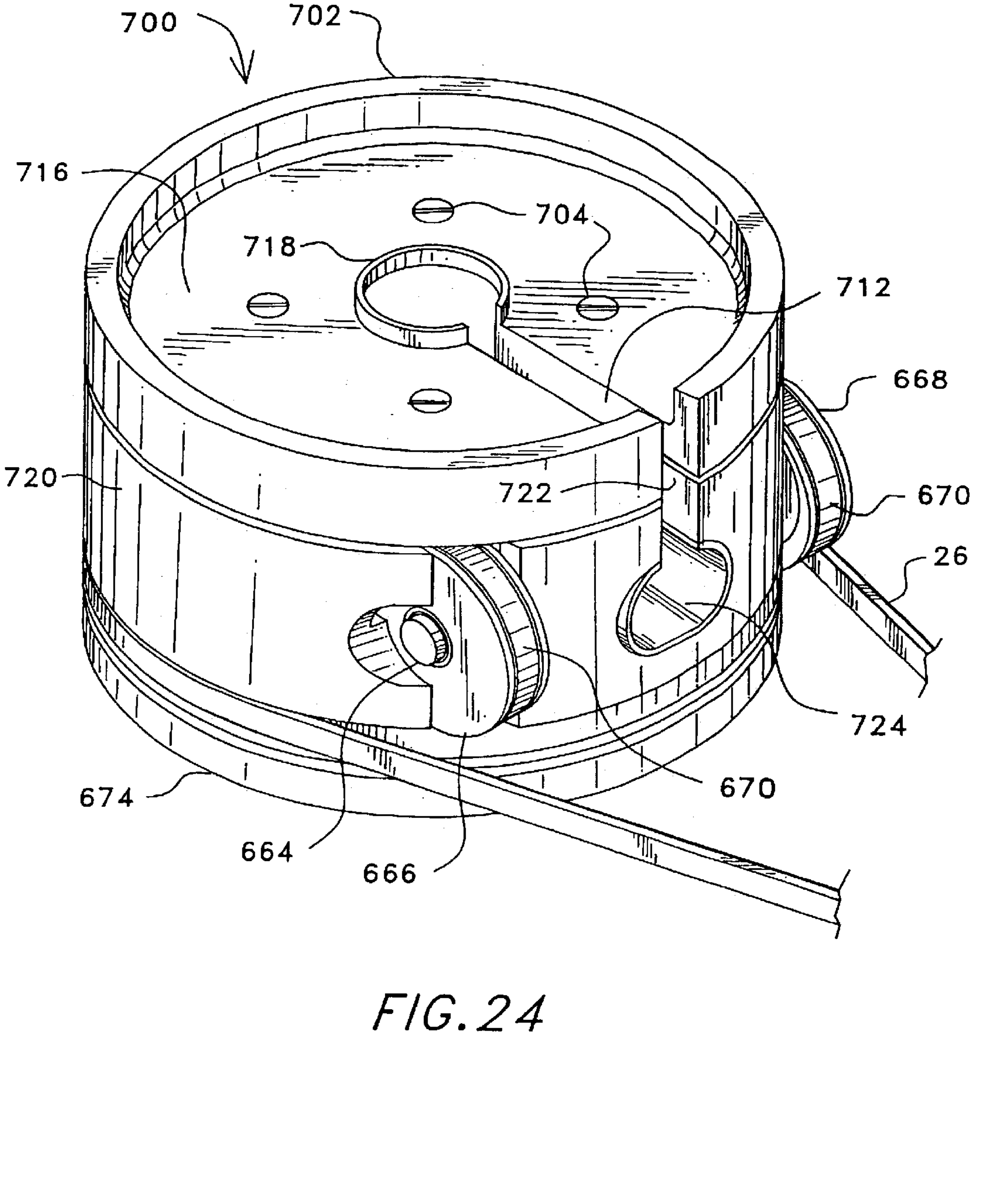
FIG. 24 is a perspective view similar to FIG. 19 illustrating the centrifuge embodiment of FIG. 23 further illustrating the guide slot and showing that the centrifuge can be driven by an external drive belt.

As shown in FIG. 23, the bearing members 706 are spaced apart and preferably, at least one of these spaces or gaps is large enough to pass through the cable 228 to the center shaft of the lower case shell 720. As illustrated, four cam followers are utilized for the bearing members 706, although a different number may be employed. The cam followers 706 are connected to the top pulley to enable the top pulley to rotate and are connected, also, to the center shaft of the lower case shell 720 to rotate with the lower case shell 720. The cam followers 706 ride in a bearing groove 710 cut in the lower case shell 720. To provide an unobstructed path for the cable 228, the cable guide slots 712 and 722 are positioned between the two cam followers 706 adjacent the idler pulleys 666, 668, and preferably the guide slots 712, 722 are positioned substantially centrally between the pulleys 666, 668. The guide slots 712, 722 are positioned between these cam followers 706 to position the cable 228 on the opposite side of the centrifuge 700 as the contact surfaces between the internal drive belt 670 and the top pulley 698 (shown in FIGS. 20–22). In this manner, the use of separated bearing members 706 in combination with a pair of cable guide slots 712, 722 allows an operator to readily install the umbilical cable 228 without having to blindly go through the inside of the drive system and minimizes binding or other insertion difficulties.

In operation, one end of umbilical cable 228 must be secured to rotor assembly 200 to prevent itself from becoming twisted during rotation of rotor assembly 200 by the coaxial half-speed rotation of drive shaft assembly 28, which imparts a like rotation with respect to the rotor 202 axis and consequently to the umbilical cable 228 that is directed through cable guide 102. That is, if rotor assembly 200 is considered as having completed a first rotation of 360° and drive shaft assembly 28 as having completed a 180° half-rotation in the same direction, the umbilical cable 228 will be subjected to a 180° twist in one direction about its axis. Continued rotation of rotor assembly 200 in the same direction for an additional 360° and drive shaft assembly 28 for an additional 180° in the same direction will result in umbilical cable 228 being twisted 180° in the opposite direction, returning umbilical cable 228 to its original untwisted condition. Thus, umbilical cable 228 is subjected to a continuous flexure or bending during operation of the centrifugal processing system 10 of the present invention but is never completely rotated or twisted about its own axis.

With an understanding of the physical structure of the centrifuge 20 in FIG. 1, operation of the centrifuge 20 utilizing the mounting assembly 202 and dual-chamber separation assembly 204 will be discussed highlighting the features of the invention that enhance balanced operation and effective collection of desired blood components (or other liquid components). Generally, with reference to FIGS. 1 and 15, the mounting assembly 202 is rigidly attached to the centrifuge 20 within the rotor assembly 200. The separation assembly 204 is then fit into place in the tubing troughs 223 and 225 with the lumen tubing 205 attached to the umbilical cable 228. The collection chambers 226 are positioned in the saddle supports 235 and fastened in place with the side fasteners 229 (or snapped in place in the embodiment of FIG. 17). The centrifuge 20 is operated at a slower speed, such as 1000 rpm, and the liquid medium to be separated, such as blood, is pumped through the cable 228 to the lumen tubing 205.

Both collection chambers 226 are in constant fluid communication with the lumen tubing 207, 208, and thus the input or fill liquid enters both chambers 226 via ports 210, 210' in substantially equivalent volumes. This promotes balanced operation during fill steps. A soft spin at elevated speeds is then performed (such as at about 2000 to 3000 rpm) to pack the red blood cells (or heaviest liquid components) to the outboard collection portions of the separation assembly 204. For example, the red blood cells typically pack into the tubing 207, 208 until the traps 212 are filled and flow of the red blood cells is halted causing the red blood cells to continue to pack in the sensing portion or nipples 217, 217' and outer collection portions 216, 216'. Red blood cells are typically at least partially removed, such as by drawing the red blood cells out until a boundary layer is noted nipple 217, 217'.

The process is continued with high-speed separation, such as 2000 to 5000 rpm, to separate platelets. At this point, the speed of the centrifuge is reduced, such as down below 2000 to 1000 rpm or less, and the rest of the red blood cells are removed based on a known volume of red blood cells in the tubing 228, 205, 207, 208 (for example about 1 cc in one embodiment of the invention in which 0.050-inch outer diameter tubing is used for tubing runs 228, 205, 207, 208). At this point the next heaviest components (e.g., white blood cells, platelets, and plasma) can be sequentially removed using the sensing light passing through the sensor supports 232, 232' to determine when to start and stop collection of each component. Significantly, the separated components are being removed simultaneously from each collection chamber 226 and in relatively equal volumes such that self-balancing operation provided by the design of the separation assembly 204 continues throughout the component extraction or collection processes of the system 10.

Figure 25A:
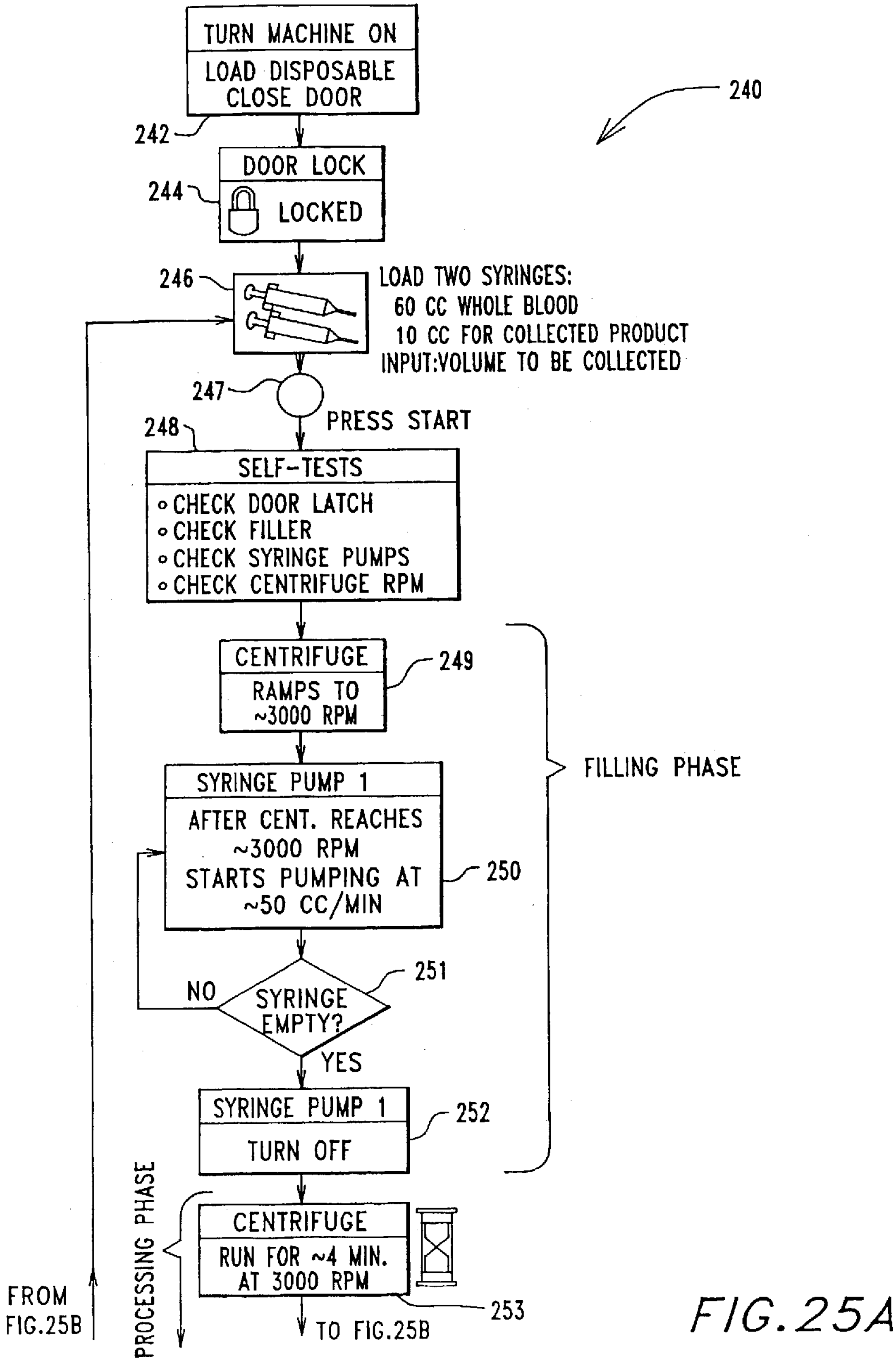
FIG. 25 illustrates an exemplary process flow for operating the centrifugal processing system of FIG. 1.
Figure 25B:
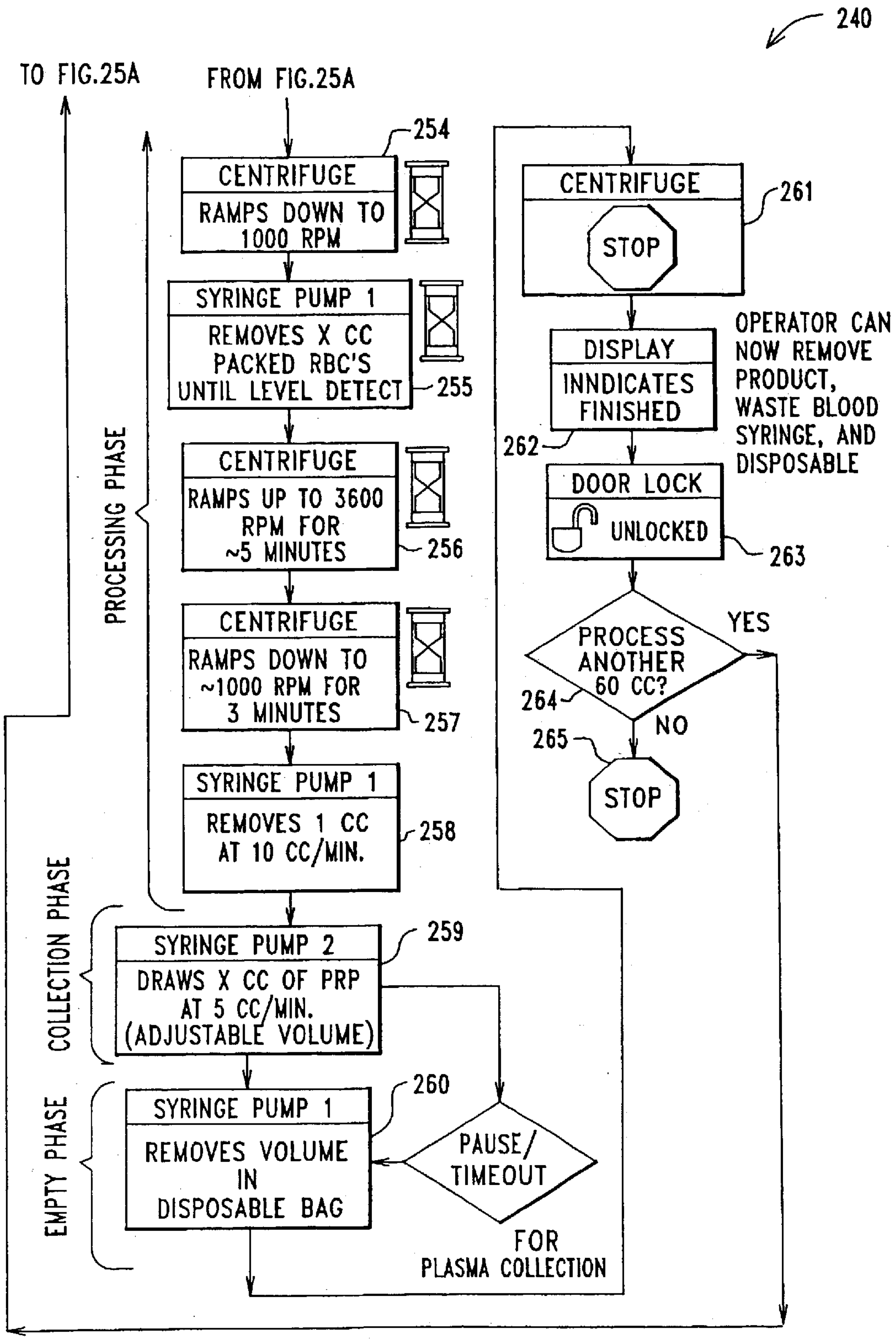

To further describe the operation of the system 10 with the mounting and separation assemblies 202, 204, FIG. 25 illustrates in more detail a fill and collection process 240 performed with the system 10. It should be noted that the following process is for illustration only and is not considered limiting of the invention. Processing speeds and liquid volumes will necessarily vary with the liquid being processed (as nearly any liquid having components or fractions of varying density may be processed using the present invention) and the desired products. These steps are typically automated by use of software and use of a controller (such as controller 850) to control operation of pumps, valves, and the centrifuge (including rotation speeds). The process is shown to begin at 242 by turning the system 10 on, which may include providing power to a controller 850 and other equipment, such as motor 24. Step 242 may also include opening lid 15, inserting a new separation assembly 204 (or centrifuge disposable), and closing the lid 15. At 244, the lid 15 is locked and at 246, the filling phase is begun with loading two syringes (or reservoirs with pumps) into the system 10 with one being the source of the liquid or blood to be separated, such as a 60 cc syringe of anticoagulated whole blood, and an empty syringe for extracting or withdrawing the separated components. At 247, the controller 850 or software program automating control of the system 10 is started and manual operation is at least temporarily ended.

At 248, the controller 850 may perform some optional self tests including checking the door lid 15, checking volume of fill liquid, verifying existence/operability of source pumps, and starting centrifuge and verifying speed detection. Filling continues at 249, with the centrifuge 20 being sped up to a desired fill speed, such as 0 to 3000 rpm and preferably about 1000 rpm. At 250, the liquid source (e.g., source 802 or a syringe and the like) is operated to provide fluid into the cable 228 which results in the concurrent filling of both collection chamber 226 (or all collection chambers in multi-chamber embodiments not shown). Typically, pumping may be performed at a set rate such as 50 cc/minute. The syringe or source is verified empty at 251 prior to proceeding to turning the source or syringe pump (such as input pump 810) off at 252.

The processing or separating phase begins at 253 with increasing the speed of the centrifuge for soft packing of red blood cells such as by operating for about 4 minutes at 2400 to 3000 rpm. After the timed initial separation, the centrifuge 20 is slowed down at 254 to a withdrawing or collection speed (such as about 1000 rpm or other useful speed less than separation speeds). The fill or source pump (e.g., pump 810) is operated in reverse at 255 to pump out red blood cells until a boundary layer between red blood cells and the next heaviest component (e.g., white blood cells, platelets, and plasma) is detected by sensor assembly 840 (which is passing light through the light guides 234, 234' in sensor supports 232, 232' in mounting assembly 202). The traps 212 are provided to act as a manometer or plug and red blood cells are left in tubing 207, 208 to block flow of lighter components out of collection chambers 226 prior to full separation. At 256, the centrifuge 20 is again operated at a higher speed for separation of lighter components, such as platelets from the plasma, and the speeds may vary widely such as 2400 to 5000 rpm or even higher. This operation may be a timed operation if the nature of the sample is known and tests have been performed to determine a desired separation time and spin rate (such as 5 minutes at 3600 rpm). Of course, the soft and hard packing (lower and higher speed separations) may be combined and mixed in numerous combinations to obtain a desired result and to suit the liquid being processed.

At 257, the centrifuge 20 is again slowed down to a collection or withdrawal speed of about 1000 rpm. At 258, the final amount of red blood cells is removed from the tubing 207, 208, 205 (and nipple 217, 217'). This is generally performed based on a volumetric analysis of the separation assembly 204 (i.e., the volume of red blood cells is known in the system 10 up to where the light guides 234, 234' (the sensing point) cross the nipple 217, 217') and this known volume of remaining red blood cells are removed by the input pump or source (such as input pump 810). The type of pump utilized may range from syringe pumps to peristaltic or manual pumps. The method of inputting and extracting the liquid to the collection chambers 226 is not a limiting feature of the invention.

Collection can then begin of other components, such as platelets, with the operation at 259 of the second syringe or collection pump to withdraw the next separated layer of components. Because this volume is generally unknown prior to separation, collection continues until another layer transition is sensed (such as by the sensor assembly 840) in the collection portion 216, 216' and/or the sensing portion 217, 217'. As discussed earlier, the volume in the portions 216, 216', 217, 217' is significantly reduced to facilitate sensing of interfaces between different density components. This is achieved with each component in the collection portions 216, 216' and sensing portions 217, 217' having a much larger radial component, i.e., a smaller fluid volume is required to fill these reduced volume, tapered portions 216, 216', 217, 217', which enhances accurate interface detection.

An emptying phase may then begin at 260 to allow plasma or remaining components to be removed from the collection chambers 226 for use or simply to empty the collection chambers 226 for further processing. At 261, the centrifuge 20 is stopped and at 262, an indication that separation and collection operations have been completed is visually and/or audioally provided to the operator of the system 10. The operator can remove collected products and the lid 15 can be unlocked and opened at 263. At 264, the operator can begin another processing session 240 by supplying new fluid sources and collection devices at 246 (typically the centrifuge disposable 204 is removed and replaced prior to additional processing but this is not required in all embodiments of the system 10). If another process 240 is not begun, the process 240 terminates at 265. Significantly, the process 240 is not volume sensitive. The filling phase and step 246 may be performed with nearly any volume of liquid (below the capacity of the collection chambers 226 which in one embodiment is 120 cc with 60 cc in each collection chamber 226) as balancing occurs during fill and during operation.

At the beginning of processing, the fluid or medium to be centrifuged may be contained within source container 300. For example, when the centrifuge 20 of this invention is used to prepare an autologous platelet gel, the fluid (i.e., whole blood), may be withdrawn from the patient during or prior to surgery into source container 398 containing an anticoagulant. The anticoagulated whole blood is introduced to collection chambers 226 through ports 210, 210' after the separation assembly 204 has been positioned in the mounting assembly 204 and rotation thereof is initiated by operation of the centrifuge 20. As discussed above, securing collection chambers 226 in mounting assembly 202 holds the collection chambers 226 in a fixed position therebetween, such that the collection chambers 226 cannot move independently of the mounting assembly 202, and therefore the collection chambers 226 and rotor assembly 200 rotate concurrently at the same rate of rotation. Rotation of the rotor assembly 200 directs the heavier density constituents of the anticoagulated whole blood within the collection chambers 226 toward the outer portions 201, 216', 217, 217' of the collection chambers 226, while the lighter density constituents remain closer to an inner region, as illustrated in FIG. 26.

Figure 26:
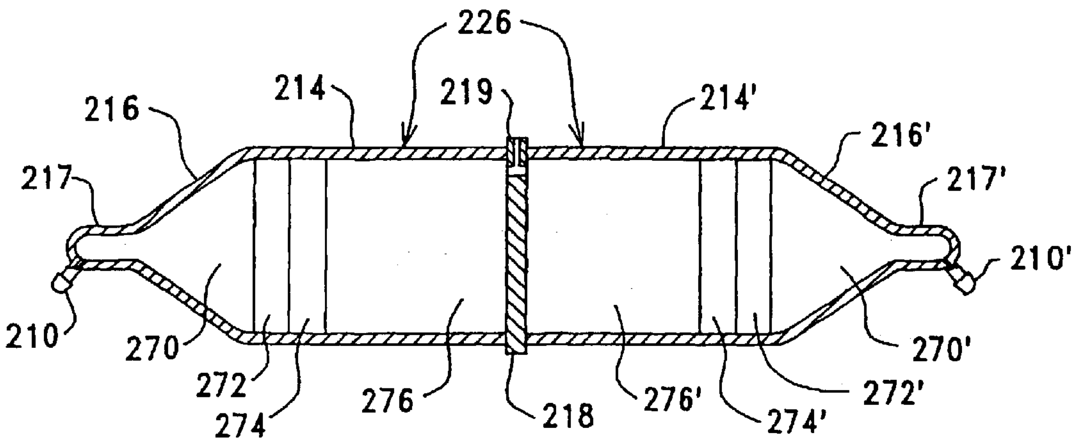
FIGS. 26–27 are schematic illustrations of a noncontinuous flow operation of the centrifugal processing system showing the movement of separated fractions.

More specifically, as illustrated in FIG. 26, when the fluid medium being separated is whole blood, the whole blood is separated within collection chambers 226 into a red blood cell fraction (270, 270'), a white blood cell fraction (272, 272'), a platelet rich plasma fraction (274, 274'), and a platelet poor plasma fraction (276, 276'). As will be appreciated by those of skill in the art, whole blood fractions, red blood cells and plasma are differently colored, and consequently the separation of the fractions can be easily detected by the operator or sensor. At an appropriate time during centrifuging, suction or other drawing means may be applied to the interior of collection chambers 226 via outlet ports 210, 210' to remove the desired fraction from the collection chambers 226 (as discussed with reference to FIG. 25). In a further embodiment, collection chambers 226 may further contain concentric index lines to assist the operator in viewing the positions of chambers 226 to the RBC plasma interface. Based on the speeds and times the location of the WBC and platelets can be varied with respect to the red blood cells and plasma interface. For example, if the rpm is held low (approximately 1,000–1,700, preferably 1,500) the plasma and platelets will separate from the RBC layer, as the centrifuge speed is increased (1,400–1,700) the platelets will separate out of the plasma and reside at the plasma to RBC interface in greater concentrations. With increased speeds, WBC reside deeper into the RBC pack.

With continued reference to FIG. 26 (which illustrates a single lumen tubing embodiment for tubing 207, 208 that are used for both fill and collection, i.e., discontinuous flow), as the separation of the fluid medium is initiated by centrifugation, substantially annular regions having constituents of a particular density or range of densities begin to form. For purposes of illustration, the separation of whole blood will be discussed, and as shown in FIG. 26 four regions are represented, each of which contains a particular type of constituent of a given density or range of densities. Moreover, it should be appreciated that there may be a given distribution of densities across each of the regions such that the regions may not be sharply defined. Consequently, in practice the regions may be wider (e.g., a larger radial extent) and encompass a range of densities of constituents.

Figure 27:
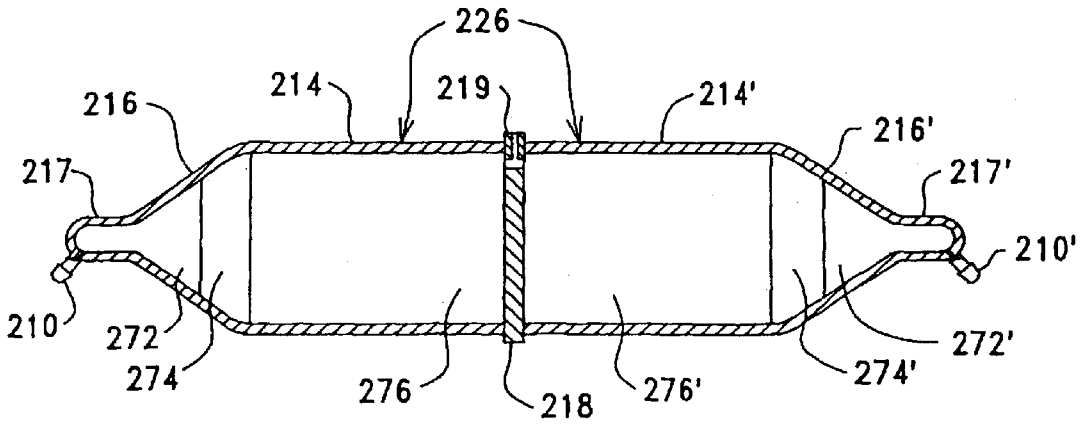

In the example of FIGS. 26 and 27, the first regions 270, 270' are the outermost of the four regions and contain red blood cells. The second regions 272, 272' contain white blood cells, which have a lower density than that of the red blood cells. The third regions 274, 274' contain the platelet rich plasma fraction, and the innermost regions 276, 276' contain the least dense platelet poor plasma fraction. In one embodiment, it may be desired to harvest the platelet rich plasma fraction in regions 274, 274'. In order to remove the platelet rich plasma fraction from the collection chambers 226, vacuum or suction is provided concurrently to both collection chambers 226 via outlet port 210, 210' and tubing 207, 208 to the centrifuge bag 226 to remove a desired portion of regions 270, 270' (which is shown in FIG. 27) and then 272, 272'. A portion of the fraction 274, 274' is then positioned near the ports 210, 210' at the outboard edge of the collection chambers 226 in the sensing portion 217, 217' and in some cases, in the outer collection portions 216, 216'. Fraction 274, 274' may now be drawn simultaneously (due to fluid communication between the collection chambers 226) through ports 210, 210' and into an appropriate one of the collection containers (not shown in FIGS. 26 and 27).

More specifically, FIGS. 26 and 27 illustrate one method of this invention for the separation of whole blood components, which is a dynamic process. FIG. 26 shows one portion of the collection chambers 226, illustrating the separation of the whole blood components after infusion of an aliquot of whole blood into collection chambers 226 and centrifugation for approximately 60 seconds to 10 minutes at a rate of rotation between 0 and 5,000 rpms. It will be understood by those of skill in the art that faster speeds of rotation will separate the blood in a shorter prior of time. FIG. 26 shows the four separated whole blood fractions, with the denser fractions in sensing and outer collection portions 217, 217' and 216, 216', respectively, and the less dense fractions closer to inner plug 218. While it is well-known that hematocrits (i.e., the volume of blood, expressed as a percentage, that consists of red blood cells) will vary among individuals, ranging from approximately 29%–68%, such variations are easily adjusted for as a result of the novel design of collection chambers 226 which is volume and hematocrit insensitive and consequently will not affect the isolation of any of the desired fractions as discussed below in detail. Thus, for illustrative purposes, it will be assumed that centrifugation of an initial infusion of an aliquot of anticoagulated whole blood will give the profile shown in FIG. 26. In one embodiment, it is desired to harvest the platelet rich plasma fraction 274, 274'. This may be achieved by performing a batch separation process with a single lumen tubing 205, 207, 208 or a continuous separation process as described below with multi-lumen tubing used for tubing runs 205, 207, 208.

Alternatively, the above-described process can be performed as a continuous (or semi-continuous) flow process. The continuous process separation of whole blood may be achieve by using a separation assembly 204 as illustrated in FIGS. 28–31 having collection chambers 226 and a multi-lumen tubing 207, 208 having inlet lumen or port 280, 280' and three outlets per chamber a lumen connected to ports 210, 210' and lumens or ports 282, 282', 284, 284' wherein the tubes are connected to an umbilical cable 228 and lumen tubing 205 each comprising four lumens. More specifically, the collection chambers 226 for use in a continuous separation of whole blood has openings for inlet port 280, 280' connected via an inlet lumen to a whole blood source container, a first outlet port 282, 282' connected to a first outlet lumen that is in turn connected to a platelet rich plasma receiving container, a second outlet port connected to ports 210, 210' connected via a second outlet lumen to either a red blood cell receiving container or a waste container and a third outlet port 284, 284' connected via a third outlet lumen to a platelet poor plasma receiving container.

Figure 28:
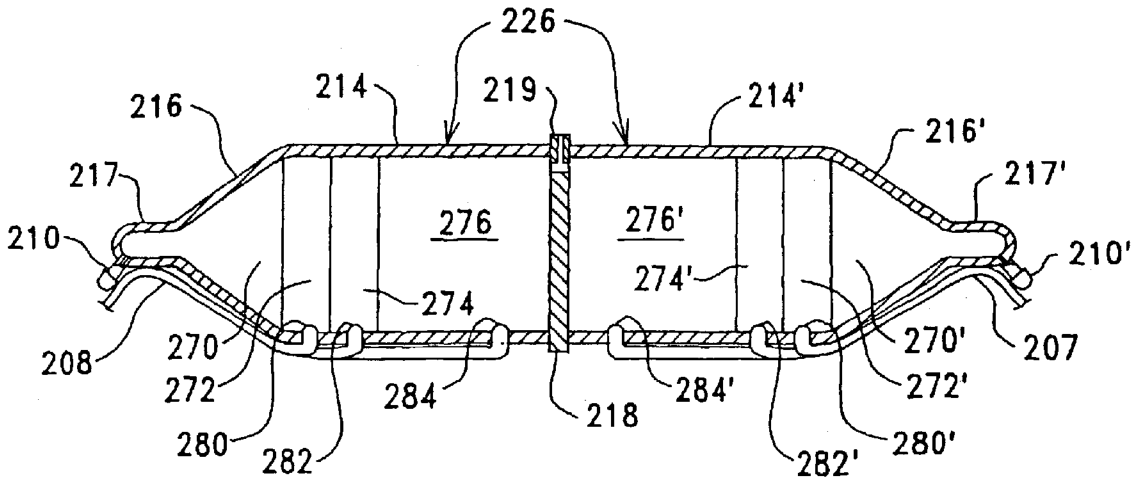
FIGS. 28–31 are schematic illustrations of a continuous method of this invention for separating whole blood components using multi-lumens and modified collection
Figure 30:
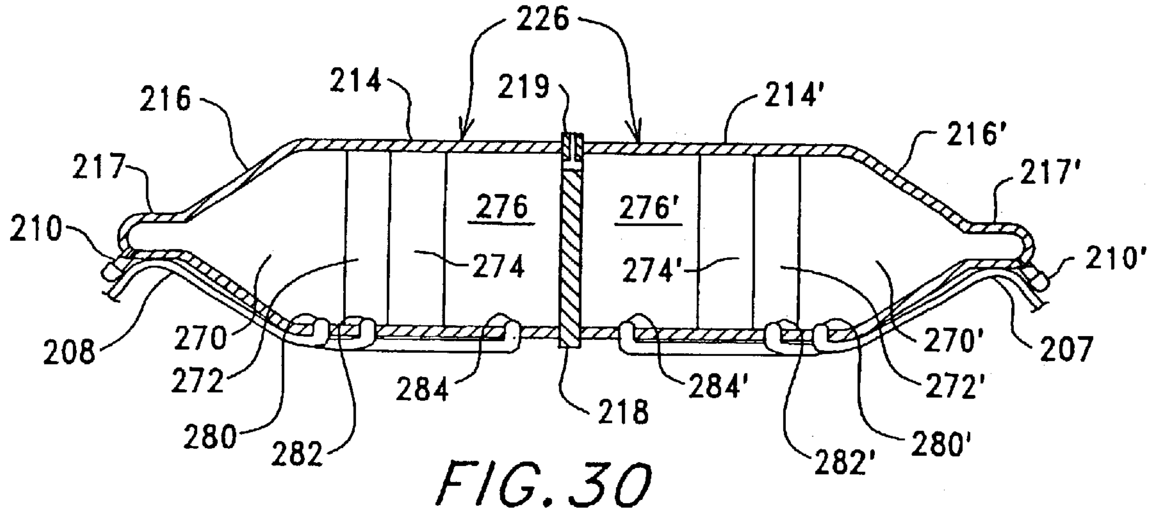

In the continuous separation process, after withdrawal of the portion of platelet rich plasma or other cellular components as described above with reference to FIGS. 26 and 27, the collection chambers 226 have the capacity to receive an additional volume (aliquot) of whole blood. Consequently, as shown in FIG. 30 infusion of an aliquot of whole blood is reinitiated through first inlet port 280, 280' with continued centrifugation until the capacity of the collection chambers 226 is reached or at some smaller volume. As a result of the additional volume of blood, the profile of the blood fractions in collection chambers 226 will approximately assume the profile shown in FIG. 30. As can be seen in FIG. 30, the additional volume of blood results in a shift of the location of the blood fractions, such that the platelet rich plasma fraction 274, 274' has shifted back toward the center plug 208 into the area of the outlet port 282, 282', and the platelet poor plasma fraction 262 has shifted back towards the inner plug 218 and away from the vicinity of the outlet port 282, 282'. Once red blood cells 270, 270' are removed via ports 210, 210', additional platelet rich plasma 274, 274' can be removed from collection chambers 226 through outlet ports 282, 282' as shown in FIGS. 28 and 31.

Figure 29:
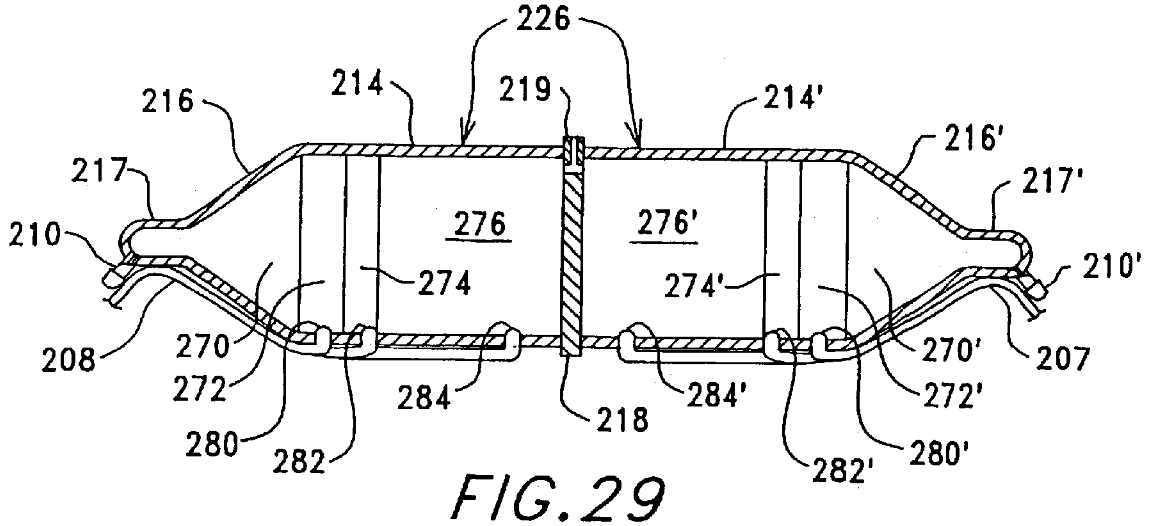
Figure 31:
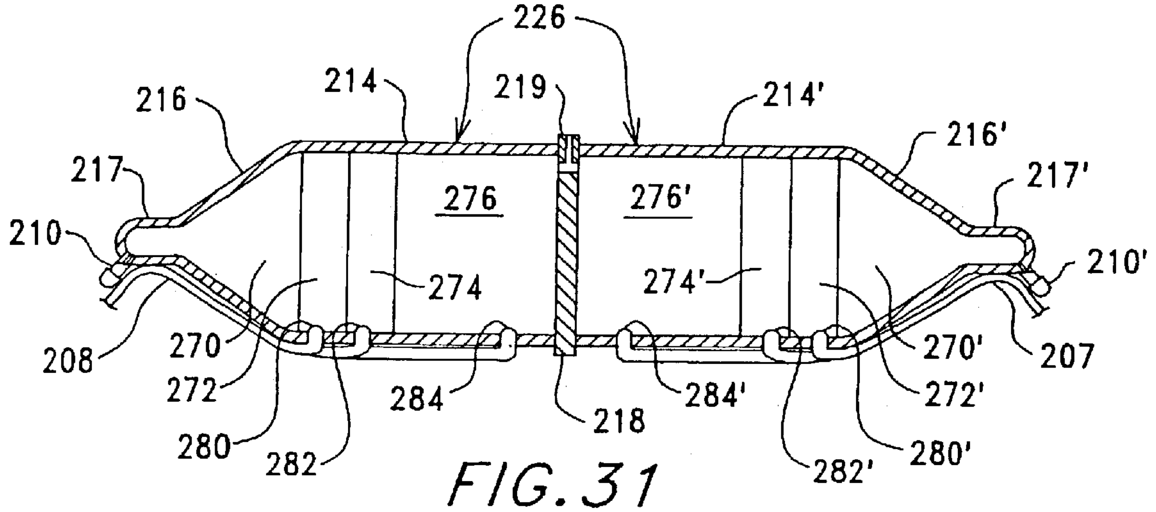

As described above, removal of an additional volume of the platelet rich plasma fraction 274, 274' results in a shift in the location of the platelet poor plasma fraction 276, 276' closer to the outer collection portions 216, 216', 217, 217' and consequently closer to outlet port or lumens 282, 282', as shown in FIGS. 29 and 31, at which point removal of platelet rich plasma is again temporarily terminated.

Additional infusions of whole blood aliquots to collection chambers 226 and removal of platelet rich plasma (by shifting the position of the platelet rich plasma fraction 274, 274' relative to the position of the outlet port or lumen 282, 282') as described above may be repeated a number of times. Eventually, however, the continued infusion of whole blood followed by removal of the platelet rich plasma fraction 274, 274' will necessarily result in a gradual increase in the volumes (and consequently the widths) of the remaining blood fractions 272, 272', and 276, 276' in the collection chambers 265. In particular, the volume, and therefore the width, of the red blood cell fraction 270 will increase to the extent that the other fractions are pushed closer to the inner perimeter near plug 218. As shown in FIG. 30, the increased volume of red blood cells now present in the collection chambers 226 shifts the location of the fractions towards the inner perimeter and plug 218 such that the white blood cell fraction 272, 272' is now in the vicinity of the outlet port 282, 282' as opposed to the desired platelet rich plasma fraction 274, 274'.

The novel design of separation assembly 204 and collection chambers 226 advantageously provides means for shifting the fractions back to the desired locations when the situation shown in FIG. 30 arises. That is, lumens or ports 280, 280' serve as inlet conduit for introduction of whole blood aliquots into the collection chambers 226 and also serve the function of withdrawing fractions that are located in the collection portion 216, 216'. This is achieved in part by attaching the second outlet lumen to either a red blood cell receiving container or a waste container having a suction means (e.g., syringe, pump, etc.) As shown in FIG. 31, outlet ports 280, 280' can be used to withdraw a substantial volume of the red blood cell fraction 270, 270', which in turn shifts the location of the remaining fractions 272, 272', 274, 274', 276, 276' outward in the collection chambers 226. The withdrawal of the red blood cell fraction 270, 270' may be monitored visually by the operator or by other means such as a sensor. Alternatively, the positions of the fractions may be shifted by withdrawing the platelet poor plasma fraction 276, 276' through outlet tube or port 284, 284', which is connected via a third outlet lumen to a platelet poor plasma receiving container.

FIG. 31 shows that, after withdrawal of a portion of the red blood cell fraction 270, 270', the collection chambers 226 again have the capacity to receive an additional volume of whole blood for centrifugation. An additional infusion of an aliquot of whole blood through inlet tube 280, 280' into the collection chambers 226 and centrifugation will produce the profile illustrated in FIG. 28. The above-described steps may be repeated as needed until the desired amount of platelet rich plasma has been harvested. All of the above-described steps occur while the centrifuge 20 is spinning.

The above-described continuous separation method was illustrated in terms of performing the whole blood infusion step and the platelet rich plasma harvesting step sequentially. An alternative embodiment involves performing the infusion and harvesting steps substantially simultaneously, that is, the platelet rich plasma fraction is withdrawn at approximately the same time as an additional aliquot of whole blood is being added to the collection chambers 226. This alternate embodiment requires that the centrifuge 20 spin at a rate that results in almost immediate separation of the blood components upon infusion of an aliquot of whole blood.

FIGS. 28–31 illustrate one embodiment of how the design of collection chambers 226 permit the general locations of the various blood fractions to be shifted to allow for continuous harvesting of a desired blood fraction without the risk of contaminating the harvested blood fraction, and further allow for continual on-line harvesting of a large volume (10 to 5 L's) of blood using a small, portable centrifuge device comprising a 10 cc to 200 cc capacity centrifuge disposable 204.

For example, the design of the collection chambers 226 having inlet tube 280, 280' and outlet tube 282, 282' means that the desired component or fraction will be withdrawn from the collection chambers 226 only through outlet tube 282, 282', while the addition of whole blood aliquots or the removal of other components (e.g., red blood cell fraction 270, 270') will proceed only through dual functional inlet tube 280, 280'. In this respect, the harvested fraction (e.g., platelet rich plasma fraction 274, 274') is never withdrawn through inlet tube 280, 280' which was previously exposed to other fluid media (e.g., whole blood or red blood cells). Thus, the design of the separation assembly 204 offers a significant advantage over conventional centrifuge containers comprising only one tube which serves to both introduce the fluid medium to the container and to withdraw the harvested fraction from the container.

Furthermore, because of its unique design, the use of the separation assembly 204 is independent of composition of the whole blood to be centrifuged. For example, as stated above, hematocrits (i.e., the percent volume of blood occupied by red blood cells) vary from individual to individual, and consequently the profile illustrated in FIG. 28 will vary from individual to individual. That is, the width of red blood cell fraction 270, 270' may be wider or narrower, which in turn will result in the platelet rich plasma fraction 274, 274' being positioned further away in either direction from outlet port 282, 282'. However, as discussed above in detail, the design of separation assembly 204 with chambers 226 allows the location of the desired fraction to be shifted until it is in the region of outlet port 282, 282'. Such shifting can be brought about, for example using collection chambers 226, by withdrawing the red blood cell fraction through inlet port 280, 280' or ports 210, 210', and/or by adding whole blood aliquots through inlet tube 280, 280'.

The on-line harvesting capabilities of the centrifugal processing system 10 allows for continuous, dynamic separation and collection of platelet rich plasma, white blood cells, red blood cells and platelet poor plasma, by adjusting the input and removal of fluid medium and separated fractions as described above. Further, the orientation of the flexible and rigid centrifuge bags of this invention and of the contents therein (e.g., being generally radially extending) is not significantly modified in the transformation from separation to harvesting of the various constituents. Moreover, vortexing throughout the contents of the collection chambers 226 of this invention is reduced or eliminated since the centrifugal processing system 10 does not have to be decelerated or stopped for addition of fluid medium or removal of the various fractions therefrom.

Further, the general orientation of the collection chambers 226 of the invention (e.g., substantially horizontal) is maintained during removal of the desired whole blood fraction similar to the orientation of the collection chambers 226 assumed during centrifugation to further assist in maintaining the degree of separation provided by centrifugation. Consequently, the potential is reduced for disturbing the fractions to the degree where the separation achieved is adversely affected.

Although the present invention has been described with regard to the separation of whole blood components, it will be appreciated that the methods and apparatus described herein may be used in the separation components of other fluid media, including, but not limited to whole blood with density gradient media; cellular components, or sub-sets of the four whole blood components previously defined.

Figure 32:
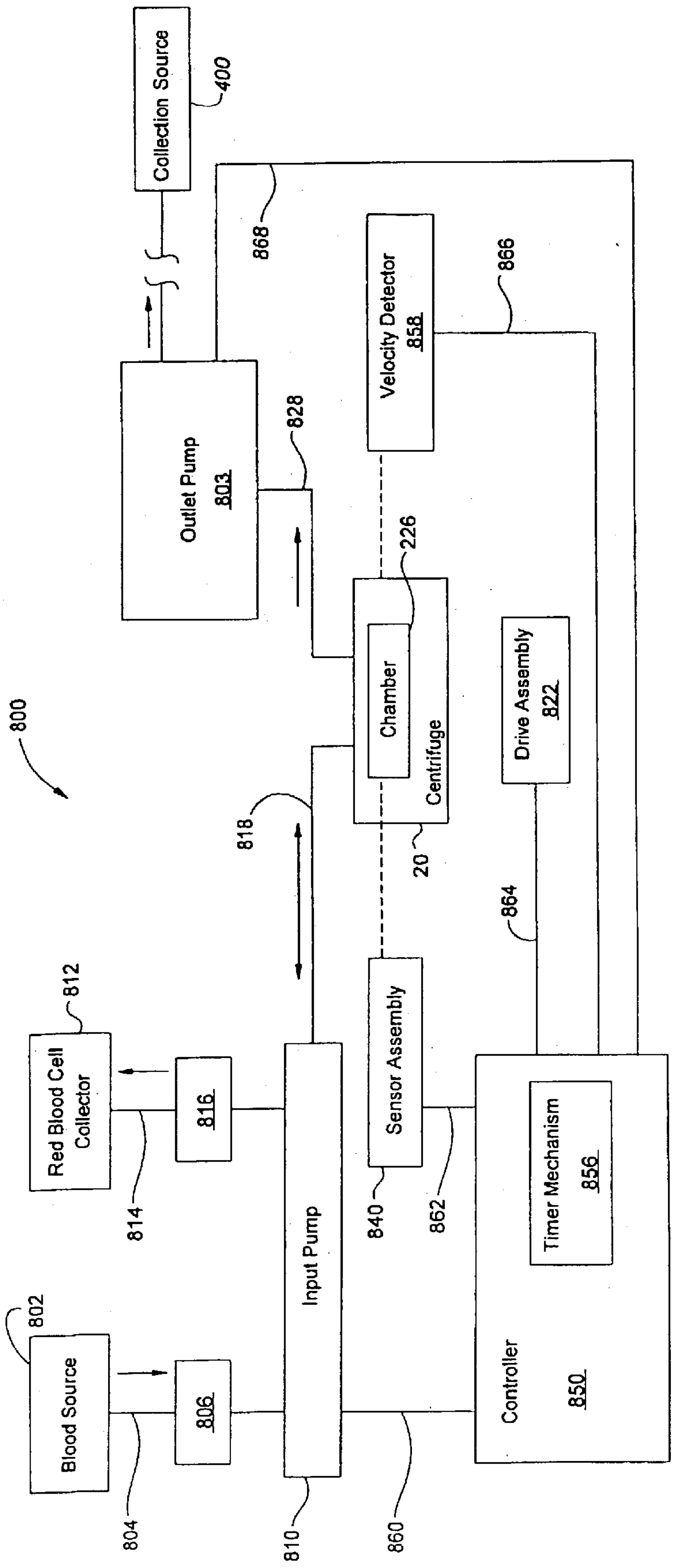
FIG. 32 is a block diagram illustrating the components of a centrifugal processing system of the present invention.

While blood separation and materials handling may be manually controlled, as discussed above, a further embodiment of the present invention provides for the automation of at least portions of the separation and material handling processes. Referring to FIG. 32, an automated centrifugal processing system 800 is illustrated that is generally configured to provide automated control over the steps of inputting blood, separating desired components, and outputting the separated components. The following discussion of the processing system 800 provides examples of separating platelets in a blood sample, but the processing system 800 provides features that would be useful for separating other components or fractions from blood or other fluids. These other uses for the processing system 800 are considered within the breadth of this disclosure. Similarly, the specific components discussed for use in the processing system 800 are provided for illustration purposes and not as limitations, with alternative devices being readily apparent to those skilled in the medical device arts.

In the embodiment illustrated in FIG. 32, the processing system 800 includes a blood source 802 connected with a fluid line 804 to an inlet pump 810. A valve 806, such as a solenoid-operated valve or a one-way check valve, is provided in the fluid line 804 to allow control of flow to and from the blood source 802 during operation of the inlet pump 810. The inlet pump 810 is operable to pump blood from the blood source 802 through the fluid line 818 to a centrifuge 820. Once all or a select portion of the blood in the blood source 802 have been pumped to the chamber 226 of the centrifuge 820 the inlet pump 810 is turned off and the blood source 802 isolated with valve 806. The inlet pump 810 may be operated at later times to provide additional blood during the operation of the processing system 800 (such as during or after the removal of a separated component).

The centrifuge 20 preferably includes a collection chamber 226 for collecting the input blood. The centrifuge 20 as discussed above has an internal mid-shaft gear assembly 108 that provides the motive force to rotate the rotor assembly 200, and particularly the mounting assembly 202, at a rotation rate that is adequate to create centrifugal forces that act to separate the various constituents or components of the blood in the collection chamber(s) 226. The drive assembly 822 may comprise a number of devices useful for generating the motive force, such as an electric motor with a drive shaft connected to internal drive components of the centrifuge 20. In a preferred embodiment, the drive assembly 822 comprises an electric motor that drives a belt attached to an exterior portion of the centrifuge 20 and more particularly to the timing belt ring 44. To obtain adequate separation, the rotation rate is typically between about 0 RPM and 5000 RPM, and in one embodiment of the invention, is maintained between about 0 RPM and 5000 RPM.

As discussed in detail previously, components of particular densities assume radial positions or belts at differing distances from the central axis A of the centrifuge 20. For example, the heavier red blood cells typically separate in an outer region while lower density platelets separate into a region more proximal to the central axis A. Between each of these component regions, there is an interface at which the fluid density measurably changes from a higher to a lower density (i.e., as density is measured from an outer to an inner region), and this density interface is used in some embodiments of the centrifugal processing system 10 to identify the location of component regions (as will be discussed in more detail below). In a preferred embodiment, the drive assembly 822 continues to operate to rotate the centrifuge 20 to retain the separation of the components throughout the operation of the centrifugal processing system 10.

Once blood separation has been achieved within the collection chamber(s) 226, the outlet pump 830 is operated to pump select components from the collection chamber(s) 226 through outlet lumen 828. As discussed previously, the collection chamber(s) 226 preferably is configured to allow the selective removal of a separated blood component, such as platelets located in a platelet rich plasma region, by the positioning of an outlet ports or lumens a radial distance from the central axis of the collection chamber(s) 226. Preferably, in a multi-lumen, continuous flow process, this radial distance or radial location for the outlet lumen is selected to coincide with the radial location of the desired, separated component or the anticipated location of the separated component. In this manner, the outlet pump 830 only (or substantially only) removes a particular component (such as platelets into container 400) existing at that radial distance. Once all or a desired quantity of the particular component is removed from the collection chamber(s) 226, operation of the outlet pump 830 is stopped, and a new separation process can be initiated. Alternatively, in a preferred embodiment, additional blood is pumped into the collection chamber(s) 226 by further operating the inlet pump 810 after or concurrent with operation of the outlet pump 830.

A concern with fixing the radial distance or location of the outlet port is that each blood sample may have varying levels or quantities of different components. Thus, upon separation, the radial distance or location of a particular component or component region within the collection chamber(s) 226 varies, at least slightly, with each different blood sample. Additionally, because of the varying levels of components, the size of the component region also varies and the amount that can be pumped out of the collection chamber(s) 226 by the outlet pump 830 without inclusion of other components varies with each blood sample. Further, the position of the component region will vary in embodiments of the separation system 10 in which additional blood is added after or during the removal of blood by the outlet pump 830.

To address the varying location of a particular separated component, the centrifugal processing system 10 preferably is configured to adjust the location of a separated component to substantially align the radial location of the separated component with the radial location of the outlet port. For example, the centrifugal processing system 10 may be utilized to collect platelets from a blood sample. In this example, the centrifugal processing system 10 preferably includes a red blood cell collector 812 connected to the inlet pump 810 via fluid line 814 having an isolation valve 816 (e.g., a solenoid-operated valve or one-way check valve). Alternatively, the pump or syringe may also act as the valve. The inlet pump 810 is configured to selectively pump fluids in two directions, to and away from the centrifuge 820 through fluid line 818, and in this regard, may be a reversible-direction peristaltic pump or other two-directional pump. Similarly, although shown schematically with two fluid lines 804 and 814, a single fluid line may be utilized as an inlet and an outlet line to practice the invention.

Operation of the inlet pump 810 to remove fluid from the collection chamber(s) 226 is useful to align the radial location of the desired separated component with the outlet tube 250 and inlet tubing 205, 207, 208 of the collection chamber(s) 226. When suction is applied to the inlet lumen 818 by inlet pump 810, red blood cells are pumped out of the collection chamber(s) 226 and into the red blood cell collector 812. As red blood cells are removed, the separated platelets (i.e., the desired component region) move radially outward to a new location within the collection chamber(s) 226. The inlet pump 810 is operated until the radial distance of the separated platelets or platelet region from the central axis is increased to coincide with the radial distance or location of the outlet ports of the collection chamber(s) 226. Once substantial alignment of the desired component region and the outlet tube(s) or port(s) is achieved, the outlet pump 803 is operated to remove all or a select quantity of the components in the aligned component region.

To provide automation features of the invention, the centrifugal processing system 10 includes a controller 850 for monitoring and controlling operation of the inlet pump 810, the centrifuge 20, the drive assembly 822, and the outlet pump 803. Numerous control devices may be utilized within the centrifugal processing system 10 to effectively monitor and control automated operations. In one embodiment, the controller 850 comprises a computer with a central processing unit (CPU) with a digital signal processor, memory, an input/output (I/O) interface for receiving input and feedback signals and for transmitting control signals, and software or programming applications for processing input signals and generating control signals (with or without signal conditioners and/or amplifiers). The controller 850 is communicatively linked to the devices of the centrifugal processing system 10 with signal lines 860, 862, 864, 866, and 868 which may include signal conditioning devices and other devices to provide for proper communications between the controller 850 and the components of the centrifugal processing system 10.

Once blood is supplied to the blood source container 802, the operator pushes the start button and the controller 850 transmits a control signal over signal line 864 to the drive assembly 822, which may include a motor controller, to begin rotating the centrifuge 20 to cause the components of the blood in separation assembly 204 to separate into radially-positioned regions (such as platelet rich plasma regions) within the collection chamber(s) 226. After initiation of the centrifuge spinning or concurrently with operation of the drive assembly 822, the controller 850 generates a control signal over signal line 860 to the inlet pump 810 to begin pumping blood from the blood source container 802 to the collection chamber(s) 226 in the centrifuge 20. In some embodiments of the processing system 800, the drive assembly 822 is operable at more than one speed or over a range of speeds. Additionally, even with a single speed drive shaft the rotation rate achieved at the centrifuge 20 may vary. To address this issue, the processing system 10 may include a velocity detector 858 that at least periodically detects movement of the collection chamber(s) 226 portion of the centrifuge 20 and transmits a feedback signal over signal line 866 to the controller 850. The controller 850 processes the received signal to calculate the rotation rate of the centrifuge 20, and if applicable, transmits a control signal to the drive assembly 822 to increase or decrease its operating speed to obtain a desired rotation rate at the collection chamber(s) 226.

To determine when separation of the components in the collection chamber(s) 226 is achieved, the processing system 800 may be calibrated to account for variations in the centrifuge 20 and drive assembly 822 configuration to determine a minimum rotation time to obtain a desired level of component separation. In this embodiment, the controller 850 preferably includes a timer mechanism 856 that operates to measure the period of time that the centrifuge 20 has been rotated by the drive assembly 822 (such as by beginning measuring from the transmission of the control signal by the controller 850 to the drive assembly 822). When the measured rotation time equals the calibrated rotation time for a particular centrifuge 20 and drive assembly 822 configuration, the timing mechanism 856 informs the controller 850 that separation has been achieved in the chamber (s) 226. At this point, the controller 850 operates to transmit control signal over signal line 860 to the input pump 810 to cease operation and to the outlet pump 803 over signal line 868 to initiate operation to pump a separated component in the component region adjacent the outlet ports of chamber(s) 226 through fluid line 828. In another embodiment where rotation time is utilized by controller 850, the velocity feedback signal from the velocity detector 858 is utilized by the controller 850 to adjust the rotation time as necessary to obtain the desired level of component separation. For example, the centrifugal processing system 10 can be calibrated for a number of rotation rates and the corresponding minimum rotation times can be stored in a look up table for retrieval by the controller 850 based on a calculated rotation rate. Rotational rates may be varied either manually or automatically to optimize cellular component position and or concentration.

Because the location of component separation regions varies during separation operations, a preferred embodiment of the centrifugal processing system 800 includes a sensor assembly 840 to monitor the separation of components within the centrifuge bag and to transmit feedback signals over line 862 to the controller 850. As will be understood by those skilled in the art, numerous sensor devices exist for detecting the presence of certain components in a fluid, and specifically a blood, sample. Many of these devices comprise a source of radiant energy, such as infrared, laser, or incandescent light, and a compatible radiant energy-sensitive detector that reacts to the received energy by generating an electric signal. Briefly, these radiant energy devices are useful because the detected signal varies in a measurable fashion with variances in the density of the material through which beams of the radiant energy are passed. According to the invention, the sensor assembly 840 may comprise any of these well-known types of radiant energy source and detector devices and other sensor devices useful for measuring the existence of constituents of fluids such as blood.

The source and the detector of the sensor assembly 840 are preferably located within the centrifugal processing system 800 to allow monitoring of the collection chamber(s) 226 and, particularly, to identify the presence of a particular blood component in a radial position coinciding with the radial position of the outlet port of the collection chamber(s) 226. For example, the sensors may be located anywhere along the collection chambers 226 to suit the needs of the operator or the desired to detect one or more separation interfaces. For example, it may be desirable to sense small volume liquid components and in this case, the sensor assembly 840 may utilize the light guides 234, 234' shown in FIG. 16 in the mounting assembly 202 to detect interfaces within the very reduced volume of the sensing portions or nipples 217, 217'. In this case, the light 884 from source 882 would be directed into the light guides 234, 234' where it would be bent by one or more bends (90 degree or any combination of larger or smaller light guide bends to receive the light 884 and direct it to the collection chambers 226) to guide it to the collection chambers 226. After passing through the collection chambers 226 and contained liquid, the light 888 again passes through light guides 234, 234' (i.e., in the opposing sensor support 232, 232') where it is guided or directed to the sensor 886.

In another embodiment, the radiation beams from the source are transmitted through a "window" in the collection chambers 226 that has a radial location that at least partially overlaps the radial location of one or more outlet ports. During operation of the centrifugal processing system 800, the feedback signals from the detector of the sensor assembly 840 allow the controller 850 to identify when a density interface has entered the window. This may occur for a number of reasons. When red blood cells are being removed by operation of the inlet pump 810 to remove fluid from the collection chambers 226 via the inlet tube 818. The change in density may also occur when a denser component is being added to the chambers 226 causing the particular blood component to be pushed radially inward. In the centrifugation of whole blood, this occurs when additional blood is added by operation of the input pump 810 and red blood cells collect in a region radially outward from the platelet region.

To account for differing movement of the density interface, the window of the radiation source may be alternatively positioned radially inward from the location of the ports of the collection chambers 226. By positioning the window inward from a port, the controller 850 can identify when the outlet pump 803 has nearly removed all of the particular component of the monitored region and/or when the inlet pump 810 has removed a quantity of denser components causing the monitored region to move radially outward. The controller 850 can then operate to send control signals to turn off the outlet pump 803 or the inlet pump 810 (as appropriate) to minimize the amount of undesired components (lower density components) that enter the ports. Alternatively, the sensor assembly 840 may have two radiation sources and detectors, and the second window of the sensor assembly 840 may be located a distance radially outward from the ports. With two sensing windows, the sensor assembly 840 is operable to provide the controller 850 information about a density interface moving radially inward toward the ports (such as when red blood cells are added). In response, the controller 850 can generate a control signal to the inlet pump 810 to operate to pump the denser components, such as red blood cells, out of the chambers 226. Two sensing windows also allow the controller 850 to detect a density interface moving outward, which allows the controller 850 to shut off the outlet pump 803 (and/or the inlet pump 810 to stop evacuating processes) and/or to start the inlet pump 810 to add additional blood.

Figure 33:
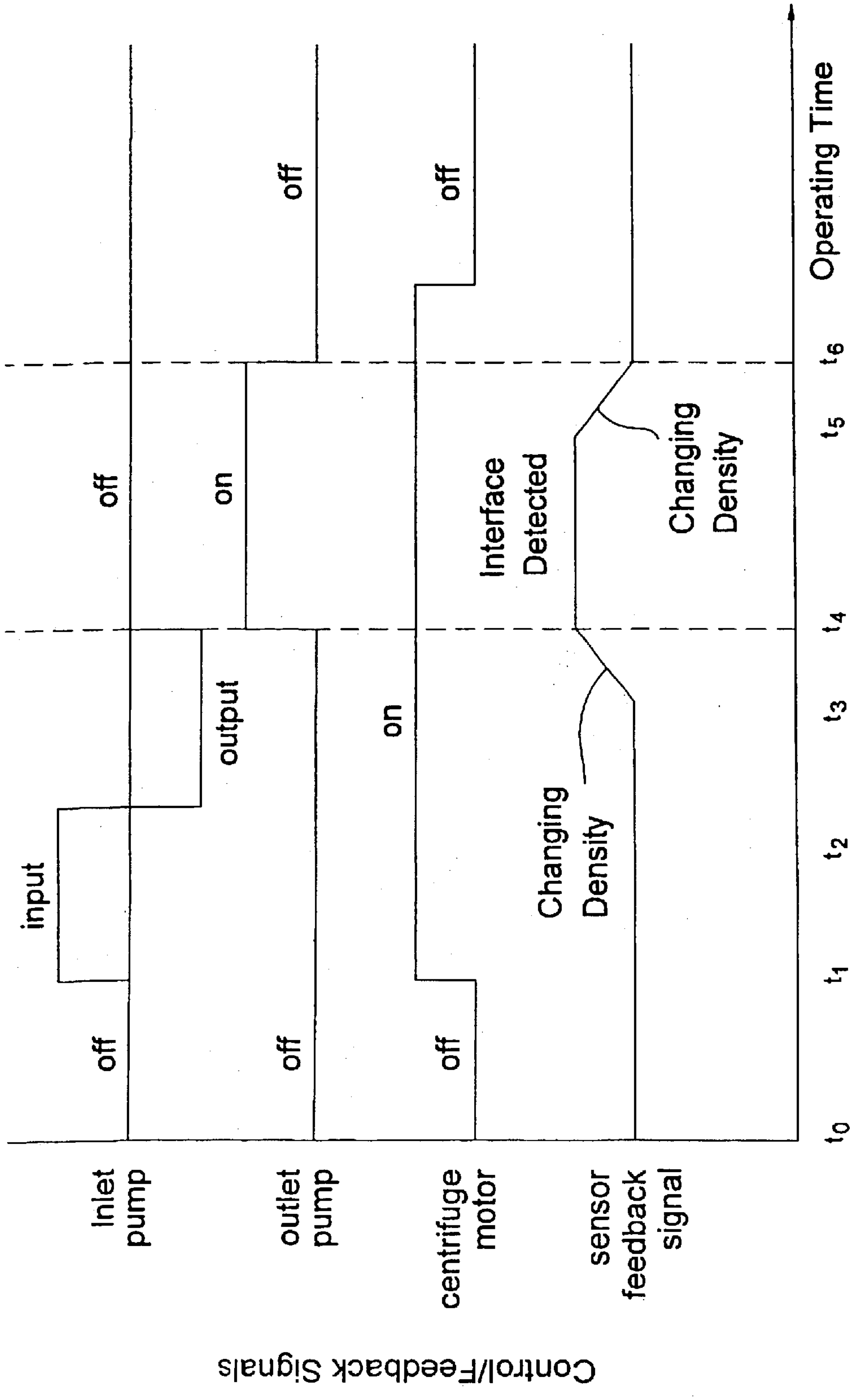
FIG. 33 is a graph illustrating the timing and relationship of transmission of control signals and receipt of feedback signals during operation of one embodiment of the automated centrifugal processing system of FIG. 32.

To further clarify operation of the processing system 800, FIG. 33 is provided which illustrates the timing and relationship of control signals generated by the controller 850 and the receipt of feedback signals from the sensor assembly 840. In this embodiment, the radiation detector of the sensor assembly 840 is positioned adjacent outlet tube (inlet to the outlet pump 803) in the collection chambers 226 to sense density changes in the fluid flowing past the collection chamber ports. As illustrated, operation of the processing system 800 begins at time to, with the inlet pump 810, the outlet pump 803, and the centrifuge drive assembly 822 all being off or not operating. At time $t_1$, the controller 850 operates in response to operator input or upon sensing the blood source 802 is adequately filled (sensor not shown) to generate a control signal on line 864 to begin operating the centrifuge drive assembly 822 to rotate the collection chambers 226. In some embodiments, this control signal over line 864 also contains rotation rate information to initially set the operating speed of the drive assembly 822. Concurrently or at a selected delay time, the controller 850 generates a control signal on line 860 to start the inlet pump 810 in a configuration to pump fluid to the collection chambers 226 over fluid line 818. The sensor assembly 840 provides an initial density feedback signal to the controller 850 on line 862, which the controller 850 can process to determine an initial or unseparated density adjacent the outlet tube. Alternatively, the controller 850 may be configured to request a feedback signal from the sensor assembly 840 after a set delay period (as measured by the timer mechanism 856) to allow separation of the components being pumped into the collection chambers 226 (such as the calibrated, minimum rotation time discussed above) into regions.

At time $t_2$, the controller 850 functions to align the region having the desired density, such as a region comprising a higher density of platelets, adjacent the detector of the sensor assembly 840 (i.e., adjacent the outlet tube). To achieve alignment, the controller 850 transmits a control signal over line 860 to the inlet pump 810 to stop pumping fluid to the chambers 226, to reverse pumping directions including shutting valve 806 and opening valve 816, and to begin pumping components having a higher density then the particular, desired component from the chambers 226 to the collector 812. For example, when the centrifugal processing system 10 is operated to separate and collect platelets or platelet rich plasma, the inlet pump 810 at time, $t_2$, is operated to pump out the red blood cell fraction by applying suction at the inlet tube 818 to the chambers 226. At time $t_3$, the density of the fluid adjacent the outlet tube 828 begins to change as denser components are removed by the inlet pump 810, and the sensor feedback signal being transmitted to the controller 850 changes in magnitude. The sensor feedback signal continues to change in magnitude (either becoming stronger or weaker depending on the particular sensor utilized and the material being collected) until at time $t_4$, when the controller 850 processes the feedback signal and determines that the density of the adjacent fluids is within a desired range. This transition can also be thought of as detecting when an interface between two regions of differing densities passes by the location of the detector of the sensor assembly 840.

With the region of the desired, separated component aligned with a specific collection chamber port, the controller 850 operates at time $t_4$, to send a control signal over line 860 to stop operations of the inlet pump 810. Also, at time $t_4$, or at any time thereafter, the controller 850 generates a control signal over line 868 to begin operation the outlet pump 803 to apply suction at the outlet tube 828 (or at specific lumens in a multi-lumen embodiment) to remove the desired component, such as the platelet rich plasma fraction, from the collection chambers 226. At time $t_5$, the sensor feedback signal again begins to change in magnitude as the density of the fluid near the outlet port in collection chamber 226 begins to change, such as when platelet poor plasma begins to enter the sampling window of the sensor assembly 840. At time $t_6$, the density of the fluid adjacent the outlet port and, hence, in the sampling window is outside of a desired density range (e.g., the fluid has less than a predetermined percentage of platelets or other desired fluid component). In response, the controller 850 transmits a control signal on line 868 to halt operations of the outlet pump 803. Of course, the controller 850 can be operated to transmit the signal to the outlet pump 803 at any time prior to time $t_6$, such as at a time after time $t_5$, when the density of the adjacent fluid begins to change but prior to time $t_6$ or based on volume removed. The controller 850 can then operate any time after time $t_6$, to halt operation of the centrifuge drive assembly 822. Further, as discussed above, operations of the separation centrifugal processing system 800 can be repeated with the inlet pump 810 being operated to add additional fluid, e.g., blood, after time $t_6$. Alternatively, the inlet pump 810 and the outlet pump 803 may be operated concurrently to add an additional volume of blood with a corresponding new amount of the component being collected after time $t_4$, to extend the period of time between detection of the interface at time $t_4$ and the detection of an out of range density at time $t_6$.

In the above discussion of the automated processing system 800, a sensor assembly 840 was shown in FIG. 32 schematically, and it was noted that the location of a radiant energy source and a detector may be any location within the processing system 800 useful for obtaining an accurate measurement of separating blood components within the collection chambers 226. For example, the source and detector can be both positioned within the centrifuge 20 at a location adjacent the collection chambers 226. In this embodiment, problems may arise with providing proper signal and power line connections to the source and sensor and with accounting for the rotation of the centrifuge and portions of the sensor assembly 840. Hence, one preferred embodiment of the processing system 800 provides for an externally positioned sensor assembly 840 including source and detector to simplify the structure of the centrifuge 20 while still providing effective density determinations of fluids within the blood reservoir.

Figure 34:
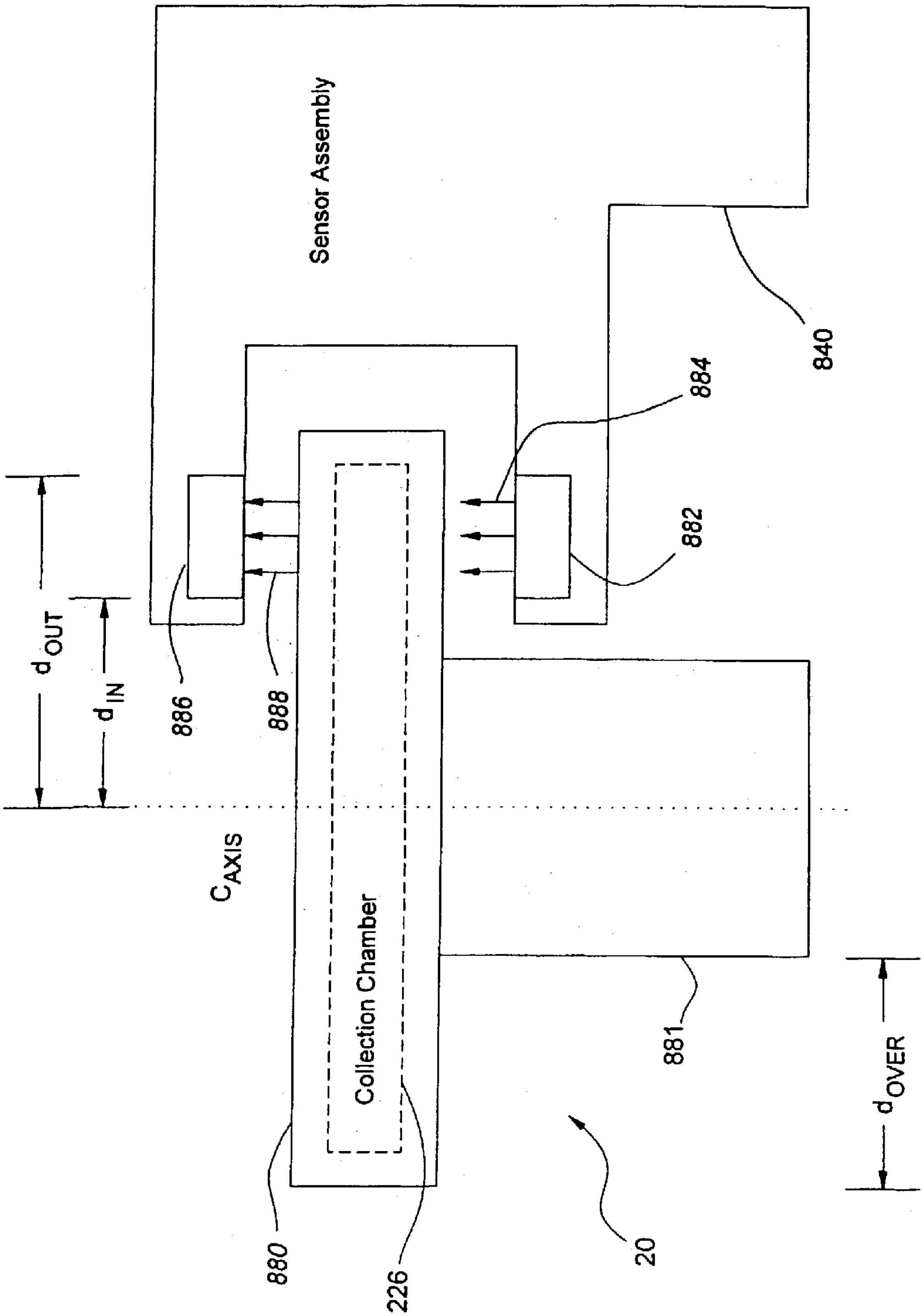
FIG. 34 is a side view of an alternative embodiment of the automated centrifugal processing system of FIG. 32 showing a centrifuge having a rotor wherein the reservoir extends over the outer diameter of the centrifuge portion that facilitates use of an externally positioned sensor assembly.

FIG. 34 illustrates a general side view of the relevant components of this external sensor embodiment of the centrifugal processing system 800. Generally, the centrifuge 20 comprises a rotor extension portion 880 (or mounting assembly 202 extension) and a drive portion 881, which is connected to the drive assembly 822 (connection not shown). Both the centrifuge 20 and the rotor extension portion 880 rotate about a central or rotation axis, $c_{axis}$, of the centrifuge 20. As discussed in more detail with respect to the internal gearing features of the centrifuge 20, the drive portion 881 spins in a ratio of 2 to 1 (or other suitable ratio) relative to the reservoir extension portion 880 to control twisting of inlet and outlet fluid lines to the rotor extension portion 880. The internal gearing features of the centrifuge 20 also enable the centrifuge 20 to effectively obtain rotation rates that force the separation of components with differing densities while limiting the risk that denser components, such as red blood cells, will become too tightly packed during separation forming a solid, dense material that is more difficult to pump or remove from the centrifuge 20.

Referring again to FIG. 34, the rotor extension portion 880 is shown located on the upper end of the centrifuge 20 and includes collection chambers 226 or other receptacle. Preferably, the rotor extension portion 880 is fabricated from a transparent or partially transparent material, such as any of a number of plastics, to allow sensing of fluid densities. The rotor extension portion 880 extends a distance, $d_{over}$, beyond the outer edge of the centrifuge 20 as measured radially outward from the central axis, $C_{axis}$. The distance, $d_{over}$, is preferably selected such that the desired component, such as the platelet rich plasma fraction, to be collected readily separates into a region at a point within the collection chambers 226 that also extends outward from the centrifuge 20. In this regard, the rotor extension portion 880 is also configured so that the collection chamber 226 extends within the rotor extension portion 880 to a point near the outer circumference of the rotor extension portion 880. The distance, $d_{over}$, selected for extending the rotor extension portion 880 is preferably selected to facilitate alignment process (discussed above) and to control the need for operating the input pump 810 to remove denser components. In one embodiment, the distance, $d_{over}$, is selected such that during separation of a typical blood sample center of the platelet rich region is about one half the extension distance, $d_{over}$ from the circumferential edge of the centrifuge 20.

The sensor assembly 840 is entirely external to the centrifuge 20 as shown in FIG. 34. The sensor assembly 840 includes a source 882 for emitting beams 884 of radiant energy into and through the rotor extension portion 880 and the included collection chambers 226. Again, as discussed previously, the radiant energy source 882 may be nearly any source of radiant energy (such as incandescent light, a strobe-light, an infrared light, laser and the like) useful in a fluid density sensor and the particular type of detector or energy used is not as important as the external location of the source 882. The sensor assembly 840 further includes a detector 886 that receives or senses beams 888 that have passed through the collection chambers 226 and have impinged upon the detector 886. The detector 886 is selected to be compatible with the source 882 and to transmit a feedback signal in response sensing the energy beams 888. The detector 886 (in combination with the controller 850 and its processing capacities) is useful for detecting the density of fluids in the collection chambers 226 between the source 882 and the detector 886. Particularly, the sensor assembly 840 is useful for identifying changes in fluid density and interfaces between fluids with differing densities. For example, the interface between a region containing separated red blood cells and a region containing the platelet rich plasma fraction, and the interface between the platelet rich plasma region and a platelet-poor plasma region.

With some source and detector configurations, a sampling window is created rather than a single sampling point (although a single sampling point configuration is useful as part of the invention as creating a window defined by a single radial distance). The sampling window is defined by an outer radial distance, $d_{OUT}$, from the central axis, $C_{axis}$ and an inner radial distance, $d_{IN}$. As may be appreciated, for many source and detector configurations the size of the sampling window may be rather small approximating a point and may, of course vary in cross-sectional shape (e.g., circular, square, rectangular, and the like). As discussed previously, it is preferable that the sensor assembly 840 be positioned relative to the reservoir extension portion 880 and the collection chambers 226 such that the sampling window created by the source 882 and detector 886 at least partially overlaps the radial position of the region created during separation processes containing a component of particular density, such as platelets. This may be a calibrated position determined through calibration processes of the centrifuge 20 in which a number of blood (or other fluid) samples are fully separated and radial distances to a particular region are measured. The determined or calibrated position can then be utilized as a initial, fixed location for the sensor assembly 840 with the source 882 and detector 886 being positioned relative to the rotor extension portion 880 such that the sampling window overlaps the anticipated position of the selected separation region. Of course, each sample may vary in content of various components which may cause this initial alignment to be inaccurate and operations of the centrifugal processing system 800 may cause misalignment or movement of regions. Hence, alignment processes discussed above preferably are utilized in addition to the initial positioning of the sampling window created by the sensor assembly 840.

In an alternate embodiment, the sensor assembly 840 is not in a fixed position within the separation system 800 and can be positioned during separation operations. For example, the sensor assembly 840 may be mounted on a base which can be slid radially inward toward the centrifuge 20 and radially outward away from the centrifuge 20 to vary the distances, $d_{IN}$ and $d_{OUT}$. This sliding movement is useful for providing access to one or more of the collection chambers 226, such as to insert and remove a disposable bag. During operation, the sensor assembly 840 would initially be pushed outward from the centrifuge 20 until a new centrifuge disposable 204 was inserted into the mounting assembly 202. The sensor assembly 840 could then be slid inward (or otherwise moved inward) to a calibrated position. Alternatively, the centrifugal processing system 800 could be operated for a period of time to achieve partial or full separation (based on a timed period or simple visual observation) and then the sensor assembly 840 slid inward to a position that the operator of the centrifugal processing system 800 visually approximates as aligning the sampling window with a desired region of separated components (such as the platelet rich plasma region). The effectiveness of such alignment could then readily be verified by operating the sensor assembly 840 to detect the density of the fluids in the collection chamber(s) 226 and a calculated density (or other information) could be output or displayed by the controller 850. This alternate embodiment provides a readily maintainable centrifugal processing system 800 while providing the benefits of a fixed position sensor assembly 840 and added benefits of allowing easy relative positioning to obtain or at least approximate a desired sample window and separation region alignment.

Figure 35:
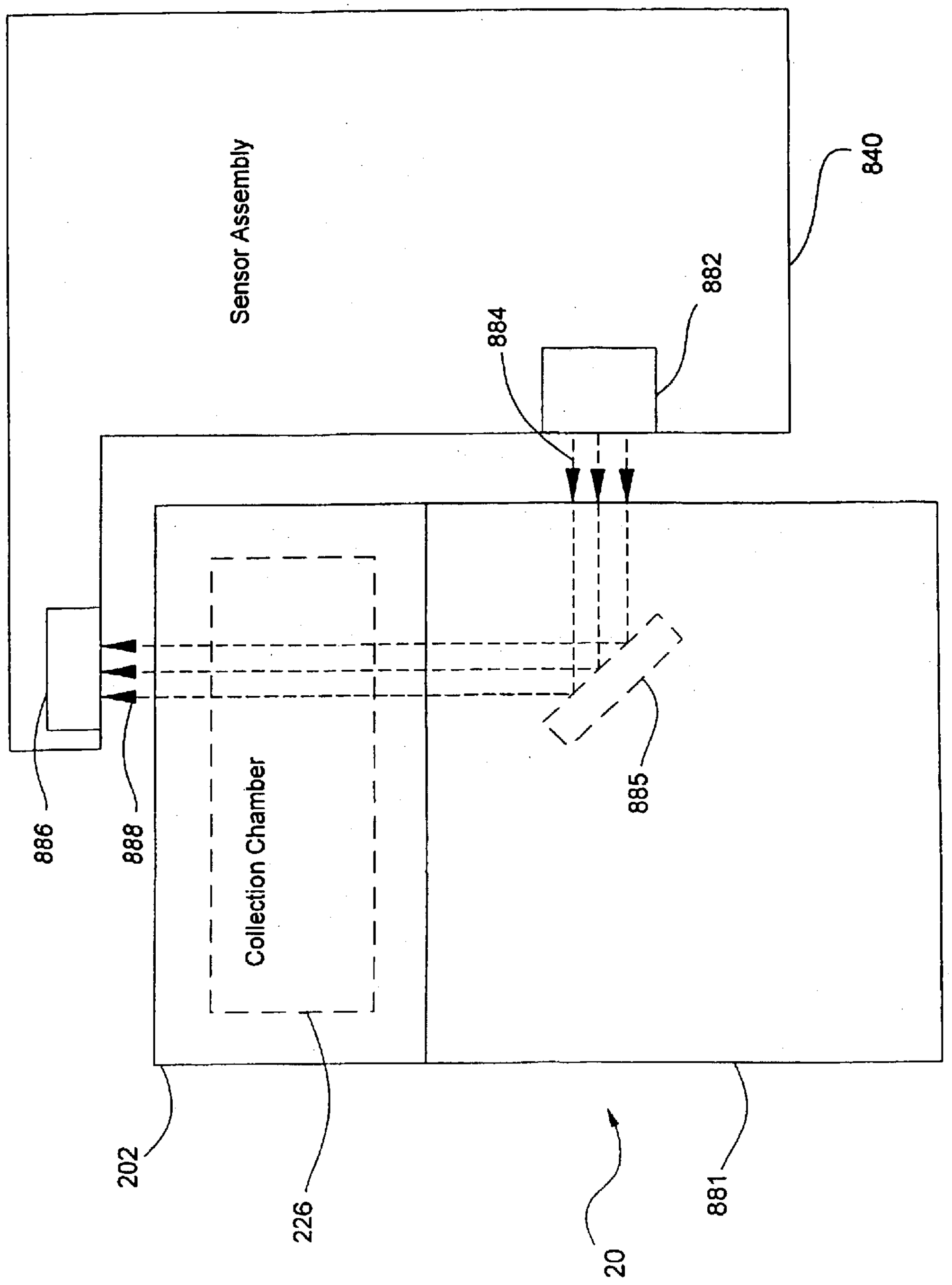
FIG. 35 is a side view of a further alternative embodiment of the external sensor assembly feature of the centrifugal processing system of the invention without an extended rotor and illustrating the positioning of a reflector within the centrifuge.
Figure 36:
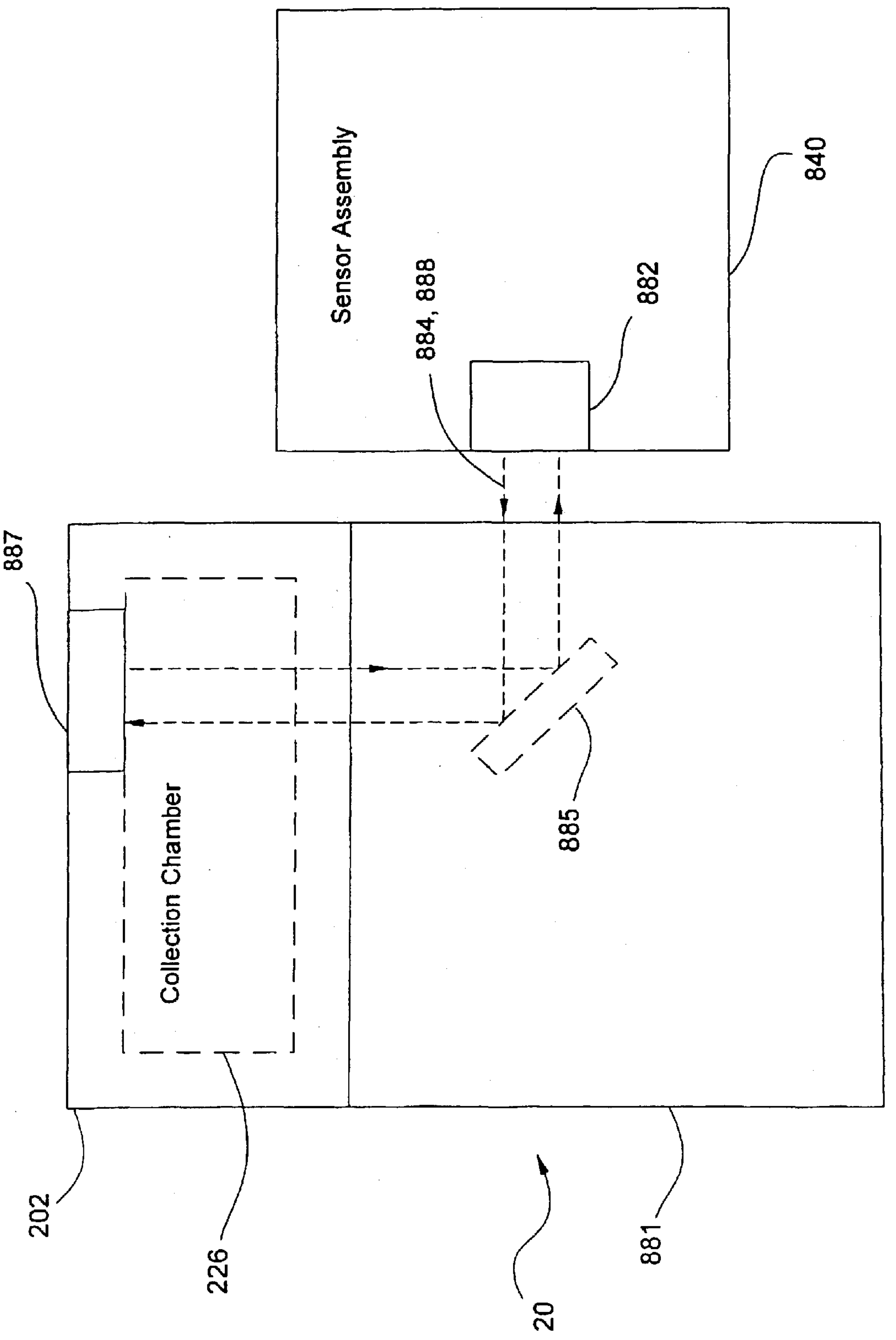
FIG. 36 is a side view of yet another embodiment of the external sensor assembly feature of the centrifugal processing system of the invention illustrating a single radiant energy source and detector device.

In some situations, it may be preferable to not have a rotor extension portion 880 or to modify the rotor extension portion 880 and the sensor assembly 840 such that the extension is not significant to monitoring the separation within the blood reservoir or collection chamber(s) 226. Two alternative embodiments or arrangements are illustrated in FIGS. 35 and 36 that provide the advantages of an external sensor assembly 840 (such as an external radiation source and detector). With these further embodiments provided, numerous other expansions of the discussed use of an external sensor will become apparent to those skilled in the arts and are considered within the breadth of this invention.

Referring to FIG. 35, a mounting assembly 202 is illustrated that has no extending portion (although some extension may be utilized) and contains the collection chamber(s) 226. Again, the mounting assembly 202 and collection chamber(s) 226 are preferably fabricated from plastics or other materials that allow radiation to pass through to detect changes in densities or other properties of fluid samples within the collection chamber(s) 226. In this embodiment of the sensor assembly 840, the radiation source 882 and the detector 886 are not positioned on opposing sides of the mounting assembly 202. Instead, a reflector 885 (such as a mirror and the like) is positioned within the drive portion 881 of the centrifuge to receive the radiation beams 884 from the radiation source 882 and direct them through the portion 880 and chamber(s) 226. The detector 886 is positioned within the sensor assembly 840 and relative to the centrifuge 20 to receive the deflected or reflected beams 888 that have passed through the fluid sample in the chamber(s) 226. In this manner, the sampling window within the chamber(s) 226 can be selected to align with the anticipated location of the fraction that is to be collected upon separation. In a preferred embodiment, the sampling window at least partially overlaps with the location of the outlet tube of the blood reservoir or chamber(s) 226.

In one embodiment, the drive portion is fabricated from a non-transparent material and a path for the beams 884 from the radiation source 884 to the reflector 885 is provided. The path in one preferred embodiment is an opening or hole such as port 154 or 156 (FIG. 14) in the side of the drive portion 881 that creates a path or tunnel through which the beams 884 travel unimpeded. Of course, the opening may be replaced with a path of transparent material to allow the beams to travel to the reflector 885 while also providing a protective cover for the internals of the drive portion 881. A path is also provided downstream of the reflector 885 to allow the beams 884 to travel through the drive portion 881 internals without or with minimal degradation. Again, the path may be an opening or tunnel through the drive portion leading to the mounting assembly 202 or be a path created with transparent materials. The beams 884 in these tunnel path embodiments enter the drive portion 881 one time per revolution of the drive portion 881, which provides an acceptable rate of sampling. Alternatively, a reflector 885 may readily be provided that extends circumferentially about the center axis of the drive portion 881 to provide a sampling rate equivalent to the rate of beam 884 transmission. Of course, the positions of the radiation source 882 and the detector 886 may be reversed and the angle of the reflector 885 and transmission of the beams 884 may be altered from those shown to practice the invention.

A further embodiment of an external sensor assembly 840 is provided in FIG. 36. In this embodiment, the radiation source 882 also acts as a radiation detector so there is no need for a separate detector. In this more compact external sensor configuration, the radiation source and detector 882 transmits beams 884 into the rotating drive portion 881 through or over the path in the drive portion 881. The reflector 885 reflects the beams 884 toward the mounting assembly 202 and the collection chamber(s) 226 to create a sampling window within the chamber(s) 226 in which density changes may be monitored. After passing through the chamber(s) 226 and included fluid sample, the beams 888 strike a second reflector 887 that is positioned within the mounting assembly 202 to reflect the beams 888 back over the same or substantially the same path through the chamber (s) 226 to again strike the reflector 885. The reflector 885 directs the beams 888 out of the drive portion 881 and back to the radiation source and detector 882 which, in response to the impinging beams 888, transmits a feedback signal to the controller 850 for further processing.

In one embodiment, the beams 884 enter the driving portion 881 once during every revolution of the driving portion 881. For example, this would be the case in the mounting assembly 202 shown in FIG. 16 which provides the light guides 234, 234' in the sensor supports 232, 232'. The portion 880 is preferably rotating twice for every rotation of the driving portion 881, as discussed in detail above, and hence, the second reflector 887 is aligned to receive the beams 888 only on every other rotation of the driving portion 881. Alternatively, a pair of reflectors 887 (or the light guides 234, 234') may be positioned in the mounting assembly 202 such that the beams 888 may be received and reflected back through the chamber(s) 226 once for every rotation of the driving portion 881. In yet a further embodiment, the reflector 885 and second reflector 887 may expand partially or fully about the center axis of the centrifuge 20 (with corresponding openings and/or transparent paths in the driving portion 881) to provide a higher sampling rate.

Figure 37:
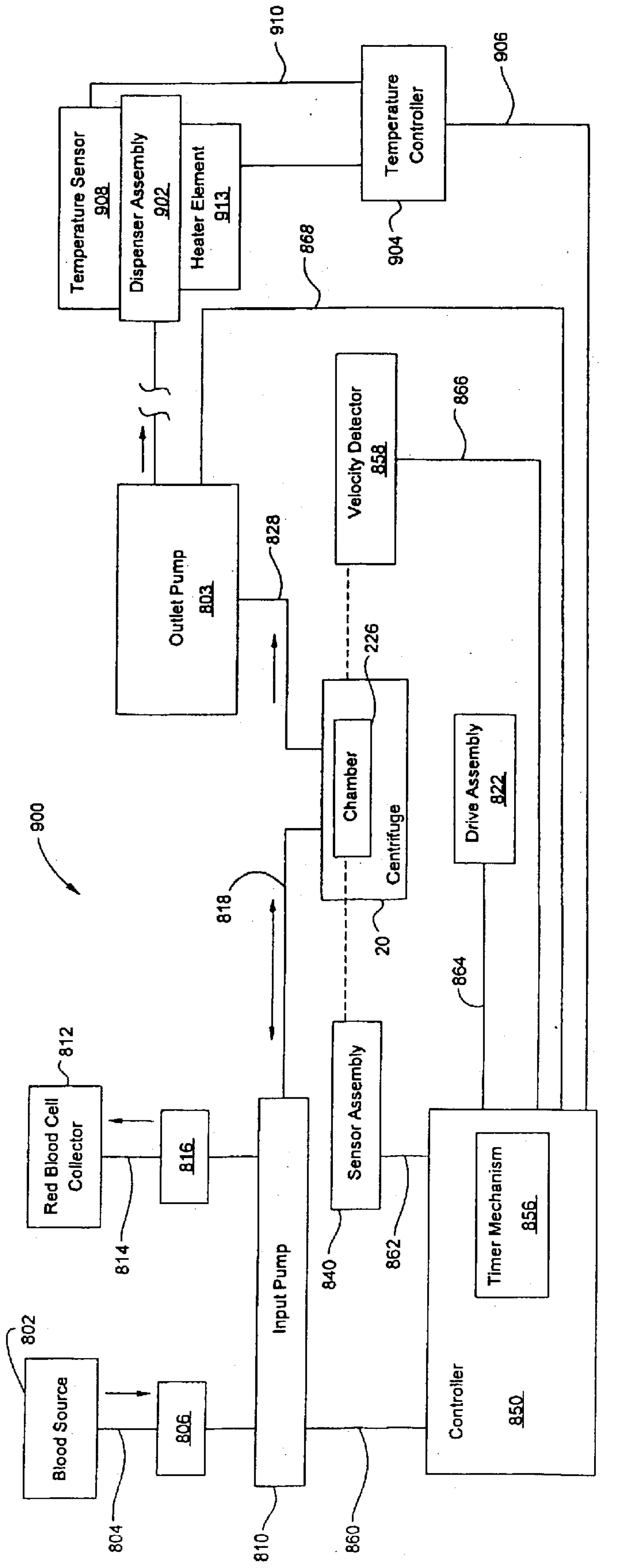
FIG. 37 is a block diagram of a an automated centrifugal processing system, similar to the embodiment of FIG. 47, including components forming a temperature control system for controlling temperatures of separated and processed products.

According to an important feature of the invention, temperature control features are provided in an alternate embodiment of the automated processing system invention 900, as illustrated in FIG. 37. Providing temperature controls within the processing system 900 can take many forms such as controlling the temperature of input fluid samples from the blood source 802, monitoring and controlling the temperature of fluids in the chamber(s) 226 to facilitate separation processes, and controlling the operating temperature of temperature sensitive components of the processing system 900. These components include but are not limited to, red blood cells, white blood cells, plasma, platelet rich plasma or any of these components mixed with other drugs, proteins or compounds. In a preferred embodiment of the invention, a temperature control system is included in the processing system 900 to heat components removed from the collection chamber(s) 226 by the outlet pump 803 to a desired temperature range. For example, when the processing system 900 is utilized in the creation of autologous platelet gel, a dispenser assembly 902 is included in the processing system 900 and includes chambers or syringes for collecting and processing platelet rich plasma drawn from the centrifuge 20. As part of the gel creation process, it is typically desirable to activate the platelets in the harvested platelet rich plasma fraction prior to the use of the gel (e.g., delivery to a patient). The temperature control system is useful in this regard for raising, and for then maintaining, the temperature of the platelets in the dispenser assembly to a predetermined activation temperature range. In one embodiment of the gel creation process, the activation temperature range is 25° C. to 50° C. and preferably 37° C. to 40° C., but it will be understood that differing temperature ranges may readily be utilized to practice the invention depending on the desired activation levels and particular products being processed or created with the processing system 900.

Referring to FIG. 37, the temperature control system of the processing system 900 includes a temperature controller 904 that is communicatively linked to the controller 850 with feedback signal line 906. The controller 850 may be utilized to initially set operating temperature ranges (e.g., an activation temperature range) and communicate these settings over feedback signal line 906 to the temperature controller 904. Alternatively, the temperature controller 904 may include input/output (I/O) devices for accepting the operating temperature ranges from an operator or these ranges may be preset as part of the initial fabrication and assembly of the processing system 900. The temperature controller 904 may comprise an electronic control circuit allowing linear, proportional, or other control over temperatures and heater elements and the like. In a preferred embodiment, the temperature controller 904 includes a microprocessor for calculating sensed temperatures, memory for storing temperature and control algorithms and programs, and I/O portions for receiving feedback signals from thermo sensors and for generating and transmitting control signals to various temperature control devices (e.g., resistive heat elements, fan rotors, and other devices well-known to those skilled in the heating and cooling arts).

As illustrated, a temperature sensor 908 comprising one or more temperature sensing elements is provided to sense the temperature of the dispenser assembly 902 and to provide a corresponding temperature feedback signal to the temperature controller 904 over signal line 910 (such as an electric signal proportional to sensed temperature changes). The temperature sensor 908 may be any temperature sensitive device useful for sensing temperature and, in response, generating a feedback signal useful by the temperature controller 904, such as a thermistor, thermocouple, and the like. In a preferred embodiment, the temperature sensor 908 is positioned within the dispenser assembly 902 to be in heat transferring or heat sensing contact with the syringes or other chambers containing the separated product which is to be activated. In this manner, the temperature controller 904 is able to better monitor whether the temperature of the relevant chambers within the dispenser assembly 902 is within the desired activation temperature range.

To maintain the chambers of the dispenser assembly 902 within a temperature range, a heater element 913 is included in the temperature control system and is selectively operable by the temperature controller 904 such as by operation of a power source based on signals received from the temperature sensor 908. The heater element 913 may comprise any number of devices useful for heating an object such as the chambers of the dispenser assembly 902, such as a fluid heat exchanger with tubing in heat exchange contact with the chambers. In a preferred example, but not as a limitation, electrical resistance-type heaters comprising coils, plates, and the like are utilized as part of the heater element 913. Preferably, in this embodiment, the resistive portions of the heater element 913 would be formed into a shape that conforms to the shape of the exterior portion of the chambers of the dispenser assembly 902 to provide efficient heat transfer but preferably also allow for insertion and removal of the chambers of the dispenser assembly 902. During operation of the separation system 900, the temperature controller 904 is configured to receive an operating temperature range, to receive and process temperature feedback signals from the temperature sensor 908, and in response, to selectively operate the heater element 913 to first raise the temperature of the chambers of the dispenser assembly 902 to a temperature within the operating temperature range and to second maintain the sensed temperature within the operating range.

For example, a desired operating range for activating a gel or manipulating other cellular components and their reactions onto themselves or with agents may be provided as a set point temperature (or desired activation temperature) with a tolerance provided on either side of this set point temperature. The temperature controller 904, in this example, may operate the heater element 913 to raise the temperature of the chambers of the dispenser assembly 902 to a temperature above the set point temperature but below the upper tolerance temperature at which point the heater element 913 may be shut off by the temperature controller 904. When the temperature sensed by the temperature sensor 908 drops below the set point temperature but above the lower tolerance temperature, the temperature controller 904 operates the heater element 913 to again raise the sensed temperature to above the set point temperature but below the upper tolerance temperature. In this manner, the temperature controller 904 effectively maintains the temperature of the chambers in the dispenser assembly 902 within a desired activation temperature range (which, of course, may be a very small range that approximates a single set temperature). In one embodiment, the temperature controller is or operates as a proportional integral derivative (PID) temperature controller to provide enhanced temperature control with smaller peaks and abrupt changes in the temperature produced by the heater element 913. Additionally, the temperature controller 904 may include visual indicators (such as LEDs) to indicate when the sensed temperature is within a set operating range and/or audio alarms to indicate when the sensed temperature is outside the set operating range.

In another embodiment, the heater element 913 is configured to operate at more than one setting such that it may be operated throughout operation of the processing system 900 and is not shut off. For example, the heater element 913 may have a lower setting designed to maintain the chambers of the dispenser assembly 902 at the lower end of the operating range (e.g., acceptable activation temperature range) with higher settings that provide heating that brings the chambers up to higher temperatures within the set operating range. In another embodiment, the heater element 913 is configured to heat up at selectable rates (e.g., change in temperature per unit of time) to enhance the activation or other processing of separated liquids in the dispenser assembly 902. This feature provides the temperature controller 904 with control over the heating rate provided by the heater element 913.

Figure 38:
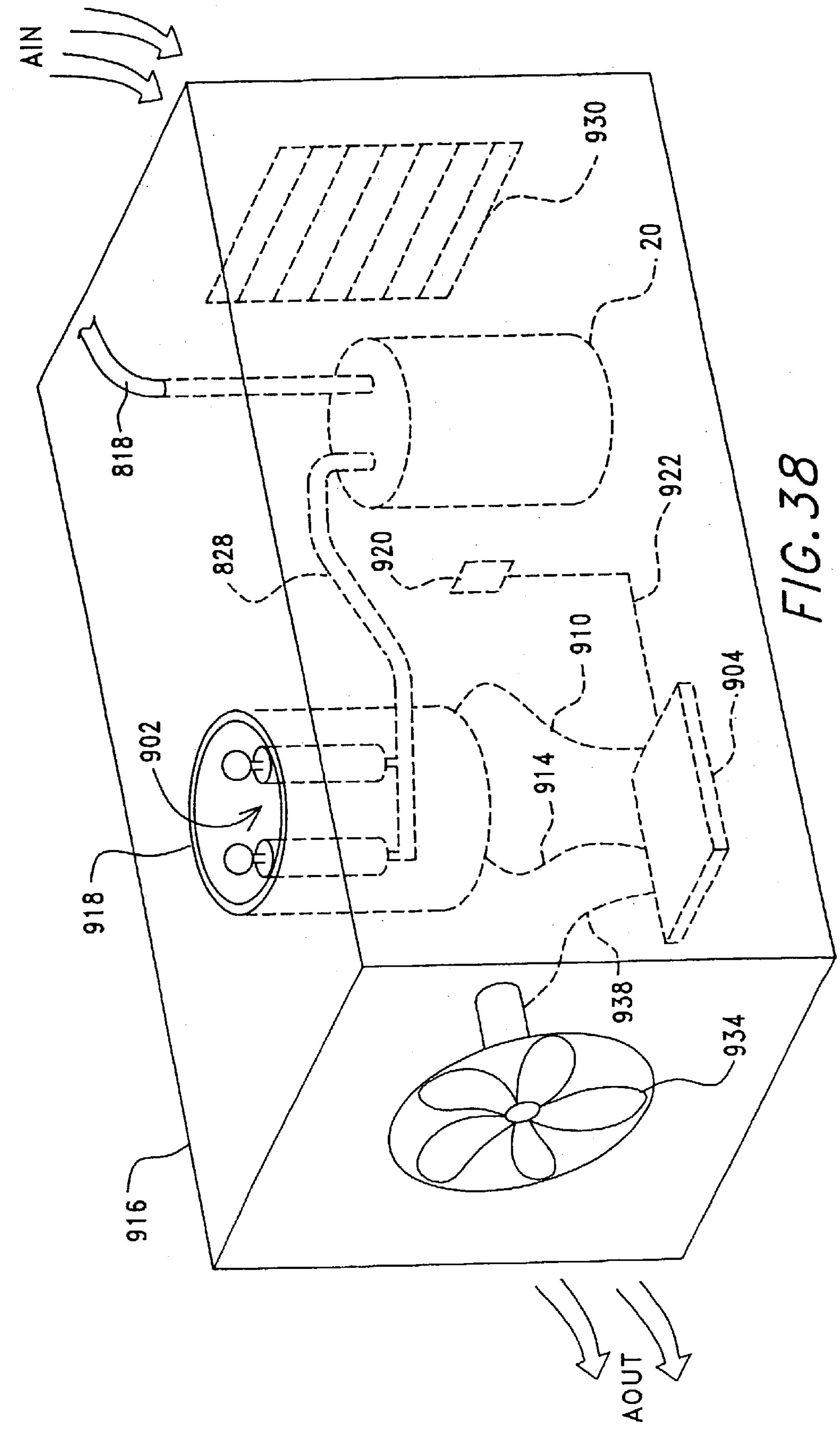
FIG. 38 is a perspective view of components of the temperature control system of FIG. 37.

As discussed previously, the invention provides features that combine to provide a compact separation system that is particularly adapted for onsite or field use in hospitals and similar environments where space is limited. FIG. 38 illustrates one preferred arrangement of the centrifugal processing system 900 of FIG. 37 that provides a compact profile or footprint while facilitating the inclusion of a temperature control system. An enclosure 916 is included as part of the temperature control system to provide structural support and protection for the components of the temperature control system. The enclosure 916 may be fabricated from a number of structural materials, such as plastic. The enclosure 916 supports a heater housing 918 that is configured to allow insertion and removal of the chambers and other elements of the dispenser assembly 902. The heater housing 918 has a wall that contains the heater element 913 (not shown in FIG. 59) which is connected via control line 914 to the temperature controller 904. The temperature sensor 908 (not shown in FIG. 38) is also positioned within the heater housing 918, and as discussed with reference to FIG. 37, is positioned relative to the chambers of the dispenser assembly 902 to sense the temperature of the chambers, and the contained fluid, during operation of the system 900. A temperature feedback signal is transmitted by the temperature sensor 908 over line 910 to temperature controller 904, which responds by selectively operating the heater element 913 to maintain the temperature within the heater housing 918 within a selected operating range.

Because the separation system 900 includes temperature sensitive components, such as the controller 850, the temperature control system preferably is configured to monitor and control the temperature within the enclosure 916. As illustrated, a temperature sensor 920 is included to sense the ambient temperature within the enclosure 916 and to transmit a feedback signal over line 922 to temperature controller 904. An air inlet 930, such as a louver, is provided in the enclosure 916 to allow air, $A_{IN}$, to be drawn into and through the enclosure 916 to remove heated air and maintain the temperature within the enclosure 916 at an acceptable ambient temperature. To circulate the cooling air, a fan 934 is provided to pull the air, $A_{IN}$, into the enclosure 916 and to discharge hotter air, $A_{OUT}$, out of the enclosure 916. The fan 934 is selectively operable by the temperature controller 904 via control signals over line 938. The size or rating of the fan 934 may vary in embodiments of the invention and is preferably selected based on the volume of the enclosure 916, the components positioned within the enclosure 916 (e.g., the quantity of heat generated by the separation system 900 components), the desired ambient temperature for the enclosure 916, and other cooling design factors.

The foregoing description is considered as illustrative only of the principles of the invention. Furthermore, since numerous modifications and changes will readily occur to those skilled in the art, it is not desired to limit the invention to the exact construction and processes shown as described above. Accordingly, all suitable modifications and equivalents may be resorted to falling within the scope of the invention as defined by the claims which follow. For example, the volume of the collection chambers 226 and input and output sources may be varied to practice the invention. The described system 10 is volume and fraction insensitive and will operate effectively whether the collection chambers 226 are filled completely or whether only a small volume is input. In the one lumen, noncontinuous flow embodiment, the process of backing fluid and components out enhances this ability to collect desired products without regard to the volume provided within the chambers 226.

The foregoing description is considered as illustrative only of the principles of the invention. The words "comprise," "comprising," "include," "including," and "includes" when used in this specification and in the following claims are intended to specify the presence of one or more stated features, integers, components, or steps, but they do not preclude the presence or addition of one or more other features, integers, components, steps, or groups thereof. Furthermore, since a number of modifications and changes will readily will readily occur to those skilled in the art, it is not desired to limit the invention to the exact construction and process shown described above. Accordingly, all suitable modifications and equivalents may be resorted to falling within the scope of the invention as defined by the claims which follow.

The embodiments of the invention in which an exclusive property or privilege is claimed are defined as follows:

1. A centrifugal method of separating and collecting components from a fluid, comprising:
   providing a centrifuge operable at a plurality of rotation speeds and having a mounting assembly for positioning and retaining a disposable separation assembly relative to the centrifuge at the rotation speeds;
   mounting the separation assembly comprising a number of collection chambers in the mounting assembly, wherein each of the collection chambers include an outer collection portion with a port for providing a fluid pathway for the fluid into and out of the collection chambers and wherein the mounting includes fluidically connecting the ports with a fluid tube;
   connecting a fluid source to the fluid tube;
   rotating the centrifuge at a fill speed less than about 1000 rpm;
   operating the fluid source to supply the fluid to the fluid tube, whereby the fluid is concurrently supplied in substantially equal volumetric and component density quantities to each of the collection chambers and then rotating the centrifuge at one or more faster speeds to separate components of the fluid.

2. The method of claim 1, further including second rotating the centrifuge at a soft pack processing speed greater than the fill speed for a soft pack time period and after the soft pack time period, withdrawing at least a portion of the heaviest one of the components via the fluid tube.

3. The method of claim 2, wherein the withdrawing is performed substantially concurrently and at a substantially equal rate from each of the collection chambers.

4. The method of claim 2, wherein during the removing, the centrifuge is operated at a withdrawal speed less than the soft pack processing speed.

5. The method of claim 2, wherein the removing is performed until a boundary layer between the heaviest one and a second heaviest component is detected to be adjacent a sensor positioned exterior to the collection chambers.

6. The method of claim 2, further including third rotating the centrifuge at a hard packing speed greater than the soft pack processing speed.

7. The method of claim 6, wherein the hard packing speed is selected from the range of 2400 to 5000 rpm.

8. The method of claim 6, further including withdrawing a second heaviest component based on an expected volume of the second heaviest component.

9. The method of claim 8, further including prior to the withdrawing of the second heaviest component, withdrawing a remaining volume of the heaviest component based on a volume of the fluid tube.

10. The method of claim 8, further including fourth rotating the centrifuge at a withdrawal speed less than the hard packing speed.

11. A centrifugal method of separating and collecting components from a fluid, comprising:

providing a centrifuge operable at a plurality of rotation speeds and having a mounting assembly for positioning and retaining a disposable separation assembly relative to the centrifuge at the rotation speeds;

mounting the separation assembly comprising a number of collection chambers in the mounting assembly, wherein each of the collection chambers include an outer collection portion with a port for providing a fluid pathway for the fluid into and out of the collection chambers and wherein the mounting includes fluidically connecting the ports with a fluid tube;

connecting a fluid source to the fluid tube;

first rotating the centrifuge at a fill speed;

operating the fluid source to supply the fluid to the fluid tube, whereby the fluid is concurrently supplied in substantially equal volumetric and component density quantities to each of the collection chambers; and second rotating the centrifuge at a soft pack processing speed greater than the fill speed for a soft pack time period and after the soft pack time period, withdrawing at least a portion of the heaviest one of the components via the fluid tube.

12. The method of claim 11, wherein the withdrawing is performed substantially concurrently and at a substantially equal rate from each of the collection chambers.

13. The method of claim 11, wherein during the removing, the centrifuge is operated at a withdrawal speed less than the soft pack processing speed.

14. The method of claim 11, wherein the removing is performed until a boundary layer between the heaviest one and a second heaviest component is detected to be adjacent a sensor positioned exterior to the collection chambers.

15. The method of claim 11, further including third rotating the centrifuge at a hard packing speed greater than the soft pack processing speed.

16. The method of claim 15, wherein the hard packing speed is selected from the range of 2400 to 5000 rpm.

17. The method of claim 15, further including withdrawing a second heaviest component based on an expected volume of the second heaviest component.

18. The method of claim 17, further including prior to the withdrawing of the second heaviest component, withdrawing a remaining volume of the heaviest component based on a volume of the fluid tube.

19. The method of claim 17, further including fourth rotating the centrifuge at a withdrawal speed less than the hard packing speed.

20. The method of claim 11, wherein the fill speed is less than about 3000 rpm.

21. The method of claim 20, wherein the fill speed is less than about 1000 rpm.

22. The method of claim 11, wherein the outer collection portion of each collection chamber is conical shaped.

23. A centrifugal method of separating and collecting components from blood, comprising:

providing a centrifuge operable at a plurality of rotation speeds and having a collection assembly mounted on the centrifuge to rotate at the rotation speeds, wherein the collection assembly comprises at least two collection chambers each having an outer collection portion with a port providing a fluid pathway into and out of the collection chambers;

connecting a blood source to the ports of the collection chambers via fluid tubes;

first rotating the centrifuge at a fill speed;

operating the blood source to supply the blood to the fluid tube, whereby the blood is concurrently supplied in substantially equal volumetric and component density quantities to each of the collection chambers;

second rotating the centrifuge at a soft pack processing speed for a soft pack time period;

after the soft pack time period, withdrawing a substantially equal volume of red blood cells from each of the collection chambers via the fluid tubes;

third rotating the centrifuge at a hard pack processing speed for a hard pack time period, wherein the hard pack processing speed is greater than the soft pack processing speed; and after the hard pack time period, withdrawing a substantially equal volume of platelet rich plasma from each of the collection chambers via the fluid tubes.

24. The method of claim 23, wherein the hard packing processing speed is in the range of about 2400 to about 5000 rpm.

25. The method of claim 23, wherein the soft pack processing speed is greater than the fill speed.

26. The method of claim 25, wherein the soft pack processing speed and fill speeds are less than about 3000 rpm.

27. The method of claim 26, wherein the outer collection portions are conical shaped.

28. The method of claim 23, further including prior to the withdrawing of platelet rich plasma, withdrawing an additional volume of red blood cells, whereby the withdrawn platelet rich plasma is substantially free of red blood cells.

29. The method of claim 28, wherein the additional volume is selected based on an internal volume of the fluid tube.

* * * * *